(12) United States Patent
Ogawa et al.

(10) Patent No.: US 8,949,335 B2
(45) Date of Patent: Feb. 3, 2015

(54) CONTENT PROCESSING DEVICE, CONTENT PROCESSING METHOD, COMPUTER-READABLE RECORDING MEDIUM, AND INTEGRATED CIRCUIT FOR PROCESSING AT LEAST ONE OF MORE CONTENTS

(75) Inventors: Kento Ogawa, Osaka (JP); Yasuhiro Yuki, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 217 days.

(21) Appl. No.: 13/701,627

(22) PCT Filed: Feb. 14, 2012

(86) PCT No.: PCT/JP2012/000947
§ 371 (c)(1),
(2), (4) Date: Dec. 3, 2012

(87) PCT Pub. No.: WO2012/137397
PCT Pub. Date: Oct. 11, 2012

(65) Prior Publication Data
US 2013/0080534 A1    Mar. 28, 2013

(30) Foreign Application Priority Data
Apr. 1, 2011    (JP) .................................. 2011-081447

(51) Int. Cl.
*G06F 13/00*     (2006.01)
*G06Q 10/10*     (2012.01)
*G06F 17/30*     (2006.01)
*H04N 21/4788*   (2011.01)

(52) U.S. Cl.
CPC .......... *G06Q 10/10* (2013.01); *G06F 17/30979* (2013.01); *H04N 21/4788* (2013.01)
USPC ....................................................... 709/204

(58) Field of Classification Search
CPC .. G06Q 10/10; H04L 29/06; H04L 29/08072; H04L 29/06027; H04L 12/581; G06F 17/3097; H04N 21/4788
USPC .......................................................... 709/204
See application file for complete search history.

(56) References Cited

U.S. PATENT DOCUMENTS

2010/0077017 A1*   3/2010   Martinez et al. .............. 709/201
2010/0082403 A1*   4/2010   Higgins et al. .................. 705/10
2010/0142762 A1    6/2010   Morita

FOREIGN PATENT DOCUMENTS

| JP | 2006-79457  | 3/2006 |
| JP | 2009-187233 | 8/2009 |
| JP | 2010-140069 | 6/2010 |

OTHER PUBLICATIONS

International Search Report issued Mar. 13, 2012 in International (PCT) Application No. PCT/JP2012/000947.

*Primary Examiner* — Robert B Harrell
(74) *Attorney, Agent, or Firm* — Wenderoth, Lind & Ponack, LLP

(57) ABSTRACT

A content processing device calculates a content topicality degree representing a degree of topicality of a content which serves as a topic between sharing users, based on subject information relating to a subjects in the content, sharing user information and social information; extracts a sharing user who does not appear in the subject of the content as an unappearing sharing user; calculates a content appropriateness degree representing a degree of appropriateness of the content to be shared between the sharing users in such a manner that the value for the content appropriateness degree decreases, as the degree of intimacy between the extracted unappearing sharing user and the subject increases; calculates a content evaluation value based on the content topicality degree and the content appropriateness degree; determines a priority based on the calculated content evaluation value; and controls output of the content according to the determined priority.

17 Claims, 33 Drawing Sheets

FIG.3

| PARTNER USER<br>OWN USER | A | B | C | D | E | F | G | H | I | J | K | L |
|---|---|---|---|---|---|---|---|---|---|---|---|---|
| A | 1.0 | 2.0 | 1.0 | 1.2 | 1.5 | – | – | 1.4 | 2.0 | – | – | 4.3 |
| B | 2.1 | 1.0 | 1.2 | 0.5 | – | – | – | – | – | – | – | – |
| C | 0.8 | 0.8 | 1.0 | – | – | 3.0 | 3.5 | – | – | – | – | – |
| D | 0.8 | 0.8 | – | 1.0 | 2.0 | – | – | – | – | – | – | – |
| E | 2.0 | – | – | 0.7 | 1.0 | – | – | – | – | 0.5 | – | – |
| F | – | – | 2.5 | – | – | 1.0 | 2.8 | – | – | – | 1.3 | – |
| G | – | – | 3.1 | – | – | 2.7 | 1.0 | – | – | – | 0.7 | – |
| H | 2.3 | – | – | – | – | – | – | 1.0 | 2.0 | – | – | 1.3 |
| I | 2.4 | – | – | – | – | – | – | 1.8 | 1.0 | – | – | – |
| J | – | – | – | – | 1.2 | – | – | – | – | 1.0 | – | – |
| K | – | – | – | – | – | 1.3 | 1.2 | – | – | – | 1.0 | – |
| L | 4.2 | – | – | – | – | – | – | – | 1.2 | – | – | 1.0 |

FIG.4
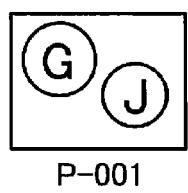
P-001
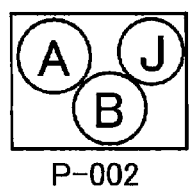
P-002
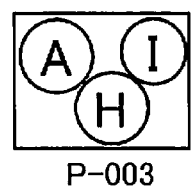
P-003
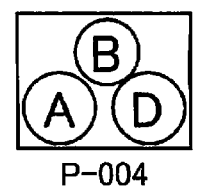
P-004
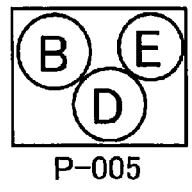
P-005
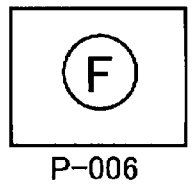
P-006
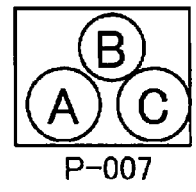
P-007
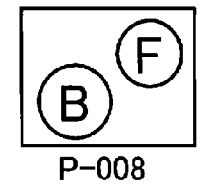
P-008

FIG.5

| SHARING USER | INFORMATION INDICATING POSITION OF ADDRESS (LATITUDE, LONGITUDE) |
|---|---|
| A | (34.725413, 135.566901) |
| B | (34.818019, 135.571632) |
| C | (34.803316, 135.451981) |

FIG.6

| CONTENT NAME | SUBJECT PERSON | PHOTOGRAPHING DATE |
|---|---|---|
| P-001 | G, J | 2010/10/23 15:30 |
| P-002 | A, B, J | 2010/10/23 16:52 |
| P-003 | A, H, I | 2010/10/24 19:40 |
| P-004 | A, B, D | 2010/10/30 12:37 |
| P-005 | B, D, E | 2010/10/30 18:12 |
| P-006 | F | 2010/11/07 10:51 |
| P-007 | A, B, C | 2010/11/07 13:12 |
| P-008 | B, F | 2010/11/07 20:43 |
| ... | ... | ... |

FIG.7

| EVENT ID | EVENT PARTICIPANT USER | CONTENT NAME | SUBJECT PERSON | PHOTOGRAPHING DATE |
|---|---|---|---|---|
| E1 | A, B, G, J | P-001, P-002 | A, B, G, J | 2010/10/23 |
| E2 | A, H, I | P-003 | A, H, I | 2010/10/24 |
| E3 | A, B, D, E | P-004, P-005 | A, B, D, E | 2010/10/30 |
| E4 | A, B, C, F | P-006, P-007, P-008 | A, B, C, F | 2010/11/07 |
| ... | ... | ... | ... | ... |

FIG.16

| USER | USER ATTRIBUTE |
|---|---|
| B | FRIEND |
| C | FRIEND |
| D | FRIEND |
| E | FRIEND |
| F | ACQUAINTANCE |
| G | ACQUAINTANCE |
| H | FAMILY MEMBER |
| I | FAMILY MEMBER |
| J | ACQUAINTANCE |
| K | ACQUAINTANCE |
| L | LOVER |

FIG.17

| USER ATTRIBUTE | SHARING CONTENT ATTRIBUTE |
|---|---|
| LOVER | ACQUAINTANCE, FRIEND, FAMILY MEMBER, LOVER |
| FAMILY MEMBER | ACQUAINTANCE, FRIEND, FAMILY MEMBER |
| FRIEND | ACQUAINTANCE, FRIEND, LOVER |
| ACQUAINTANCE | ACQUAINTANCE, FRIEND |

FIG.18

| EVENT ID | EVENT PARTICIPANT USER ATTRIBUTE |
|---|---|
| E1 | FRIEND, ACQUAINTANCE |
| E2 | FAMILY MEMBER |
| E3 | FRIEND |
| E4 | FRIEND, ACQUAINTANCE |
| ... | ... |

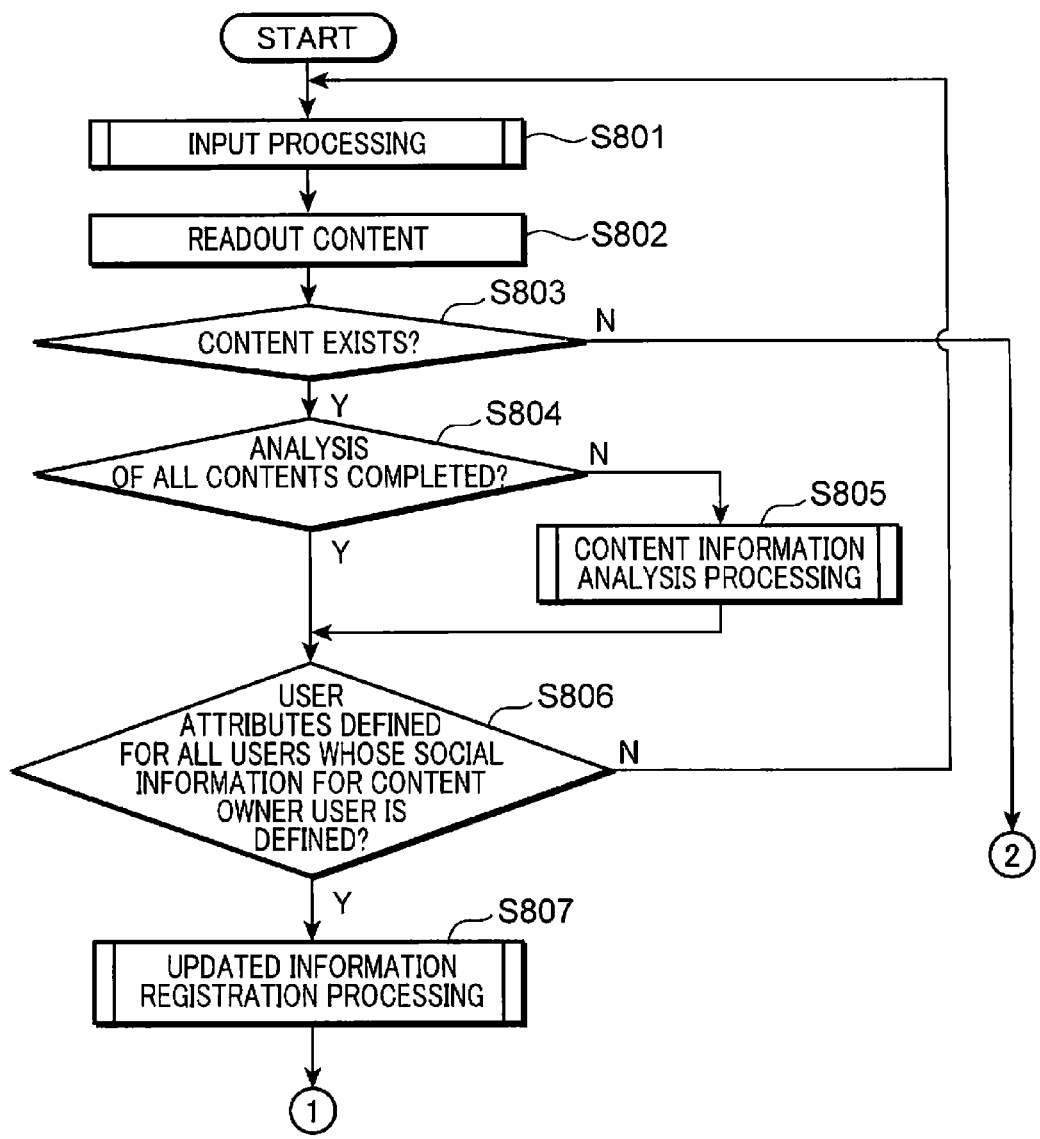

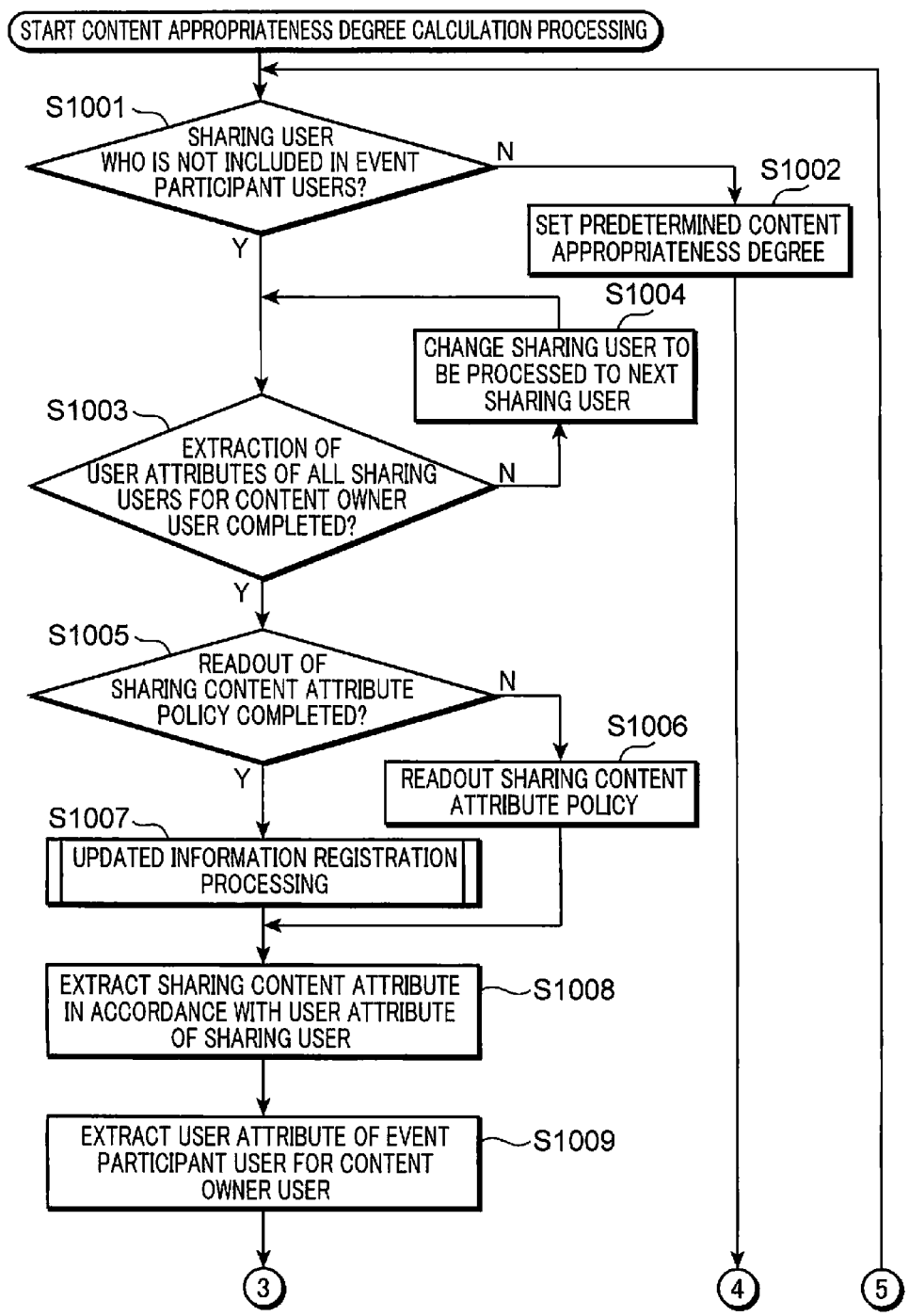

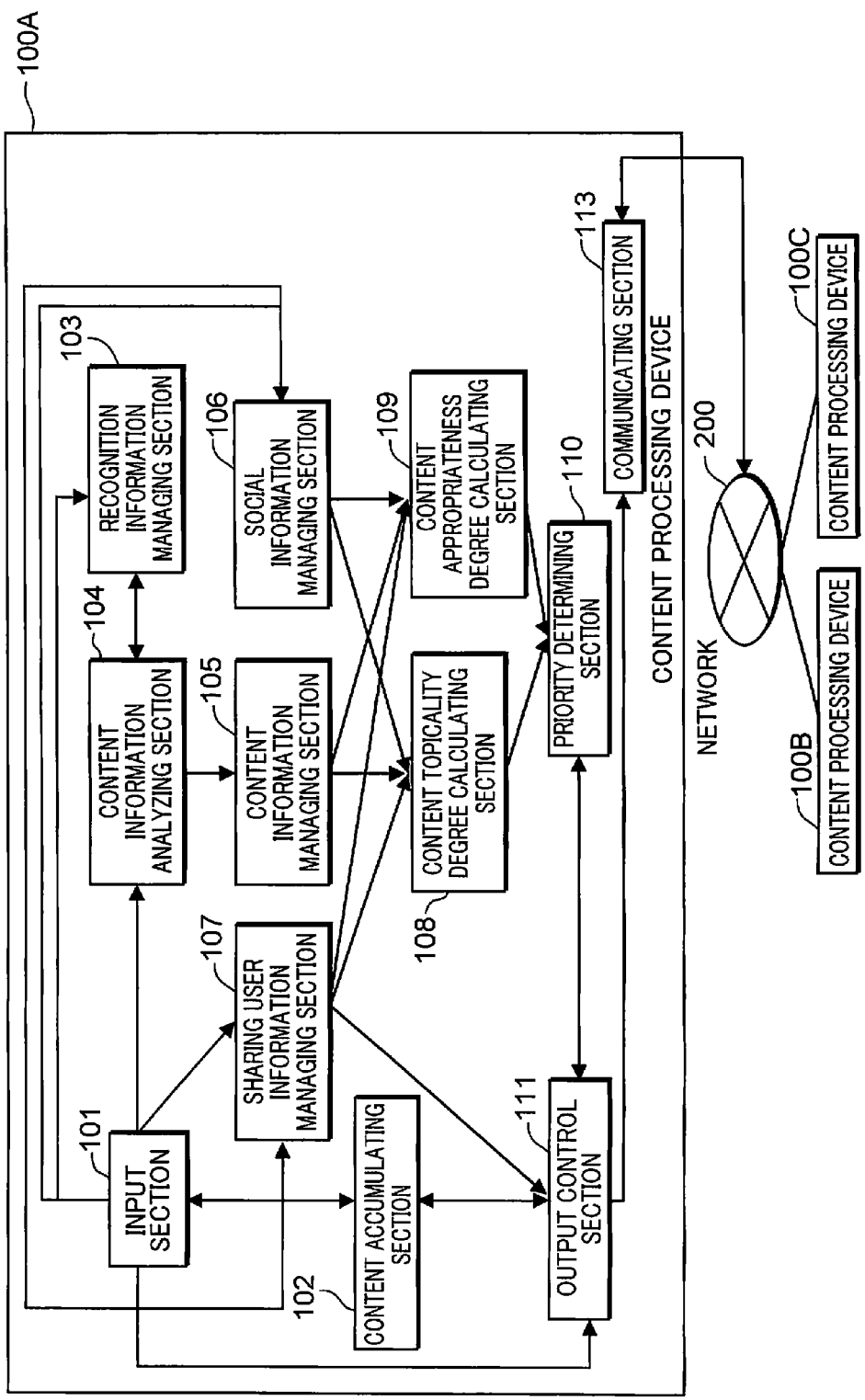

FIG.26

| CONTENT NAME | SUBJECT PERSON | DEGREE OF SMILE | DEGREE OF BODY INCLINATION | PHOTOGRAPHING USER INFORMATION |
|---|---|---|---|---|
| P-001 | G | 50 | 70 | A |
| | J | 30 | 40 | |

FIG.28

| OPERATION USER | CONTENT NAME | OPERATION TYPE | NUMBER OF TIMES | ACCUMULATION TIME (MIN) |
|---|---|---|---|---|
| A | P-001 | BROWSING | 12 | 10 |
| | | ENLARGING | 6 | – |
| | | PROCESSING | 1 | 45 |
| | | COPYING | 2 | – |
| | | PRINTING | 0 | – |
| | | TRANSFERRING | 0 | – |
| | | TRANSMITTING | 2 | – |
| | | POSTING | 3 | – |
| | | DELETING | 0 | – |

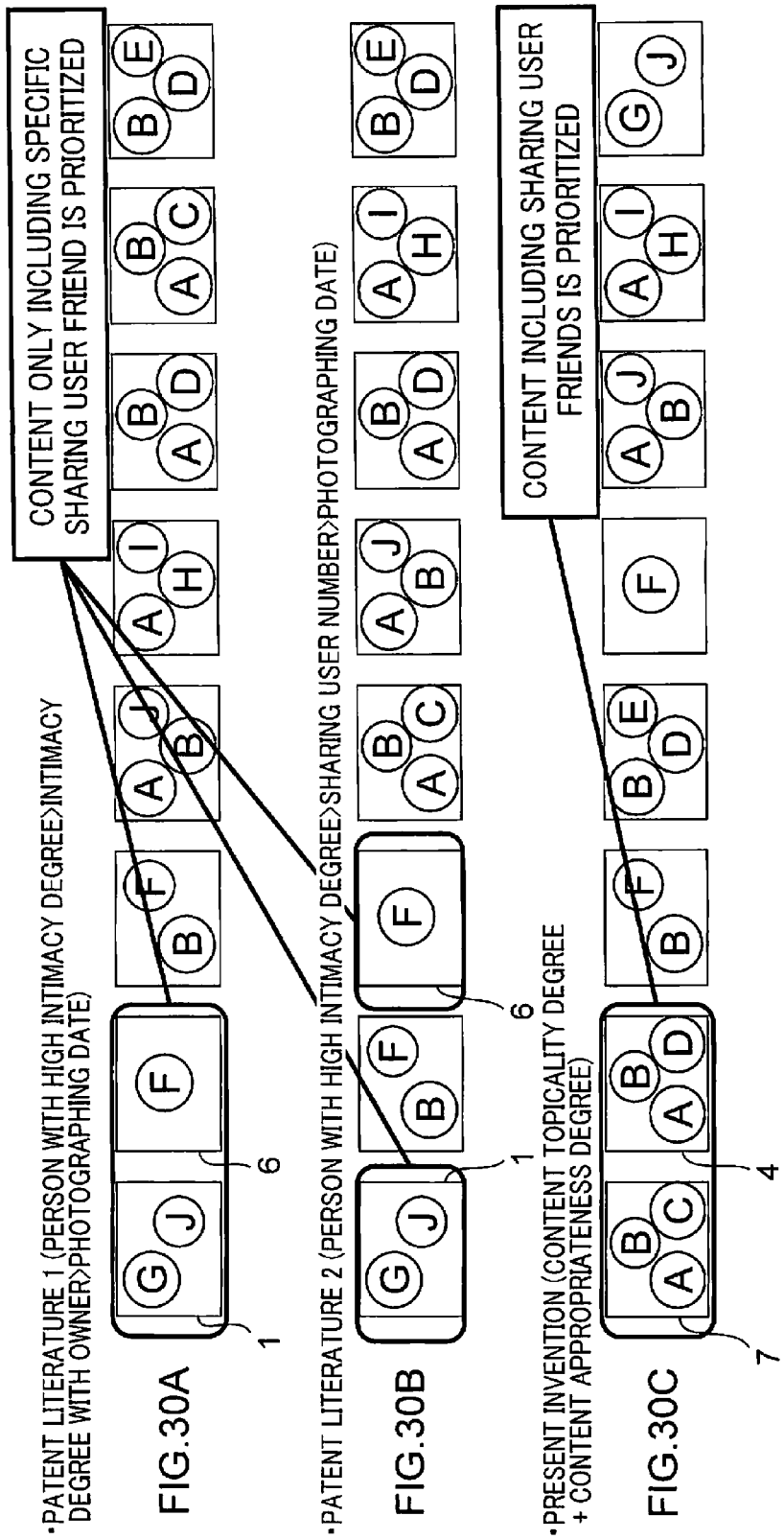

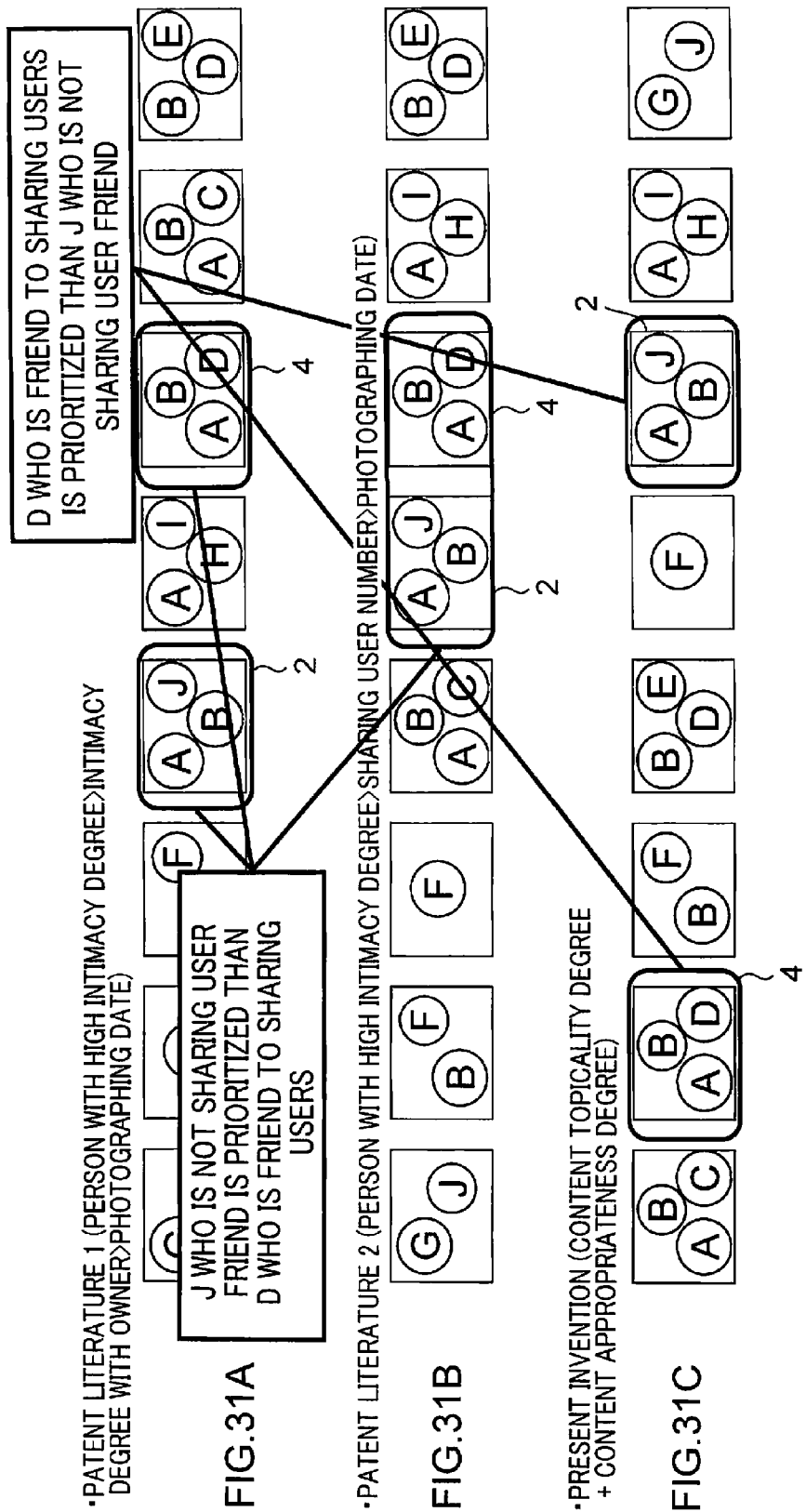

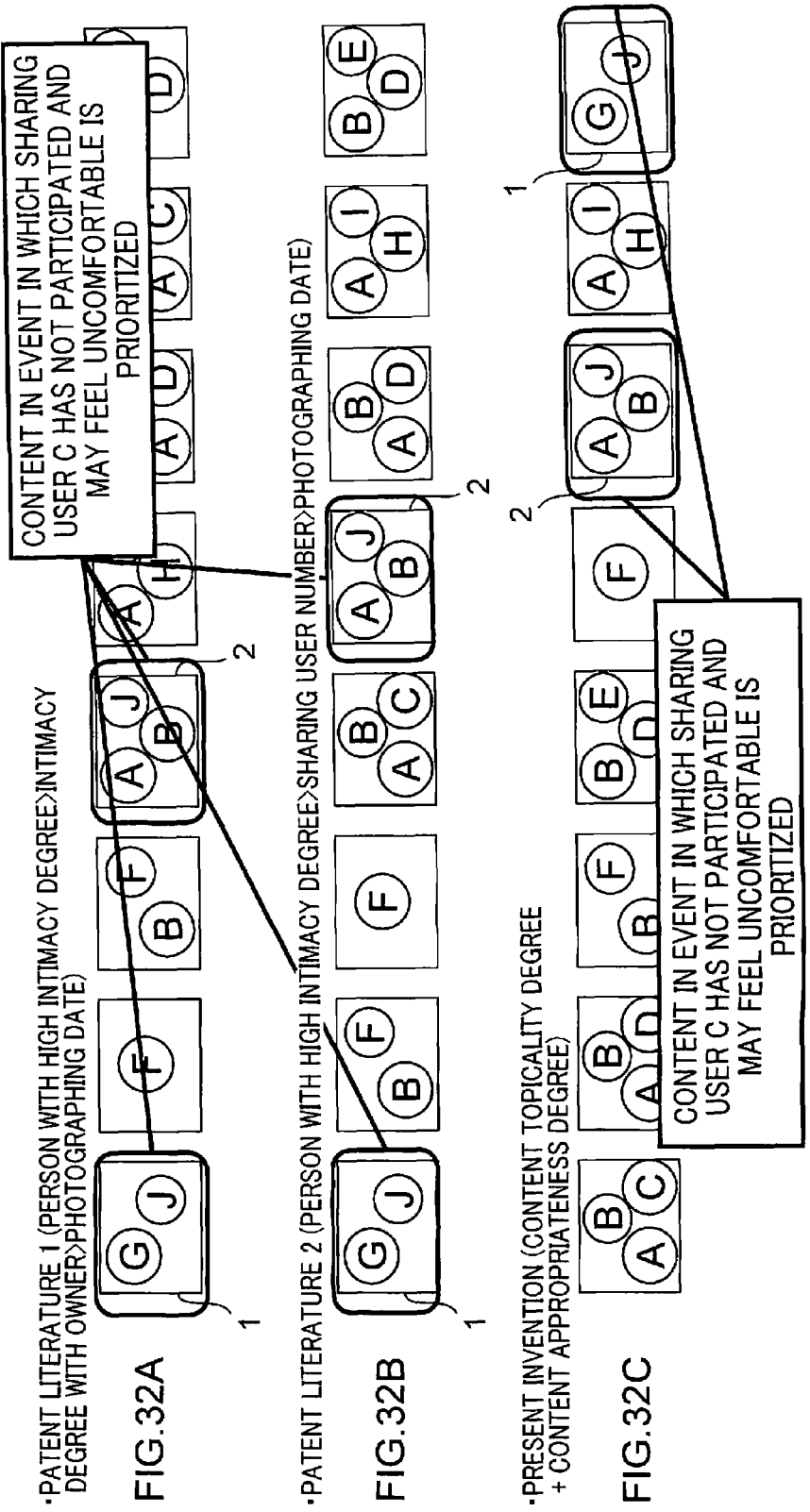

CONTENT PROCESSING DEVICE, CONTENT PROCESSING METHOD, COMPUTER-READABLE RECORDING MEDIUM, AND INTEGRATED CIRCUIT FOR PROCESSING AT LEAST ONE OF MORE CONTENTS

TECHNICAL FIELD

The present invention relates to a content processing device for processing contents such as still images or moving images, and more particularly to a content processing device, a content processing method, a content processing program, and an integrated circuit for controlling the priorities in outputting the contents.

BACKGROUND ART

In recent years, as an imaging apparatus such as a digital still camera, a digital video camera, and a camera built in a mobile phone is spread, contents such as still images or moving images that have been photographed at various events such as trips or wedding ceremonies are increasing.

In addition, people have an increasing opportunity to present photographed contents on screens of TVs or mobile terminals, and enjoy the content sharing with other people such as friends, acquaintances, family members, and lovers.

In such occasions, however, a user who owns the contents is required to select the contents to be browsed one by one, taking into consideration about topicality between all the users sharing the contents, or privacy in sharing. This is cumbersome and involves a certain amount of time.

In view of the above, there is proposed a method, in which the contents are automatically selected depending on the users who browse the sharing contents, and the selected contents are presented. For instance, patent literature 1 proposes a method, wherein a degree of intimacy between subject persons is calculated based on subject person information (such as the distance between persons, frequency of appearance, and the number of persons) of the contents, and presentation of a content including a user who has a high degree of intimacy with the browser user is prioritized.

Further, patent literature 2 proposes a method, wherein in the case where a content owner user browses a content with other user, presentation of a content including a user whose degree of intimacy with the content owner user is lower than the degree of intimacy between the content owner user and other user is prioritized, whereby presentation of the content which should be private for the content owner user is prevented.

However, patent literatures 1 and 2 merely disclose configurations of presenting a content including a specific person such as a user having a high degree of intimacy or a low degree of intimacy with a certain browser user. Therefore, in the configurations disclosed in patent literatures 1 and 2, it is impossible to output contents by increasing the priority of a content having a high topicality degree for all the browser users and by lowering the priority of a content which is inappropriate for sharing, such as a content which some of the browser users do not wish to browse due to a difference in worthiness between the users. As a result, in the case where contents are browsed by multiple users, there is a problem that presentation of a content which is not interesting to browser users other than a certain browser user or users, or a content which is not agreeable to a certain browser user or users may be prioritized.

CITATION LIST

Patent Literature

Patent literature 1: Japanese Patent No. 4490214
Patent literature 2: Japanese Unexamined Patent Publication No. 2010-140069

SUMMARY OF INVENTION

In view of the above, an object of the invention is to provide a configuration that enables to reduce a user's operation load, and enables to present and manage a content which is appropriate for sharing between all the sharing users.

A content processing device according to an aspect of the invention is a content processing device for processing at least one or more contents. The content processing device includes an input section which allows a user to input a content; a sharing user information managing section which manages sharing user information relating to at least one or more sharing users who share the content inputted from the input section; a content information managing section which manages subject information relating to a subject included in the content; a social information managing section which manages social information which specifies a relationship between the users, and a degree of intimacy between the users, the degree of intimacy being a digitized value representing intimacy between the users; a content appropriateness degree calculating section which extracts a sharing user who does not appear in the subject of the content as an unappearing sharing user, and which calculates a content appropriateness degree in such a manner that the value for the content appropriateness degree decreases as the degree of intimacy between the extracted unappearing sharing user and the subject increases, with use of the subject information and the sharing user information, the content appropriateness degree being a digitized value representing a degree of appropriateness of the content to be shared between the sharing users; a priority determining section which calculates a content evaluation value with use of the calculated content appropriateness degree, and which determines a priority relating to output of the content based on the calculated content evaluation value; and an output control section which controls the output of the content, based on a determination result obtained by the priority determining section.

Further, a content processing method, a content processing program, and an integrated circuit according to another aspect of the invention are also provided with the same configuration as the content processing device as described above.

BRIEF DESCRIPTION OF DRAWINGS

FIG. 3 is a diagram showing an example of a social information table of users in the first embodiment of the invention;

FIG. 4 is a diagram showing an example of contents to be inputted in the first embodiment of the invention;

FIG. 5 is diagram showing an example of a sharing user information table in the first embodiment of the invention;

FIG. 6 is a diagram showing an example of a content information table in the first embodiment of the invention;

FIG. 7 is a diagram showing an example of an event information table in the first embodiment of the invention;

FIG. 16 is a diagram showing an example of a user attribute table for a content owner user in the second embodiment of the invention;

FIG. 17 is a table diagram showing an example of a sharing content attribute policy in the second embodiment of the invention;

FIG. 18 is a table diagram showing an example of event participant user attributes in the second embodiment of the invention;

FIGS. 19A and 19B are a flowchart showing an example of a flow of a content processing in the second embodiment of the invention;

FIGS. 21A and 21B are a flowchart showing an example of a flow of a content appropriateness degree calculation processing in the second embodiment;

FIG. 22 is a block diagram showing an example of a configuration of a content processing device in a third embodiment of the invention;

FIG. 26 is a diagram showing an example of a content information table in the sixth embodiment of the invention;

FIG. 28 is a diagram showing an example of an operation log information table in the seventh embodiment of the invention;

FIG. 30 shows an experiment result of patent literature 1 at (A), shows an experiment result of patent literature 2 at (B), and shows an experiment result of the invention at (C);

FIG. 31 shows an experiment result of patent literature 1 at (A), shows an experiment result of patent literature 2 at (B), and shows an experiment result of the invention at (C);

FIG. 32 shows an experiment result of patent literature 1 at (A), shows an experiment result of patent literature 2 at (B), and shows an experiment result of the invention at (C)

DESCRIPTION OF EMBODIMENTS

Figure 1:
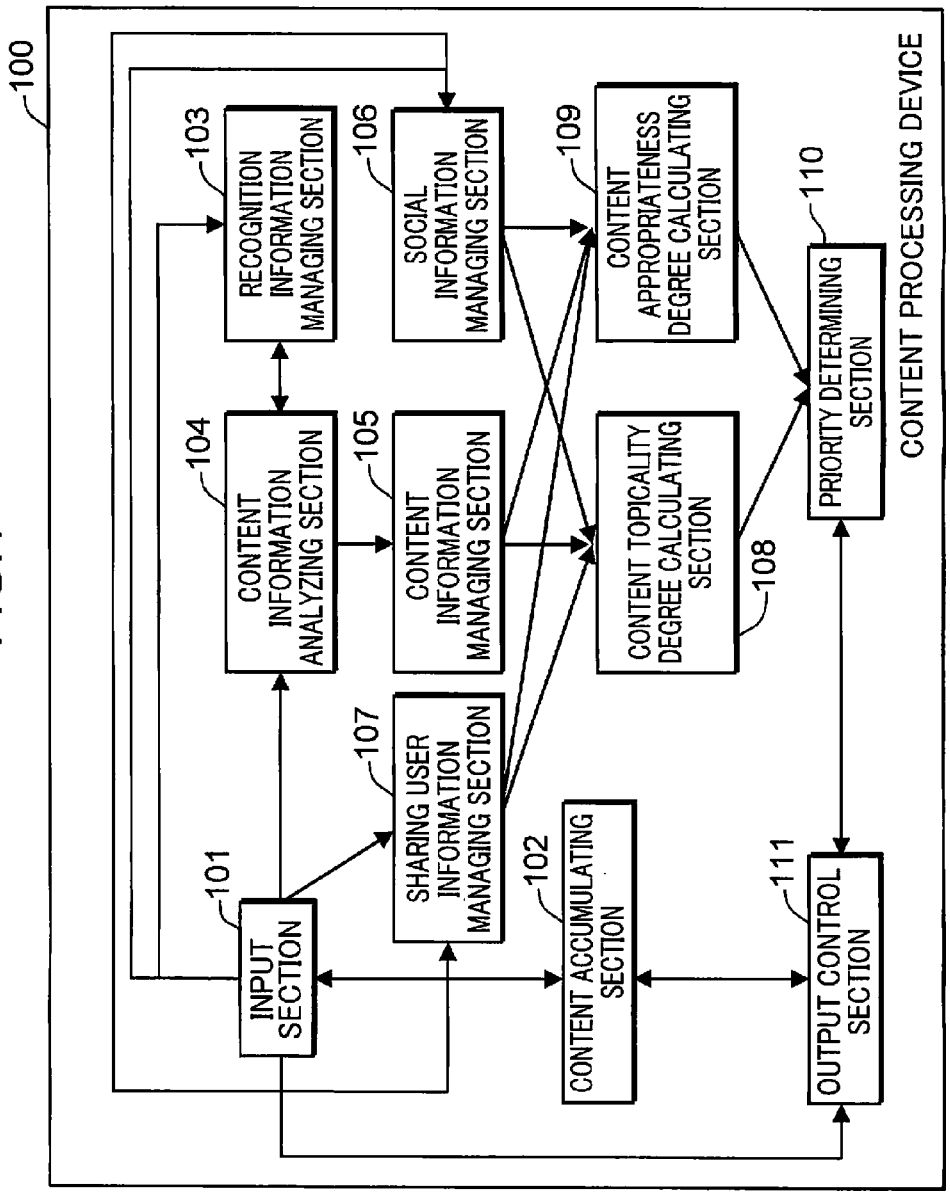
FIG. 1 is a block diagram showing an example of a configuration of a content processing device in a first embodiment of the invention.

In the following, embodiments of the invention will be described referring to the drawings. In the embodiments, elements substantially identical or equivalent to each other are denoted with the same reference signs, and a repeated description thereof is omitted herein.

First Embodiment

FIG. 1 is a block diagram showing a configuration of a content processing device 100 in the first embodiment of the invention.

Referring to FIG. 1, the content processing device 100 is provided with an input section 101, a content accumulating section 102, a recognition information managing section 103, a content information analyzing section 104, a content information managing section 105, a social information managing section 106, a sharing user information managing section 107, a content topicality degree calculating section 108, a content appropriateness degree calculating section 109, a priority determining section 110, and an output control section 111.

The content processing device 100 in the first embodiment may be configured of a personal computer or a video recorder into which an external storage medium stored with e.g. images or moving image contents is insertable; or may be configured of a digital still camera, a digital video camera, or a mobile terminal which is operable to photograph still images or moving images; or may be configured of a server device which provides a network service for content management.

The input section 101 is used for inputting a content to be processed. The input section 101 is operable to receive input of a content and transfer the received content to the content accumulating section 102. Further, the input section 101 receives input of sharing user information relating to at least one or more sharing users who share a content; and outputs the inputted information to the sharing user information managing section 107. In this example, the input section 101 may be configured of e.g. a recording medium driving device into which an external storage medium is insertable, may be configured of a camera module, may be configured of an input device such as a keyboard or a touch panel, may be configured of a wireless communication module such as an RFID (Radio Frequency Identification) reader, or may be configured of a microphone module or a touch pad.

Contents may be inputted by connecting, to the content processing device 100, an external storage medium stored with e.g. the contents in advance, and by causing the input section 101 to read out the contents recorded in the external recording medium. Further, contents may be inputted to the input section 101 with use of a wireless communication module which is incorporated in the content processing device 100.

Alternatively, contents may be inputted, on an internet site connectable to the content processing device 100 via a network, by allowing a user to select a content stored in a personal computer, a mobile device, or a storage medium such as an external hard disk, and by allowing the user to transmit the selected content to the content processing device 100 via the network.

Further alternatively, contents may be inputted by allowing a user to photograph the contents by a camera module incorporated in the content processing device 100 and by allowing the user to transfer the photographed contents to the content processing device 100. Further alternatively, contents may be inputted by recording, in an RFID tag, content information such as an URL (Uniform Resource Locator) stored with e.g. the contents in advance, by allowing the user to acquire the URL of the contents from the RFID tag with use of an RFID tag reader incorporated in the content processing device 100, and by allowing the user to access the URL via a network.

The sharing user information is inputted by e.g. photographing the face of a user with use of a camera module incorporated in the content processing device 100. In the above example, the content processing device 100 may acquire user information by executing a processing of recognizing the face of a user based on a photographed user image. Further alternatively, the sharing user information may be inputted by reading out barcode information (e.g. a QR (Quick Response) code) indicating user information stored in e.g. a user's mobile terminal, with use of a camera module incorporated in the content processing device 100.

Further alternatively, the sharing user information may be inputted by allowing a user to directly input user information to the content processing device 100 with use of a keyboard or a touch panel. Further alternatively, the sharing user information may be inputted by causing a GUI (Graphical User Interface) presented by the content processing device 100 to display the list of user informations, and by allowing a user to select the user information relating to a user with whom a content is shared, from among the user informations.

Further alternatively, the sharing user information may be inputted by allowing a user to input user information, on an internet site connectable to the content processing device 100 via a network, and by allowing the user to transmit the user information to the content processing device 100 via the network. Further alternatively, the sharing user information may be inputted by reading out user information recorded in advance in an RFID tag with use of an RFID tag reader incorporated in the content processing device 100. Further alternatively, the sharing user information may be inputted by acquiring user's voice with use of a microphone module incorporated in the content processing device 100. In the above example, the content processing device 100 may specify the sharing users by recognizing the acquired user's voice. Further alternatively, the user information may be inputted by allowing a user to input characters with use of a touch pad incorporated in the content processing device 100. In the above example, the content processing device 100 may specify the sharing users by recognizing the inputted characters.

The content accumulating section 102 accumulates the contents transferred from the input section 101 in such a format that the contents can be stored again in a storage medium configured of e.g. a hard disk or a flash memory.

The recognition information managing section 103 manages recognition information (such as a characteristic amount of a face or a characteristic amount of a general object) for recognizing subjects included in a content. The recognition information is generated by the content information analyzing section 104 to be described later.

The content information analyzing section 104 reads a content acquired by the input section 101, and analyzes subject information relating to subjects included in the content. An example of the subject information is information for specifying persons, in the case where the subjects included in the content are the persons. Analysis of the subject information can be performed by using the recognition information to be managed by the recognition information managing section 103. Further, the content information analyzing section 104 may analyze meta-information of the contents (e.g. photographing dates, photographing devices, photographing places).

In the above example, the content information analyzing section 104 may analyze a plurality of contents (content groups) inputted by the input section 101, extract meta-information of the contents, classify the content groups according to at least one or more events by the extracted meta-information, and extract users (event participant users) who participated in the events by a prescribed rule (e.g. by using a subject person included in the contents which are correlated with an event) in each of the events. Then, the content information analyzing section 104 outputs, to the content information managing section 105, the information analyzed and extracted as described above, as content information and event information.

The content information managing section 105 stores the content information and the event information outputted from the content information analyzing section 104. The details of the content information and the event information will be described later.

The social information managing section 106 manages, as social information, the relationship between the users, and a degree of intimacy as a digitized value representing intimacy between the users.

The sharing user information managing section 107 manages the sharing user information acquired by the input section 101. The details of the sharing user information will be described later.

The content topicality degree calculating section 108 calculates a content topicality degree, which is a digitized value representing a topicality degree of a content which serves as a topic between sharing users, with use of the content information to be managed by the content information managing section 105, the sharing user information (such as a user name, and information representing the position of an address of a user) to be managed by the sharing user information managing section 107 and the social information to be managed by the social information managing section 106; and outputs the calculated content topicality degree to the priority determining section 110. In this example, "content having topicality" means a content that is likely to promote conversation or serve as a subject matter of conversation between the sharing users, and a content including an idea or thought that is likely to be shared by the sharing users. An example of the "content having topicality" is a content including a large number of persons having a high degree of intimacy with a sharing user, as subject persons.

The content appropriateness degree calculating section 109 extracts an unappearing sharing user who is a sharing user but does not appear as a subject in each of the contents, with use of the subject information to be managed by the content information managing section 105 and the sharing user information to be managed by the sharing user information managing section 107; and calculates a content appropriateness degree, which is a digitized value representing a degree of appropriateness of a content to be shared between the sharing users in such a manner that the value for the content appropriateness degree decreases as the degree of intimacy between the extracted unappearing sharing user and the subject increases in the content.

Specifically, the content appropriateness degree calculating section 109 extracts, from the event information, event non-participant sharing users who are the sharing users but did not participate in the event; calculates a content appropriateness degree of the contents included in each of the events in such a manner that the value for the content appropriateness degree decreases as the number of event non-participant sharing users increases, and as the degree of intimacy between an event non-participant sharing user and an event participant user increases in the event; and outputs the calculated content appropriateness degree to the priority determining section 110 in each of the events, with use of the event participant users to be managed by the content information managing section 105 and the sharing user information to be managed by the sharing user information managing section 107.

The priority determining section 110 calculates a content evaluation value by summing up the content topicality degree calculated by the content topicality degree calculating section 108 and the content appropriateness degree calculated by the content appropriateness degree calculating section 109; determines that the priority of the content is high in the descending order of the calculated content evaluation value; and outputs the determination result to the output control section 111.

The output control section 111 controls the output of a content, based on the determination result of the priority determining section 110.

Next, operations to be performed by the content processing device 100 having the above configuration are described referring to FIGS. 2 through 14.

Figure 2:
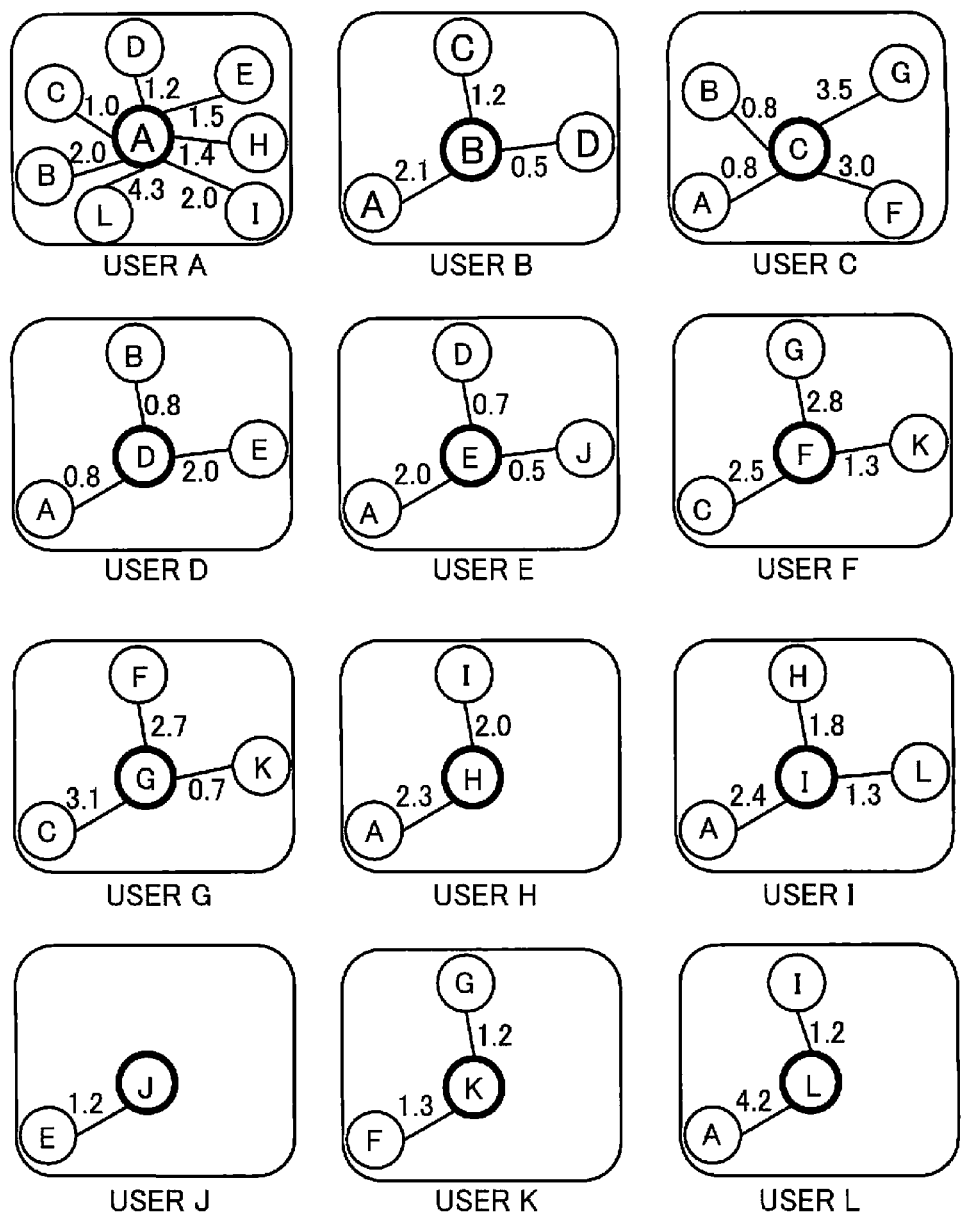
FIG. 2 is a diagram showing an example of social information of users in the first embodiment of the invention.

FIG. 2 is a diagram schematically showing the social information in the first embodiment of the invention. The social information is managed by the social information managing section 106. In the example shown in FIG. 2, regarding users "A" through "L", the user names of the users having a relationship with each other, and the degrees of intimacy between the users having a relationship are conceptually illustrated. In the example of FIG. 2, the user "A" has a relationship with respect to the user "B", the user "C", the user "D", the user "E", the user "H", the user "I", and the user "L"; and the degrees of intimacy between the user "A", and each of the users are "2.0", "1.0", "1.2", "1.5", "1.4", "2.0", and "4.3" in the appearance order. The degrees of intimacy are such that the larger the degree of intimacy is, the closer (close to 5) the relationship between the users is; and that the smaller the degree of intimacy is, the farther (close to 0) the relationship between the users is. In this example, the degree of intimacy is described in terms of numerical values from 0 to less than 5. The method for managing the degree of intimacy is not limited to the above, but may be a point system configured in such a manner that the score increases without an upper limit, or may be a system comprised of several levels such as levels A through E, whose granularity lowers stepwise. Further, the degree of intimacy with the user himself or herself is not limited to "1.0", but may be any value.

FIG. 3 is a diagram showing an example of a social information table in the first embodiment of the invention. In FIG. 3, the leftmost column describes users themselves, and the uppermost row describes partner users. The degree of intimacy between each respective user and each respective partner user is expressed in the format of a table. Further, in FIG. 3, the sign "–" is described in the cells of users who have no relationship with each other. Further, in this example, the degree of intimacy to the user himself or herself is set to "1.0". Specifically, the degree of intimacy of the user "A" with the user "A" is set to "1.0". The social information schematically shown in FIG. 2 is managed by the social information table as described above.

FIG. 4 is a diagram showing an example of contents to be inputted in the first embodiment of the invention. In FIG. 4, a still image is regarded as a content, and a content "P-001" includes the user "G" and the user "J" as subjects.

FIG. 5 is a diagram showing an example of a sharing user information table in the first embodiment of the invention. The sharing user information table is a table to be managed by the sharing user information managing section 107, and holds the sharing user information acquired by the input section 101. In the example shown in FIG. 5, the sharing user information table includes a sharing user column, and a column of information indicating the positions of addresses. The sharing user column describes the user names of the sharing users. The column of information indicating the positions of addresses describes the information indicating the positions of the addresses of the sharing users. In the example shown in FIG. 5, latitudes and longitudes are described as the information indicating the positions of the addresses of the sharing users.

FIG. 6 is a diagram showing an example of a content information table in the first embodiment of the invention. The content information table is a table to be managed by the content information analyzing section 104, and holds subject information (in this example, the subject information is described as subject person information) and meta-information of the contents acquired by the input section 101.

In the example shown in FIG. 6, the content information table is provided with a content name column, a subject person column and a photographing date column. The content name column describes the content names given to the respective contents. The subject person column describes the names of the subject persons included in the respective contents. The photographing date column describes the photographing dates indicating the generation timings of the respective contents. In this example, the photographing dates are an example of the meta-information.

FIG. 7 is a diagram showing an example of an event information table in the first embodiment of the invention. The content information table is a table generated by the content information analyzing section 104, and is managed by the content information managing section 105. The content information analyzing section 104 sets groups obtained by classifying the content groups according to a predetermined condition (in this example, photographing dates are an example), as events, with use of the information described in the content information table shown in FIG. 6; and generates the event information table shown in FIG. 7, in which the information described in the event information table shown in FIG. 6 is categorized according to the events.

Specifically, the event information table is provided with an event ID column, an event participant user column, a subject person column, and a photographing date column. The event ID column describes the event IDs given by the content information analyzing section 104 for identifying each of the events.

The event participant user column describes the user names of event participant users who participated in each of the events. The content name column describes the content names of the contents included in each of the events. The subject person column describes the user names of event participant users. The photographing date column describes the photographing dates of the respective events.

In this example, a content "P-001" and a content "P-002" whose photographing dates are Oct. 23, 2010 are classified as an event whose event ID is "E1"; the users "A", "B", "G" and "J" obtained by grouping the users "G and "J" as subject persons included in the content "P-001" and the users "A", "B" and "J" as subject persons included in the content "P-002" are specified as the event participant users of the event whose event ID is "E1". In other words, the users "A", "B", "G" and "J" as subject persons included in all the contents included in the event whose event ID is "E1" are specified as the event participant users of the event whose event ID is "E1".

Figure 8:
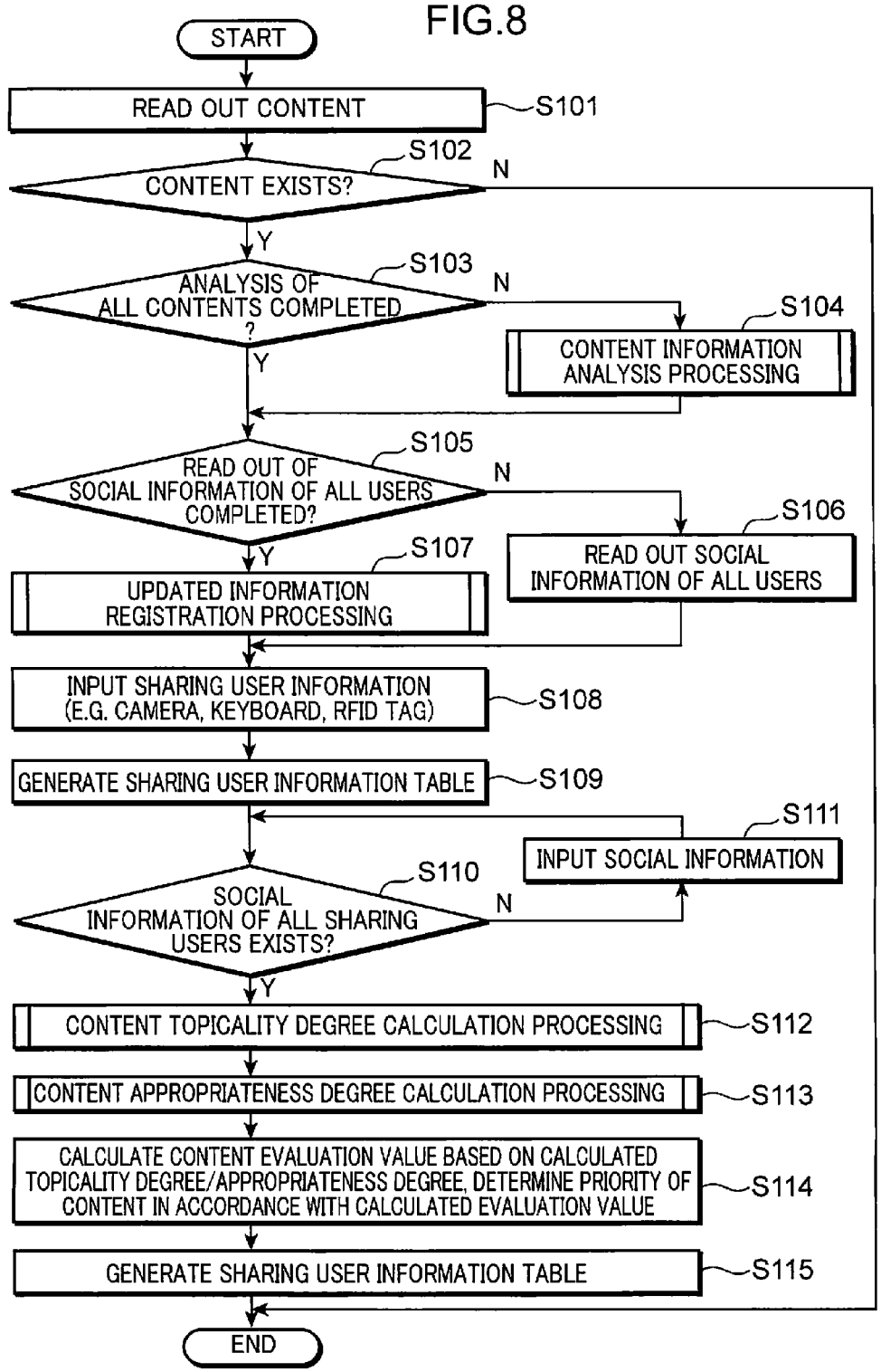
FIG. 8 is a flowchart showing an example of a flow of a content processing in the first embodiment of the invention.
Figure 9:
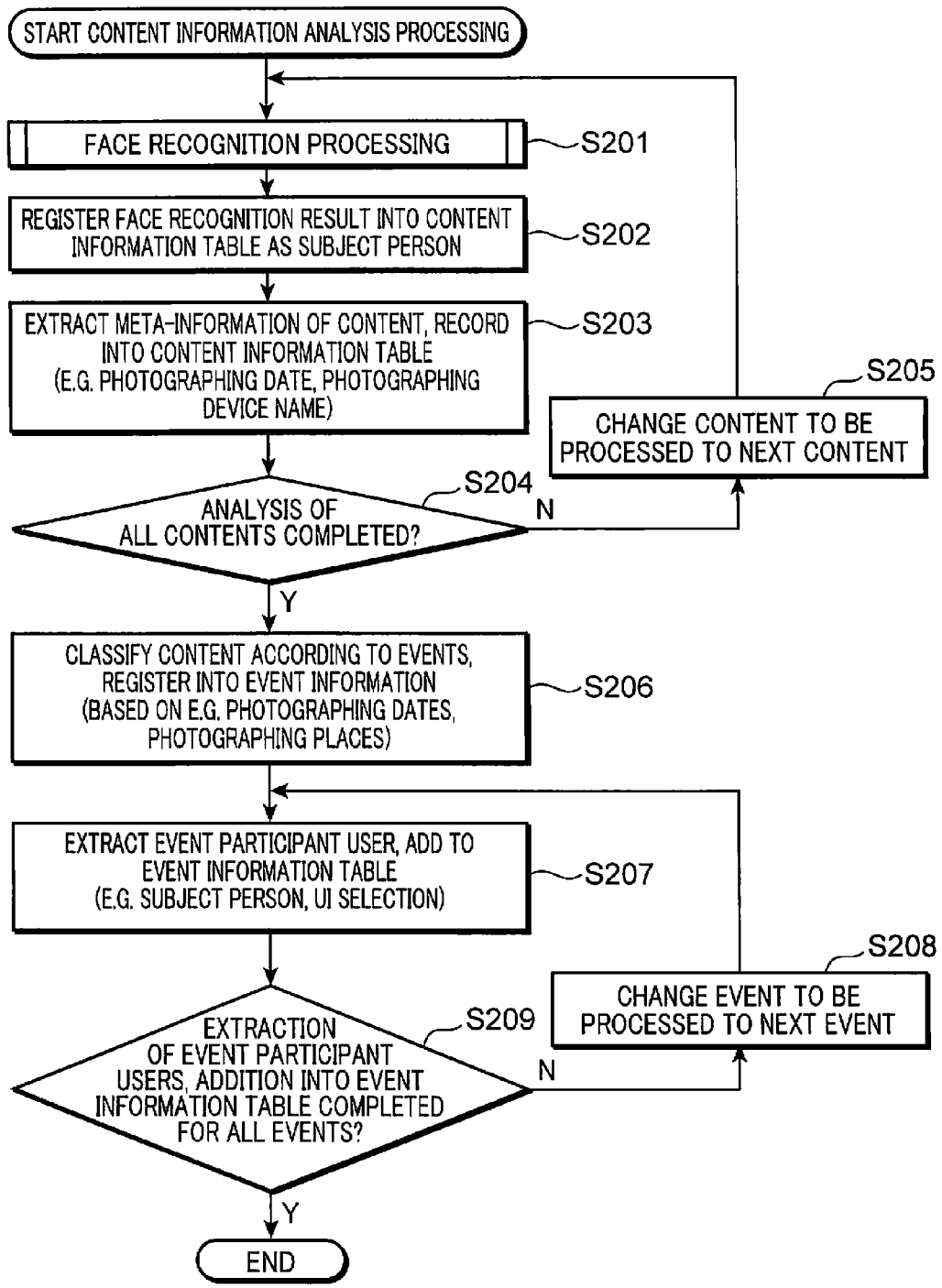
FIG. 9 is a flowchart showing an example of a flow of a content information analysis processing in the first embodiment of the invention.
Figure 10:
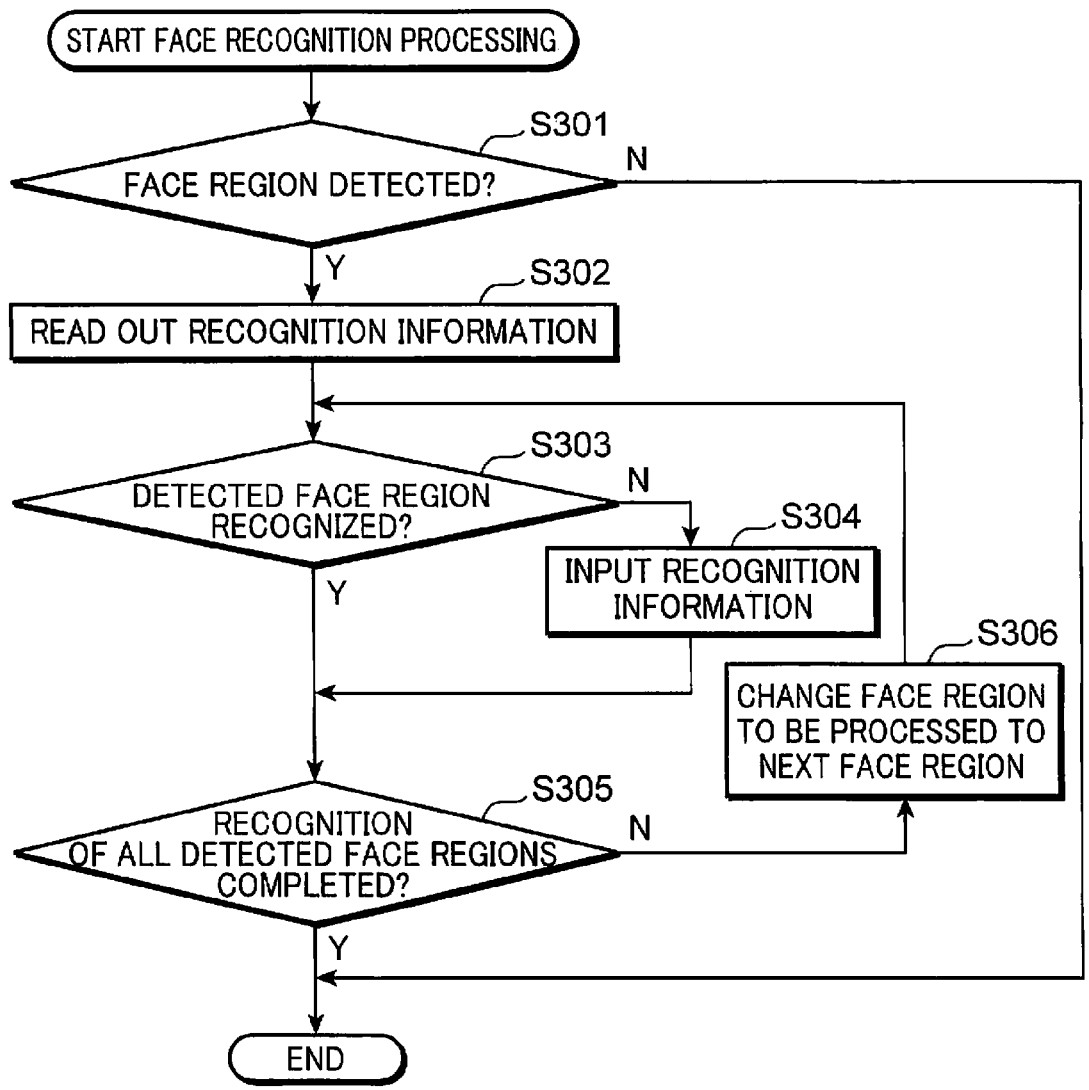
FIG. 10 is a flowchart showing an example of a flow of a face recognition processing in the first embodiment of the invention.
Figure 11:
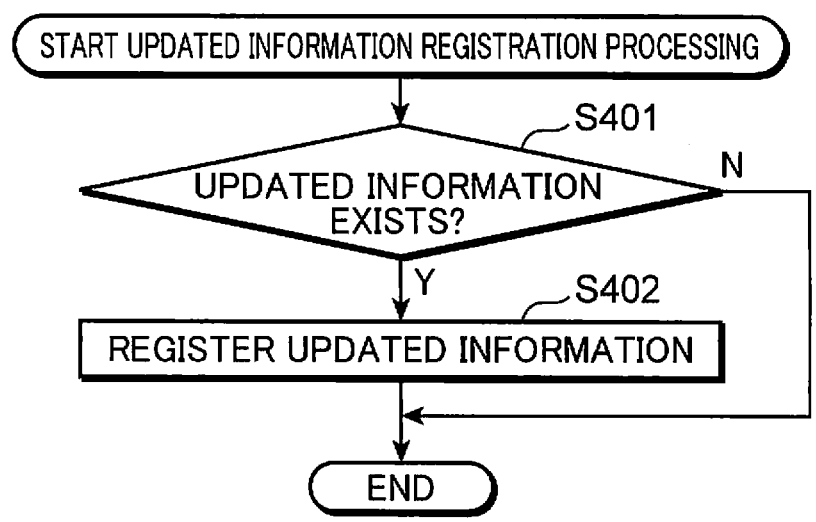
FIG. 11 is a flowchart showing an example of a flow of an updated information registration processing in the first embodiment of the invention.
Figure 12:
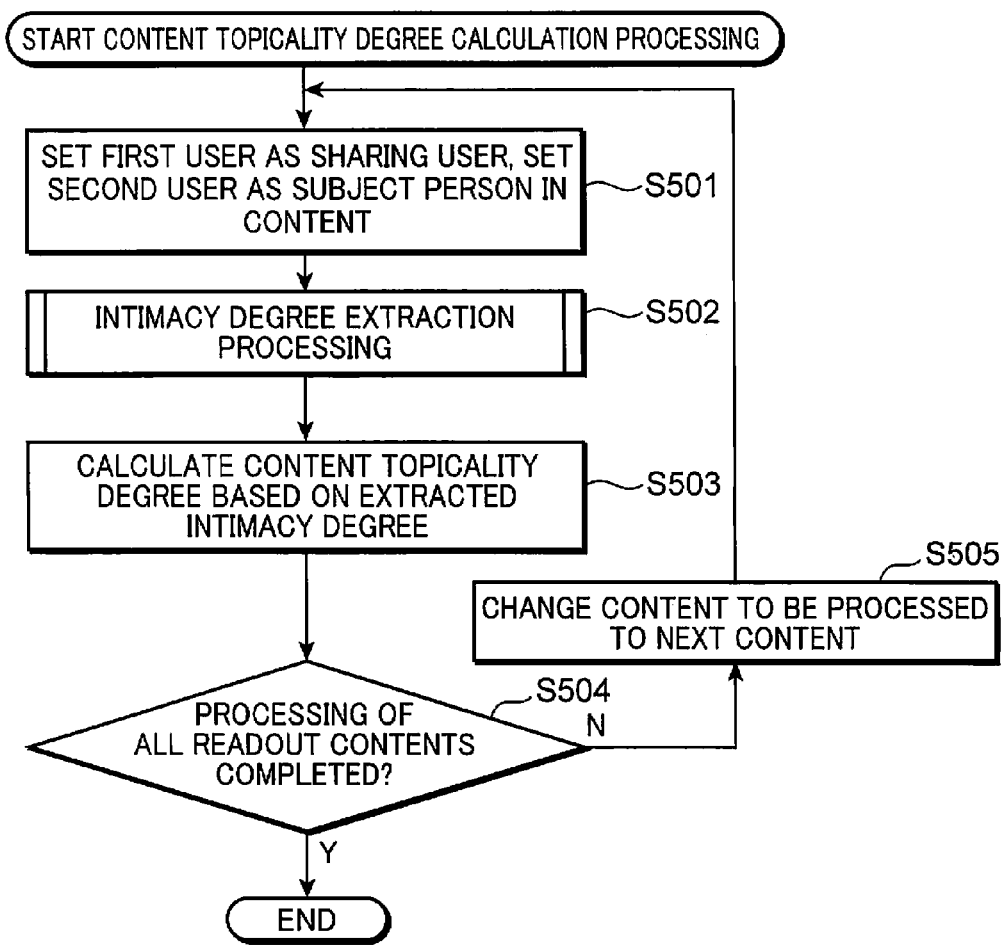
FIG. 12 is a flowchart showing an example of a flow of a content topicality degree calculation processing in the first embodiment of the invention.
Figure 13:
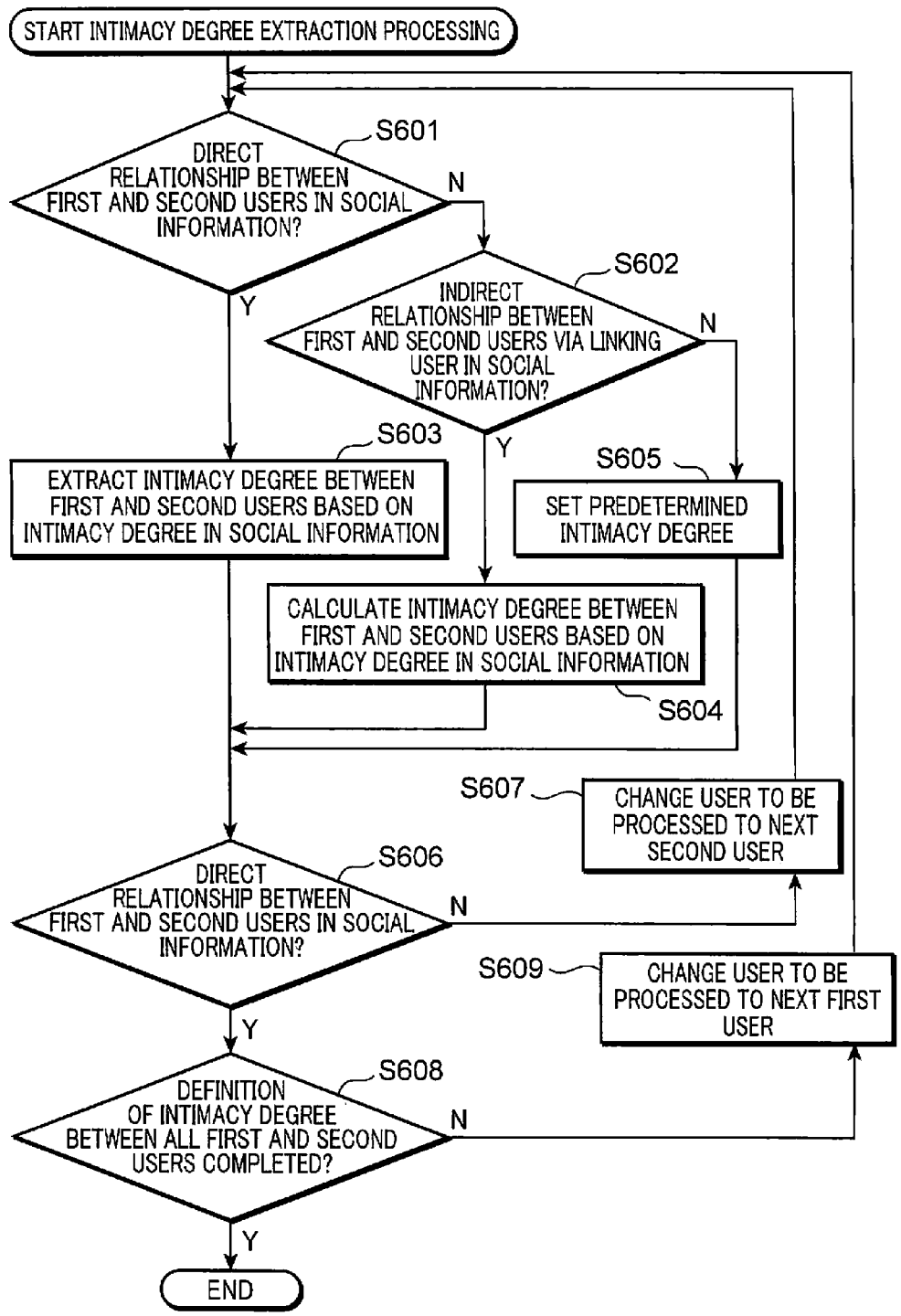
FIG. 13 is a flowchart showing an example of a flow of an intimacy degree extraction processing in the first embodiment of the invention.
Figure 14:
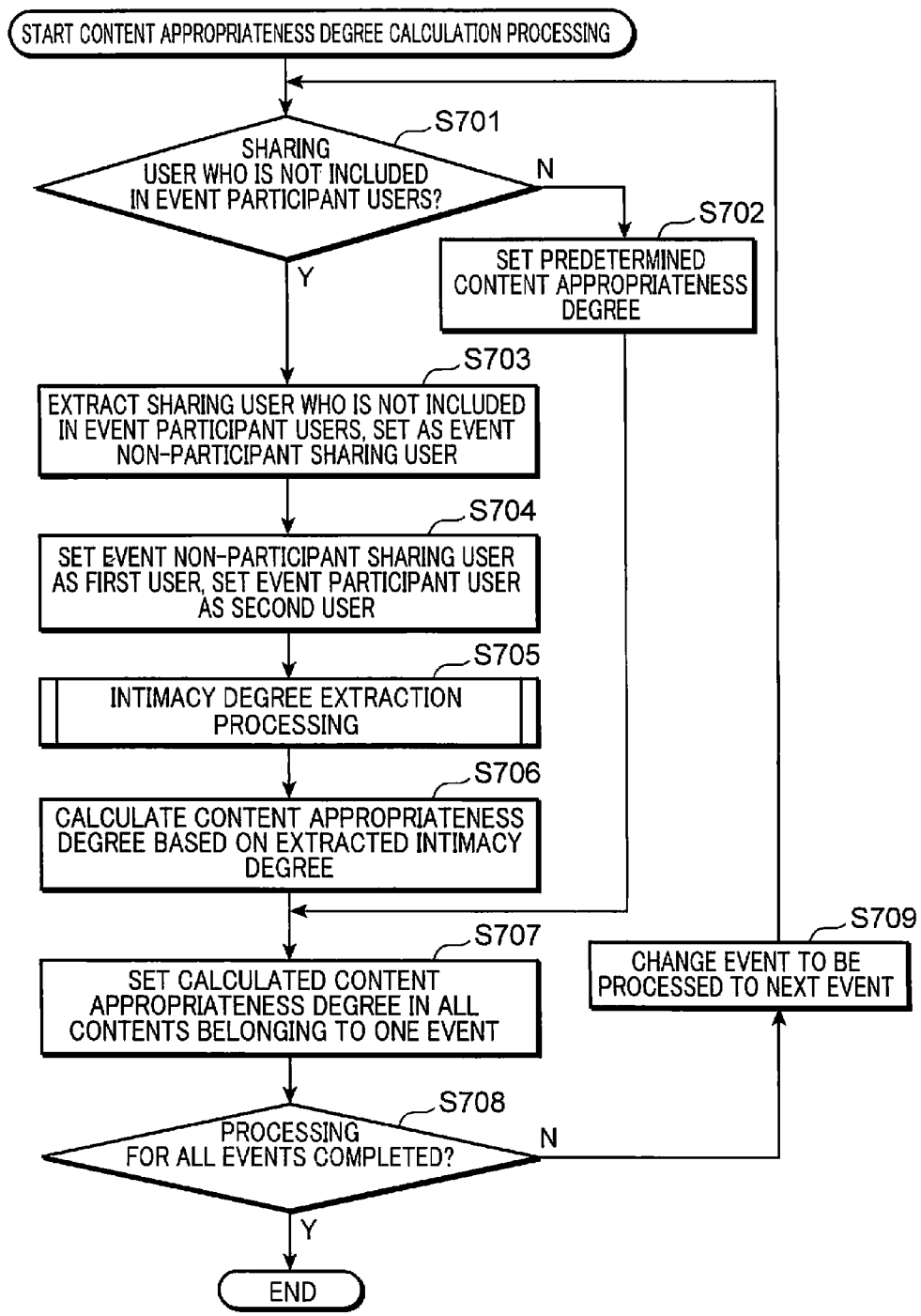
FIG. 14 is a flowchart showing an example of a flow of a content appropriateness degree calculation processing in the first embodiment of the invention.

FIG. 8 is a flowchart showing a flow of a content processing in the first embodiment of the invention. FIG. 9 is a flowchart showing a flow of a content information analysis processing in the first embodiment of the invention. FIG. 10 is a flowchart showing a flow of a face recognition processing in the first embodiment of the invention. FIG. 11 is a flowchart showing a flow of an updated information registration processing in the first embodiment of the invention. FIG. 12 is a flowchart showing an example of a flow of a content topicality degree calculation processing in the first embodiment of the invention. FIG. 13 is a flowchart showing an example of a flow of an intimacy degree extraction processing in the first embodiment of the invention. FIG. 14 is a flowchart showing an example of a flow of a content appropriateness degree calculation processing in the first embodiment of the invention.

Hereinafter, let it be assumed that the owner user of the content processing device 100 is the user "A", and the sharing users who share an inputted content are the users "A", "B" and "C". The content processing to be performed by the content processing device 100 for determining the priority of a content whose topicality degree is high and which is appropriate for sharing between the three sharing users, and for controlling the output of the content in accordance with the determined priority, is described in detail referring to FIGS. 8 through 14.

Let it be assumed that the input section 101 transfers a content inputted to the content processing device 100, to the content accumulating section 102 in advance for accumulation. In this example, the input section 101 acquires a content from an external storage medium by connecting the external storage medium stored with e.g. a content to the content processing device 100.

Then, the input section 101 receives a user's input operation, and reads out a content accumulated in the content accumulating section 102 (Step S101). An example of the input operation is depressing a button which causes to start an image reading operation.

Then, the input section 101 checks whether there exist at least one or more contents (Step S102). Then, in the case where there does not exist a content, in other words, in the case where a content is not accumulated in the content accumulating section 102 (N in Step S102), the input section 101 terminates the content processing. On the other hand, in the case where there exist at least one or more contents (Y in Step S102), the input section 101 checks whether analysis of all the contents accumulated in the content accumulating section 102 has been completed by the content information analyzing section 104 (Step S103).

In the case where analysis of all the contents has not been completed (N in Step S103), the content information analyzing section 104 performs the content information analysis processing (Step S104). The details of the content information analysis processing will be described later referring to FIGS. 9 and 10.

On the other hand, in the case where analysis of all the contents has been completed (Y in Step S103), the input section 101 checks whether readout of the social information of all the users that has been accumulated in the social information managing section 106 has been completed (Step S105). In the case where readout of the social information of all the users has not been completed (N in Step S105), the input section 101 reads out the social information of all the users from the social information managing section 106 (Step S106). On the other hand, in the case where readout of the social information of all the users has been completed (Y in Step S105), the social information managing section 106 performs an updated information registration processing (Step S107).

In this example, the updated information registration processing in Step S107 is described referring to FIG. 11. Firstly, the social information managing section 106 checks whether there exists updated information in target information (in this example, the target information indicates the social information of all the sharing users) (Step 401). In the case where there does not exist updated information (N in Step S401), the updated information processing is terminated. On the other hand, in the case where there exists updated information in the social information of a sharing user (Y in Step S401), the social information managing section 106 registers the updated information by adding the updated information to the target information (Step S402).

Referring back to FIG. 8, the sharing user information is inputted to the input section 101 (Step S108). Examples of the input section 101 are, as described above, a camera module, a keyboard and an RFID tag reader. The sharing user information is inputted to the input section 101 with use of these devices.

Then, the sharing user information managing section 107 generates the sharing user information table (see FIG. 5) with use of the sharing user information inputted to the input section 101 (Step S109), and manages the generated sharing user information table. For instance, in the case where user information is inputted with use of a camera module, the sharing user information managing section 107 performs a face recognition processing to be described later with respect to images of the users photographed by the camera module for specifying the sharing users. In this example, since the sharing users are three persons i.e. the users "A", "B" and "C", the images photographed by the camera include the faces of these three users. Thus, the sharing user information managing section 107 is operable to specify the sharing users by recognizing the faces of these three users.

Further, in the case where the sharing user information is inputted with use of a keyboard, the user names of the sharing users, and the information indicating the positions of the addresses of the sharing users are inputted. Thus, the sharing user information managing section 107 is operable to generate the user information table shown in FIG. 5 with use of these inputted information.

Further, in the case where the sharing user information is inputted with use of an RFID tag, the RFID tag reader reads the user names and the information indicating the positions of the addresses of the users that have been registered in advance in an RFID tag. Thus, the sharing user information managing section 107 is operable to generate the sharing user information table shown in FIG. 5 with use of these readout information.

Then, the sharing user information managing section 107 checks whether the social information of all the sharing users exists in the social information managing section 106 (Step S110). In the case where there does not exist the social information of all the sharing users (N in Step S110), the sharing user information managing section 107 allows the user to input the social information of the sharing users with use of the input section 101 (Step S111). Then, the input section 101 transfers the inputted social information to the sharing user information managing section 107, and returns the processing to Step S110. On the other hand, in the case where there exists the social information of all the sharing users (Y in Step S110), the content topicality degree calculating section 108 performs the content topicality degree calculation processing (Step S112). The details of the content topicality degree calculation processing will be described later referring to FIGS. 12 and 13.

Then, the content appropriateness degree calculating section 109 performs the content appropriateness degree calculation processing (Step S113). The details of the content appropriateness degree calculation processing will be described later referring to FIGS. 13 and 14.

Then, the priority determining section 110 calculates a content evaluation value by summing up the content topicality degree calculated by the content topicality degree calculating section 108 and the content appropriateness degree calculated by the content appropriateness degree calculating section 109, and determines that the priority of the content increases, as the calculated content evaluation value increases (Step S114).

In this example, there has been described a method for calculating a content evaluation value by summing up a content topicality degree and a content appropriateness degree. The method for calculating the content evaluation value is not limited to the above. As far as there is used a computation algorithm configured in such a manner that the content evaluation value increases, as the content topicality degree and the content appropriateness degree increase, any method may be used. For instance, it is possible to use a method for subtracting a content appropriateness degree from a content topicality degree, or a method for dividing a content topicality degree with a content appropriateness degree, as the method for calculating the content evaluation value.

Then, the output control section 111 outputs the contents in the descending order of the priority determined by the priority determining section 110 (Step S115). In this example, there has been described a priority determination method, wherein a content evaluation value is calculated in each of the contents, and the priority of the contents is determined to increase, as the calculated content evaluation value increases. The priority determination method is not limited to the above. For instance, the priority determining section 110 may classify the contents according to the events, with use of the meta-information of the contents; and calculate a content evaluation value in each of the events by summing up the content evaluation values of the contents included in each of the events. Then, the priority determining section 110 may determine the priority of a content included in each of the events in such a manner that the priority of the event increases, as the calculated content evaluation value increases.

With the above configuration, since the priority is determined in each of the events, the sharing users can share the contents in the descending order of the priority of the event, and the sharing users can share the contents in a more versatile sharing manner according to the event classification methods.

Next, a flow of the content information analysis processing to be performed by the content information analyzing section 104 shown in Step S104 is described referring to FIG. 9.

Firstly, the content information analyzing section 104 performs the face recognition processing (Step S201). The details of the face recognition processing will be described later referring to FIG. 10. Then, the content information analyzing section 104 specifies one of the contents to be processed, performs the face recognition processing for the specified content, and registers, into the content information table shown in FIG. 6, the name of a person whose face has been recognized in the face recognition result, as a subject person included in the content (Step S202). Then, the content information analyzing section 104 extracts, from the content, the content name and the photographing date (meta-information) of the content, and additionally registers the extracted content name and photographing date into the content information table (Step S203).

In this example, the name of a person whose face has been recognized, the content name, and the photographing date are registered into the content registration table. The information to be registered into the content information table is not limited to the above. Alternatively, the number, the size, the position, the countenance of a recognized face in the face recognition result, and the pose based on an analysis result on the framework of the subject person may be used. Further alternatively, information relating to a photographing place of a content, a photographing device name, tag information added to the content, or information relating to a content owner user who owns the content may be used as the information to be registered into the content information table. In this example, a owner user of the content processing device 100 may be determined to be the content owner user, or the content owner user may be determined based on the name of a photographing device used for photographing the content. Further alternatively, a user may be allowed to input the information relating to the content owner user with use of the input section 101.

Then, the content information analyzing section 104 checks whether the analysis processing from Step S201 to Step S203 has been completed for all the contents (Step S204). In the case where the analysis processing has not be completed (N in Step S204), the content information analyzing section 104 changes the content to be processed to a next content whose analysis processing has not been completed (Step S205), and returns the processing to Step S201. On the other hand, in the case where the analysis processing from Step S201 to Step S203 for all the contents has been completed (Y in Step S204), the content information analyzing section 104 classifies the inputted content groups according to the photographing dates, with use of the photographing dates registered in the content information table; gives an event ID unique to each of the events; and registers, into the event information table shown in FIG. 7, the event ID of each of the events, the content name of a content included in each of the events, and the photographing dates of each of the events (Step S206).

With the above configuration, a content appropriateness degree is calculated in each of the events obtained by classifying the contents according to the photographing dates. Accordingly, it is possible to evaluate the contents with use of a more accurate content appropriateness degree that reflects the information on the real world (in this example, event information obtained by classifying the content groups according to the photographing dates).

In this example, there has been described a method, wherein contents are classified into content groups with use of the photographing dates of the contents, and each of the content groups is specified as an event. The event definition method is not limited to the above. For instance, it is possible to specify, as an event, each content group obtained by classifying the contents with use of the information such as photographing places of the contents or tags added to the contents, or specify each of the contents as each of the events.

Then, the content information analyzing section 104 extracts a subject person included in each of the contents included in each of the events, as an event participant user, with use of the subject person names registered in the subject person column in the content information table and the content names registered in the content name column in the event information table; and additionally registers the user name of the extracted event participant user in the subject person column in the event information table (Step S207).

In this example, there has been described a method for specifying an event participant user in each of the events, with use of the subject persons included in a content. The event participant user definition method is not limited to the above. For instance, a user is allowed to directly input information relating to an event participant user with use of the input section 101.

Then, the content information analyzing section 104 checks whether registration of the event participant user into the event information table has been completed in all the events (Step S209). In the case where the registration has not been completed (N in Step S209), the content information analyzing section 104 changes the event to be extracted to a next event whose extraction processing has not been completed (Step S208), and returns the processing to Step S207. On the other hand, in the case where registration of the event participant users into the event information table has been completed in all the events (Y in Step S209), the content information analysis processing is terminated.

Next, the face recognition processing shown in Step S201 is described referring to FIG. 10. Firstly, the content information analyzing section 104 detects a face region from a content to be processed (Step S301). As the face recognition processing, it is possible to employ a method, wherein the recognition information managing section 103 compares between a characteristic amount of a face that is registered in advance as recognition information, and a characteristic amount of a face region of a user detected from the content to be processed, and in the case where a similarity degree between the characteristic amounts is equal to or larger than a predetermined threshold value, the face region included in the content to be processed is recognized as the face that has been registered in advance.

In the case where a face region is not detected (N in Step S301), the face recognition processing is terminated. On the other hand, in the case where a face region is detected (Y in Step S301), the content information analyzing section 104 reads out the recognition information (a characteristic amount of a face that has been registered in advance) to be managed by the recognition information managing section 103 (Step S302).

Then, the content information analyzing section 104 checks whether the detected face region is recognized by the readout recognition information (Step S303). Then, in the case where the detected face region is not recognized (N in Step S303), the input section 101 receives input of recognition information from the user (Step S304), and transfers the inputted recognition information to the recognition information managing section 103.

On the other hand, in the case where the detected face region is recognized (Y in Step S303), the content information analyzing section 104 checks whether recognition of all the detected face regions has been completed (Step S305). In the case where recognition of all the detected face regions has not been completed (N in Step S305), the content information analyzing section 104 changes the face region to be recognized to a face region whose recognition processing has not been completed (Step S306), and returns the processing to Step S303. On the other hand, in the case where recognition of all the detected face regions has been completed (Y in Step S305), the face recognition processing is terminated. In this example, the recognition information to be managed by the recognition information managing section 103 is information wherein characteristic amounts of the faces of the users who are registered in advance and the user names are correlated with each other. Accordingly, the content information analyzing section 104 is operable to specify the user names by the face recognition processing.

Next, a flow of the content topicality degree calculation processing shown in Step S112 is described referring to FIG. 12. Firstly, the content topicality degree calculating section 108 extracts, from the social information table (see FIG. 3), a degree of intimacy between a sharing user who is registered in the sharing user information table (see FIG. 5) and a subject person included in the content to be processed, which is registered in the content information table (see FIG. 6). Then, the content topicality degree calculating section 108 sets a first user as the sharing user, sets a second user as the subject person (Step S501), and performs the intimacy degree extraction processing (Step S502). The details of the intimacy degree extraction processing will be described later referring to FIG. 13.

Then, the content topicality degree calculating section 108 calculates a content topicality degree of all the sharing users (Step S503). The content topicality degree is a digitized value representing a topicality degree of a content (content having topicality) which is likely to promote conversation or serve as a subject matter of conversation between the sharing users, and a content including an idea or thought that is likely to be shared between the sharing users. In this example, the content topicality degree is set in such a manner that a larger value is set in a content including a larger number of persons who have a high degree of intimacy with respect to the sharing user, as subject persons included in the content. This is based on the idea that a content including a large number of friends having a high degree of intimacy with respect to a certain sharing user is likely to promote conversation or serve as a subject matter of conversation between the sharing users.

In view of the above, the content topicality degree calculating section 108 calculates a content topicality degree of each of the sharing users by summing up the degrees of intimacy between the sharing users and the subject persons included in a content to be processed; and calculates a content topicality degree of all the sharing users by summing up the calculated content topicality degrees of the respective sharing users.

Then, the content topicality degree calculating section 108 checks whether the content topicality degree calculation processing has been completed in all the readout contents (Step S504). In the case where the content topicality degree calculation processing has not been completed (N in Step S504), the content topicality degree calculating section 108 changes the content to be processed to a next content whose content topicality degree calculation processing has not been completed (Step S505), and returns the processing to Step S501. On the other hand, in the case where the content topicality degree calculation processing in all the readout contents has been completed (Y in Step S504), the content topicality degree calculation processing is terminated.

In the following, a concrete example of the content topicality degree calculation processing is described. For instance, a content topicality degree with respect to a content "P-003" of the sharing user "A" can be calculated as follows, with use of the degrees of intimacy shown in FIG. 2.

$$\begin{pmatrix} \text{content topicality degree of} \\ \text{user "}A\text{" with respect to content "}P\text{-003"} \end{pmatrix} =$$

$$\begin{pmatrix} \text{degree of intimacy of} \\ \text{user "}A\text{" with respect to user "}A\text{"} \end{pmatrix} +$$

(degree of intimacy of user "A" with respect to user "H") +

(degree of intimacy of user "A" with respect to user "I") =

$$1.0 + 1.4 + 2.0 = 4.4$$

In this example, there has been described a method for calculating a content topicality degree of a certain sharing user by summing up the degrees of intimacy between a certain sharing user and the respective subject persons included in a content to be processed. The method is not limited to the above. For instance, as far as there is used a computation algorithm configured in such a manner that the content topicality degree increases, as the number of subject persons having a high degree of intimacy with respect to a certain sharing user increases in a content, the content topicality degree may be calculated with use of other computation approach such as subtraction or division, in addition to summation.

Further alternatively, the content topicality degree calculating section 108 may acquire the size, the position, the countenance of the face of a subject person included in the content analyzed by the content information analyzing section 104, and the pose based on an analysis result on the framework of the subject person; apply weighting to the degree of intimacy between a certain sharing user and each of the subject persons included in the content to be processed, based on these information; and calculate a content topicality degree of the certain sharing user by summing up the weighted degrees of intimacy.

As the weighting method, it is possible to employ a method, wherein the value of weighting increases, as the size of the face increases, the position of the face is located at a position closer to the center position in the content, the subject person looks more smiling, or the subject person looks with an active pose in terms of the framework.

With the above configuration, in calculating the content topicality degree, the degree of intimacy is weighted based on appearance information on a subject person such as the size, the position, the countenance of a subject person included in a content, and the pose based on an analysis result on the framework of the subject person. Accordingly, for instance, it is possible to prioritize output of a content including a subject person with better appearance among the contents including the subject person.

For instance, let it be assumed that a calculated content topicality degree of the user "B" with respect to the content "P-003" is "5.1", and a calculated content topicality degree of the user "C" with respect to the content "P-003" is "1.2". Then, it is possible to calculate a content topicality degree of all the sharing users "A", "B" and "C" with respect to the content "P-003" as follows.

$$\begin{pmatrix} \text{content topicality degree of all the sharing} \\ \text{users "}A\text{","}B\text{" and "}C\text{" with respect to the content "}P\text{-003"} \end{pmatrix} =$$

$$\begin{pmatrix} \text{content topicality degree of} \\ \text{user "}A\text{" with respect to content "}P\text{-003"} \end{pmatrix} +$$

$$\begin{pmatrix} \text{content topicality degree of} \\ \text{user "}B\text{" with respect to content "}P\text{-003"} \end{pmatrix} +$$

$$\begin{pmatrix} \text{content topicality degree of} \\ \text{user "}C\text{" with respect to content "}P\text{-003"} \end{pmatrix} =$$

$$4.4 + 5.1 + 1.2 = 10.7$$

In this example, there has been described a method for calculating a content topicality degree of all the sharing users by calculating a content topicality degree of each of the sharing users, and summing up the calculated content topicality degrees. The method is not limited to the above. As far as there is used a computation algorithm configured in such a manner that the content topicality degree of all the sharing users increases, as the content topicality degree of each of the sharing users increases, it is possible to calculate a content topicality degree of all the sharing users with use of other method such as subtraction or division.

Alternatively, it is possible to calculate a content topicality degree of all the sharing users by applying weighting to a content topicality degree of each of the sharing users, taking into consideration of the degrees of intimacy of a content owner user with respect to the respective sharing users.

With the above configuration, it is possible to prioritize output of a content having a particularly high topicality degree for a content owner user, taking into consideration of the content topicality degrees of all the sharing users.

In the above example, let it be assumed that the weighting value of the user "A" with respect to the user "A" is "2.0", the weighting value of the user "A" with respect to the user "B" is "1.0", and the weighting value of the user "A" with respect to the user "C is "0.5". Then, it is possible to calculate a content topicality degree of all the sharing users "A", "B" and "C" with respect to the content "P-003" as follows.

$$\begin{pmatrix} \text{content topicality degree of all} \\ \text{sharing users "}A\text{","}B\text{" and "}C\text{" with} \\ \text{respect to content "}P\text{-003"} \end{pmatrix} =$$

(weighting value of user "A" with respect to user "A") *

$$\begin{pmatrix} \text{content topicality degree of} \\ \text{user "}A\text{" with respect to content "}P\text{-003"} \end{pmatrix} +$$

(weighting value of user "A" with respect to user "B") *

$$\begin{pmatrix} \text{content topicality degree} \\ \text{of user "}B\text{" with respect to content "}P\text{-003"} \end{pmatrix} +$$

(weighting value of user "A" with respect to user "C") *

$$\begin{pmatrix} \text{content topicality degree} \\ \text{of user "}C\text{" with respect to content "}P\text{-003"} \end{pmatrix} =$$

$$2.0*4.1 + 1.0*5.1 + 0.5*1.2 = 14.5$$

Next, a flow of the intimacy degree extraction processing shown in Step S502 is described referring to FIG. 13. Firstly, it is checked whether the first user and the second user have a direct relationship with each other in the social information table (in the content topicality degree calculation processing, the first user is described as a sharing user and the second user is described as a subject person included in a content to be processed) (Step S601). In this example, the expression "having a direct relationship with each other" means that a value of intimacy degree is set in FIG. 3. For instance, a value of intimacy degree is set between the sharing user "A" and the user "H", who is one of the subject persons in the content "P-003". Accordingly, the user "A" and the user "H" have a direct relationship with each other, and the degree of intimacy of the sharing user "A" with respect to the user "H" is "1.4".

In the case where there is no direct relationship between a certain sharing user and a certain subject person in the social information (N in Step S601), it is checked whether the certain sharing user and the certain subject person have an indirect relationship with each other via another user in the social information (Step S602). In this example, the expression "having an indirect relationship with each other" means that although a sharing user does not have a direct relationship with respect to a certain user, the sharing user has a relationship with respect to the certain user via another user who has a direct relationship with respect to the sharing user.

Specifically, referring to FIG. 3, a value of intimacy degree is not set between the user "B" and the user "H", and accordingly, the user "B" and the user "H" have no direct relationship with each other. However, the user "B" has a certain degree of intimacy with the user "A", and has a direct relationship with respect to the user "A". Further, the user "A" has a certain degree of intimacy with respect to the user "H", and has a direct relationship with respect to the user "H". In other words, the user "B" has a relationship with respect to the user "H" via the user "A" who has a direct relationship with respect to the user "B". Thus, in this example, it is said that the user "B" has an indirect relationship with respect to the user "H".

On the other hand, in the case where a certain sharing user and a certain subject person have a direct relationship with each other in the social information (Y in Step S601), a degree of intimacy between the certain sharing user and the certain subject person is extracted, with use of the intimacy degrees in the social information (Step S603).

Further, in the case where there is no indirect relationship between a certain sharing user and a certain subject person via another user in the social information (N in Step S602), a predetermined value is set as the intimacy degree (Step S605). In this example, in the case where a user who has no relationship with respect to a certain sharing user is included in the subject persons in the content to be processed, it is possible to use a value for decreasing the content topicality degree of the content to be processed, as the predetermined value. For instance, the degree of intimacy may be "−5.0", or a value smaller than a lowest degree of intimacy among the degrees of intimacy of a certain sharing user with respect to all the users, which are directly or indirectly calculatable with use of the social information.

On the other hand, in the case where there is an indirect relationship between a certain sharing user and a certain subject person with each other via another user in the social information (Y in Step S602), a degree of intimacy between the certain sharing user and the certain subject person is calculated with use of the intimacy degrees in the social information (Step S604).

For instance, the sharing user "B" and one of the subject persons in the content "P-003" i.e. the user "H" do not have a direct relationship with each other in the social information shown in FIG. 2, but have an indirect relationship with each other via another user i.e. the user "A". In view of this, a degree of intimacy of the sharing user "B with respect to the user "H" is calculated, with use of the degree of intimacy of the sharing user "B" with respect to the user "A" and the degree of intimacy of the user "A" with respect to the user "H" which are extractable from the social information.

In the calculation, for instance, a degree of intimacy of the user "B" with respect to the user "H" is calculated with use of a computation algorithm configured in such a manner that the degree of intimacy of the user "B" having a direct relationship with respect to the user "A" increases with respect to the user "H", as the degree of intimacy of the user "A" with respect to the user "H" increases. This is based on the idea that among the friends of the friends of a user, a person who has a closer relationship with respect to the user's friends is supposed to have a closer relationship with respect to the user himself or herself. In addition to the above, in view of the point that the user "B" and the user "H" merely have an indirect relationship with each other, the degree of intimacy between the user "B" and the user "H" is calculated with use of a computation algorithm configured in such a manner that the degree of intimacy between the user "B" and the user "H" does not exceed the degree of intimacy between the user "B" and the user "A" who have a direct relationship with each other.

Specifically, it is possible to calculate a degree of intimacy of the user "B" with respect to the user "H" as follows.

$$(\text{degree of intimacy of sharing user } "B" \text{ with respect to user } "H") =$$
$$(\text{degree of intimacy of sharing user } "B" \text{ with respect to user } "A") -$$
$$(1/(\text{degree of intimacy of user } "A" \text{ with respect to user } "H") =$$
$$2.1 - (1/1.4) \approx 1.39$$

In this example, firstly, a degree of intimacy of the user "A" with respect to the user "H" is subtracted from a degree of intimacy of the user "B" with respect to the user "A" in such a manner that the degree of intimacy of the user "B" with respect to the user "H" does not exceed the degree of intimacy of the user "B" with respect to the user "A". In addition to the above, an inverse of the degree of intimacy of the user "A" with respect to the user "H" is subtracted from the degree of intimacy of the user "B" with respect to the user "A" in such a manner that the degree of intimacy of the user "B" with respect to the user "H" increases, as the degree of intimacy of the user "A" with respect to the user "H" increases.

With the above configuration, it is possible to calculate a degree of intimacy between users, even if the users do not have a direct relationship with each other in the social information, and to use the calculated intimacy degree for calculation of a content topicality degree and a content appropriateness degree. Thus, for instance, even if a content includes a user who has no direct relationship with respect to a certain sharing user, the priority of the content increases, as far as the user has an indirect relationship with respect to the sharing user, and the degree of intimacy between the user and the sharing user is sufficiently large. On the other hand, even if a content includes a user who has an indirect relationship with respect to the sharing user, if the content has a low degree of intimacy between the user and the sharing user, the priority of the content is lowered. In this way, in the embodiment, it is possible to determine the priority of a content to be outputted, while reflecting the social information of more versatile users.

The aforementioned method for calculating a degree of intimacy between the users who have an indirect relationship with each other is merely an example. Alternatively, it is possible to use another calculation method with use of social information about the users who have a direct relationship with each other, or to specify the degree of intimacy between the users who have no direct relationship with each other as "zero" in any condition.

Further, referring to FIG. 2, for instance, the sharing user "C" and the user "D" have an indirect relationship with each other via the user "A" or the user "B". In the case where there exist plural linking users as described above, it is possible to calculate a degree of intimacy of the sharing user "C" with respect to the user "D" along each of the routes (in this example, along the route of "C"→"A"→"D", and along the route of "C"→"B"→"D"); and specify an average value of the calculated degrees of intimacy, as a degree of intimacy of the sharing user "C" with respect to the user "D", or specify a larger value or a small value out of the calculated two degrees of intimacy, as a degree of intimacy of the sharing user "C" with respect to the user "D".

Then, it is checked whether specifying a degree of intimacy of a certain sharing user with respect to all the subject persons included in the content to be processed has been completed (Step S606). In the case where specifying has not been completed (N in Step S606), a subject person whose degree of intimacy with respect to the certain sharing user is to be calculated is changed to a next subject person whose intimacy degree calculation processing has not been completed (Step S607), and the processing is returned to Step S601. On the other hand, in the case where specifying a degree of intimacy of the certain sharing user with respect to all the subject persons in the content to be processed has been completed (Y in Step S606), it is checked whether the definition of a degree of intimacy with respect to a subject person in the content to be processed has been completed in all the sharing users (Step S608). In the case where specifying the degree of intimacy has not been completed (N in Step S608), the sharing user whose degree of intimacy with respect to a subject person is to be calculated is changed to a next sharing user whose intimacy degree calculation processing has not been completed (Step S609), and the processing is returned to Step S601. On the other hand, in the case where specifying the degree of intimacy with respect to a subject person in the content to be processed has been completed (Y in Step S608), the intimacy degree calculation processing is terminated.

Next, a flow of the content appropriateness degree calculation processing shown in Step S113 is described referring to FIG. 14. The content appropriateness degree is a digitized value representing a degree of appropriateness of a content to be shared between the sharing users. In this example, there is proposed a configuration that as the number of non-participant sharing users who did not participate in an event corresponding to a content group obtained by classifying the contents increases, and as the degree of intimacy between a sharing user and an event participant user increases, the content appropriateness degree of a content included in the event decreases. This is based on the idea that in the case where a certain sharing user did not participate in an event, the sharing user may feel uncomfortable when many friends who have a close relationship with respect to the sharing user participated in the event by way of a content included in the event.

In view of the above, in this example, a content appropriateness degree calculation processing is performed by extracting an event non-participant sharing user in each of the events, calculating a degree of intimacy of the event non-participant sharing user with respect to an event participant user, and using a computation algorithm configured in such a manner that the content appropriateness degree decreases, as the calculated intimacy degree increases.

As an example of the content appropriateness degree calculation processing, firstly, degrees of intimacy between all the extracted event non-participant sharing users and all the extracted event participant users are calculated. Then, a value of the calculated intimacy degree whose sign is inverted is set to a content appropriateness degree of each of the event non-participant sharing users in such a manner that the content appropriateness degree decreases, as the calculated intimacy degree increases. Then, the content appropriateness degree of each of the event non-participant sharing users is summed up for calculating a content appropriateness degree of all the event non-participant sharing users.

Further, the content appropriateness degree in the present example is set in view of appropriateness in sharing a content by the event non-participant sharing users, and is not set in view of appropriateness of a content for the sharing users who participated in the event. In view of the above, in this example, the content appropriateness degree for all the event non-participant sharing users is specified as the content appropriateness degree for all the sharing users.

Firstly, the content appropriateness degree calculating section 109 checks whether there exists a sharing user who is not included in the event participant users of a certain event which is registered in the event information table (see FIG. 7) and which is to be processed, among the sharing users registered in the sharing user information table (see FIG. 5) (Step S701). In the case where there does not exist a sharing user who is not included in the event participant users (N in Step S701), in other words, in the case where all the sharing users have participated in the event to be processed, the content appropriateness degree calculating section 109 sets the content appropriateness degree to a predetermined value (Step S702), and proceeds the processing to Step S707. In this example, the predetermined value is a value whose content appropriateness degree of a content included in the event in which all the sharing users have participated is highest, among all the calculated content appropriateness degrees. Specifically, the predetermined value may be "zero", or a value larger than the content appropriateness degree for all the sharing users, which has been calculated in the case where there exists a sharing user who is not included in the event participant users.

On the other hand, in the case where there exists a sharing user who is not included in the event participant users (Y in Step S701), in other words, in the case where one of the sharing users has not participated in the event to be processed, the content appropriateness degree calculating section 109 extracts a sharing user who is not included in the event participant users, and sets the extracted sharing user as an event non-participant sharing user (Step S703).

Then, the content appropriateness degree calculating section 109 sets the event non-participant sharing user as a first user, sets the event participant user as a second user (Step S704), and performs the intimacy degree extraction processing (Step S705). Since the above processing is substantially the same as the content topicality degree calculation processing of Step S112, which has been described referring to FIG. 13, description thereof is omitted herein.

Then, the content appropriateness degree calculating section 109 performs the content appropriateness degree calculation processing, based on the aforementioned example of the content appropriateness degree calculation processing. Specifically, the content appropriateness degree calculating section 109 calculates a content appropriateness degree of all the event non-participant sharing users by inverting the sign of a value obtained by summing up the degrees of intimacy between the extracted event non-participant sharing users and the extracted event participant users (namely, by multiplying with −1), calculating a content appropriateness degree of each of the event non-participant sharing users, and summing up the calculated degrees of intimacy of the event non-participant sharing users; and specifies the calculated content appropriateness degree as a content appropriateness degree of all the sharing users (Step S706).

Then, the content appropriateness degree calculating section 109 sets the calculated content appropriateness degree to a content appropriateness degree of all the contents included in the event to be processed (Step S707).

The aforementioned content appropriateness degree calculation method is merely an example. Alternatively, it is possible to use another computation method such as integration or division, as far as there is used a computation algorithm for obtaining a content appropriateness degree, taking into consideration of the relationships between all the event non-participant sharing users and all the event participant users.

Then, the content appropriateness degree calculating section 109 checks whether the content appropriateness degree calculation processing has been completed in all the events (Step S708). Then, in the case where the content appropriateness degree calculation processing has not been completed in all the events (N in Step S708), the content appropriateness degree calculating section 109 changes the event whose content appropriateness degree calculation processing is to be performed to a next event whose content appropriateness degree calculation processing has not been completed (Step S709), and returns the processing to Step S701. On the other hand, in the case where the content appropriateness degree calculation processing has been completed in all the events (Y in Step S708), the content appropriateness degree calculation processing is terminated.

In the following, there is described a concrete example of the content appropriateness degree calculation processing. For instance, in the event having the event ID "E1", as shown in FIG. 7, the event participant users are four persons i.e. the users "A", "B", "G" and "J"; and a sharing user who is not included in the event participant users i.e. event non-participant sharing users is one person i.e. the user "C". It is possible to calculate a content appropriateness degree of the event non-participant sharing user "C" with respect to the event having the event ID "E1" as follows, with use of the degrees of intimacy between the user "C" and the event participant users. The content appropriateness degree calculation method in this example is based on the aforementioned example of the content appropriateness degree calculation processing.

$$\begin{pmatrix} \text{content appropriateness degree} \\ \text{of event non-participant sharing user } ''C'' \text{ with} \\ \text{respect to event having } ID \text{ } ''E1'' \end{pmatrix} =$$

$$\begin{pmatrix} (\text{degree of intimacy of user } ''C'' \text{ with respect to user } ''A'') + \\ (\text{degree of intimacy of user } ''C'' \text{ with respect to user } ''B'') + \\ (\text{degree of intimacy of user } ''C'' \text{ with respect to user } ''G'') + \\ (\text{degree of intimacy of user } ''C'' \text{ with respect to user } ''J'') \end{pmatrix} *$$

$$(-1) = (0.8 + 0.8 + 3.5 + \left( \left( \begin{array}{c} \text{degree of intimacy of user } ''C'' \text{ with} \\ \text{respect to user } ''A'' \end{array} \right) - \right.$$

$$1 \bigg/ \left( \begin{array}{c} \text{degree of intimacy of} \\ \text{user } ''A'' \text{ with respect to user } ''E'' \end{array} \right) -$$

$$1 \bigg/ \left( \begin{array}{c} \text{degree of intimacy of} \\ \text{user } ''E'' \text{ with respect to user } ''J'' \end{array} \right) \bigg) * (-1) =$$

$$(5.1 + (0.8 - 1/1.5 - 1/0.5)) * (-1) \approx -3.2$$

In the above example, since the event non-participant sharing users is only one person i.e. the user "C", the content appropriateness degree of the event having the event ID "E1" for all the sharing users is also "−3.2". Further, the calculated content appropriateness degree is set as a content appropriateness degree of all the contents included in the event to be processed. Accordingly, the content appropriateness degrees of the contents "P-001" and "P-002", which are the contents included in the event having the event ID "E1" are respectively "−3.2" and "−3.2". In the case where there exist plural event non-participant sharing users, a value obtained by summing up all the content appropriateness degrees of the event non-participant sharing users is set as the content appropriateness degree for all the sharing users.

In this example, there has been described a method for calculating a content appropriateness degree of the event having the event ID "E1" for the event non-participant sharing user "C" by summing up the degree of intimacy of the event non-participant sharing user "C" with respect to the event participant user "A", the degree of intimacy of the user "C" with respect to the user "B, the degree of intimacy of the user "C" with respect to the user "G", and the degree of intimacy of the user "C" with respect to the user "J". This is merely an example. Alternatively, it is possible to calculate a content appropriateness degree by applying weighting to the thus calculated content appropriateness degree, taking into consideration of the degrees of intimacy of the content owner user with respect to event non-participant sharing users.

Specifically, the content appropriateness degree calculating section 109 determines whether a degree of intimacy between an event non-participant sharing user and the content owner user in a certain event is equal to or larger than a predetermined threshold value, in other words, whether the event non-participant sharing user and the content owner user have a very close relationship with each other. Then, in the case where the degree of intimacy between the event non-participant sharing user and the content owner user is equal to or larger than the predetermined threshold value, the content appropriateness degree calculating section 109 presumes that there is no problem in sharing a content included in the event, and applies weighting to the content appropriateness degree in such a manner that the content appropriateness degrees of all the contents included in the event increase, regardless of the degree of intimacy between an event non-participant sharing user and an event sharing user. With this configuration, the event non-participant sharing user is allowed to share the contents as many as possible, taking into consideration of the relationship with respect to the content owner user.

The method for applying weighting to the content appropriateness degree is not limited to the above. For instance, the content appropriateness degree calculating section 109 may allow a user to input, to the input section 101, information indicating the position of the address of a sharing user, and to calculate a distance between the position of the address of an event non-participant sharing user and the position of the photographing place of a content, with use of the information indicating the position of the address of the event non-participant sharing user and the information indicating the position of the photographing place of the content analyzed by the content information analyzing section 104, among the information indicating the positions of the addresses of the inputted sharing users. Then, the content appropriateness degree calculating section 109 may apply weighting to the content appropriateness degree in such a manner that the content appropriateness degree of a content having a calculated distance which is equal to or larger than a predetermined threshold value increases, regardless of the degree of intimacy between an event non-participant sharing user and an event participant user.

With the above configuration, in the case where a distance between the photographing place of a certain content i.e. the position of the photographing place of one scene in a certain event, and the position of the address of an event non-participant sharing user is equal to larger than a predetermined threshold value, and participation of the event non-participant sharing user in the event is physically difficult, it is presumed that there is no problem in sharing the content, and the content appropriateness degree is weighted in such a manner that the content appropriateness degree of the content increases. Thus, the event non-participant sharing user is allowed to share the contents as many as possible, taking into consideration of the distance between the address of the event non-participant sharing user and the event holding place.

With the above configuration, a content evaluation value is calculated with use of a content topicality degree and a content appropriateness degree, the priority of a content is determined in the descending order of the content evaluation value, and the contents are outputted by the order of priority. Accordingly, it is possible to prioritize output of a content whose topicality degree is high, and which is appropriate for sharing between all the users sharing the content. Further, since the contents are automatically outputted by the order of priority, it is possible to reduce a user's operation load (a work and a time required for a user to select a content by himself or herself) in sharing the content.

The aforementioned example has been described based on the premise that the sharing users are multiple persons. The sharing users may not be multiple persons. Even if the sharing users is only one person, it is possible to calculate a content topicality degree and a content appropriateness degree by the configuration of the first embodiment.

For instance, let it be assumed that the owner user of the content processing device 100 is the user "A", and the sharing user who shares an inputted content is also the user "A". The flow of the entire processing is the same as Steps S101 through S115 shown in FIG. 8 except that the "sharing users" in Step S108 and "all the inputted sharing users" in Step S110 is one person i.e. the user "A".

Accordingly, in the content topicality degree calculation processing in Step S112, a content topicality degree of each of the contents is calculated with use of only the degree of intimacy between the user "A" and the subject persons included in each of the contents accumulated in the content processing device 100. For instance, the content topicality degree of the sharing user "A" with respect to the content "P-003" is calculated as follows with use of the values of intimacy degrees shown in FIG. 2.

$$\left(\begin{array}{c} \text{content topicality degree} \\ \text{of user "}A\text{" with respect to content "}P\text{-}003\text{"} \end{array}\right) =$$

(degree of intimacy of user "A" with respect to user "A") +

(degree of intimacy of user "A" with respect to user "H") +

(degree of intimacy of user "A" with respect to user "I") =

$$1.0 + 1.4 + 2.0 = 4.4$$

In this example, since the sharing user is only one person i.e. the user "A", the content topicality degree of the user "A" with respect to the content "P-003" reads as the content topicality degree of the content "P-003". In other words, the content topicality degree of the content "P-003" is "4.4".

Further, in the content appropriateness degree calculation processing in Step S113, the content appropriateness degree of each of the contents in an event where the user "A" is included in the event participant users is set to a predetermined value e.g. "zero" as described above. Further, regarding the content appropriateness degree of each of the contents in an event where the user "A" is an event non-participant sharing user, as described above, the content appropriateness degree of the event in which the user "A" is included serves as the content appropriateness degree of each of the contents in the event. Since the concrete example of the content appropriateness degree calculation processing has been described as above, description of a concrete example of the case where the event non-participant user is only one person is omitted herein.

As described above, with use of the aforementioned content processing device 100, even if the sharing user is one person, it is possible to prioritize output of a content whose topicality degree is high and which is appropriate for sharing with the sharing user. The following is a description on a concrete example about an advantage of the present invention in the case where the sharing user is one person.

As the contents accumulated in the content processing device 100, there are two cases i.e. a case that the contents are constituted merely of the contents originally owned by the user "A", and a case that the contents include contents that have been distributed to the user "A" from other user for sharing.

An example of the case where the accumulated contents include a content that has been distributed to the user "A" from other user for sharing is a case where the content is distributed to the user "A" from other user manually or by means of an electronic mail. As another example, there is a case where the content processing device 100 is a server device which provides a network service for content management. Contents may be transmitted from other user to the content processing device 100 via the network service for allowing the user "A" to browse the contents.

In the case where the contents accumulated in the content processing device 100 are constituted only of the contents originally owned by the user "A", the output of a content having a larger content topicality degree is prioritized. Therefore, the user "A" is allowed to efficiently browse the content including a large number of friends whose relationship with respect to the user "A" is close within a limited time. In addition to the above, with use of an index of the content appropriateness degree, it is possible to lower the priority of a content in an event, which does not include the user "A" as a subject person in the content in the event, despite that the user "A" has participated in the event. With this configuration, it is possible to reduce a possibility that the user "A" may feel uncomfortable at browsing a content which does not include the user "A", despite that the user "A" participated in the event.

Similarly to the above, in the case where the contents accumulated in the content processing device 100 include a content that has been distributed to the user "A" from other user for sharing, the output of a content having a higher content topicality degree is prioritized. Accordingly, the user "A" is allowed to browse the contents in the descending order of the number of friends who are included in the contents and have a close relationship with respect to the user "A" within a limited time, and to efficiently browse the contents.

In addition to the above, with use of an index of the content appropriateness degree, it is possible to lower the priority of a content of an event in which the user "A" did not participate, and whose degree of intimacy between an event participant user and the user "A" is high. With this configuration, it is possible to reduce a possibility that the user "A" may feel uncomfortable at finding a content in an event in which the user "A" did not participate, and knowing that a large number of friends who have a close relationship with respect to the user "A" participated in the event, for instance, in the case where the user "A" browses the contents distributed from other user for sharing for the first time.

Second Embodiment

Figure 15:
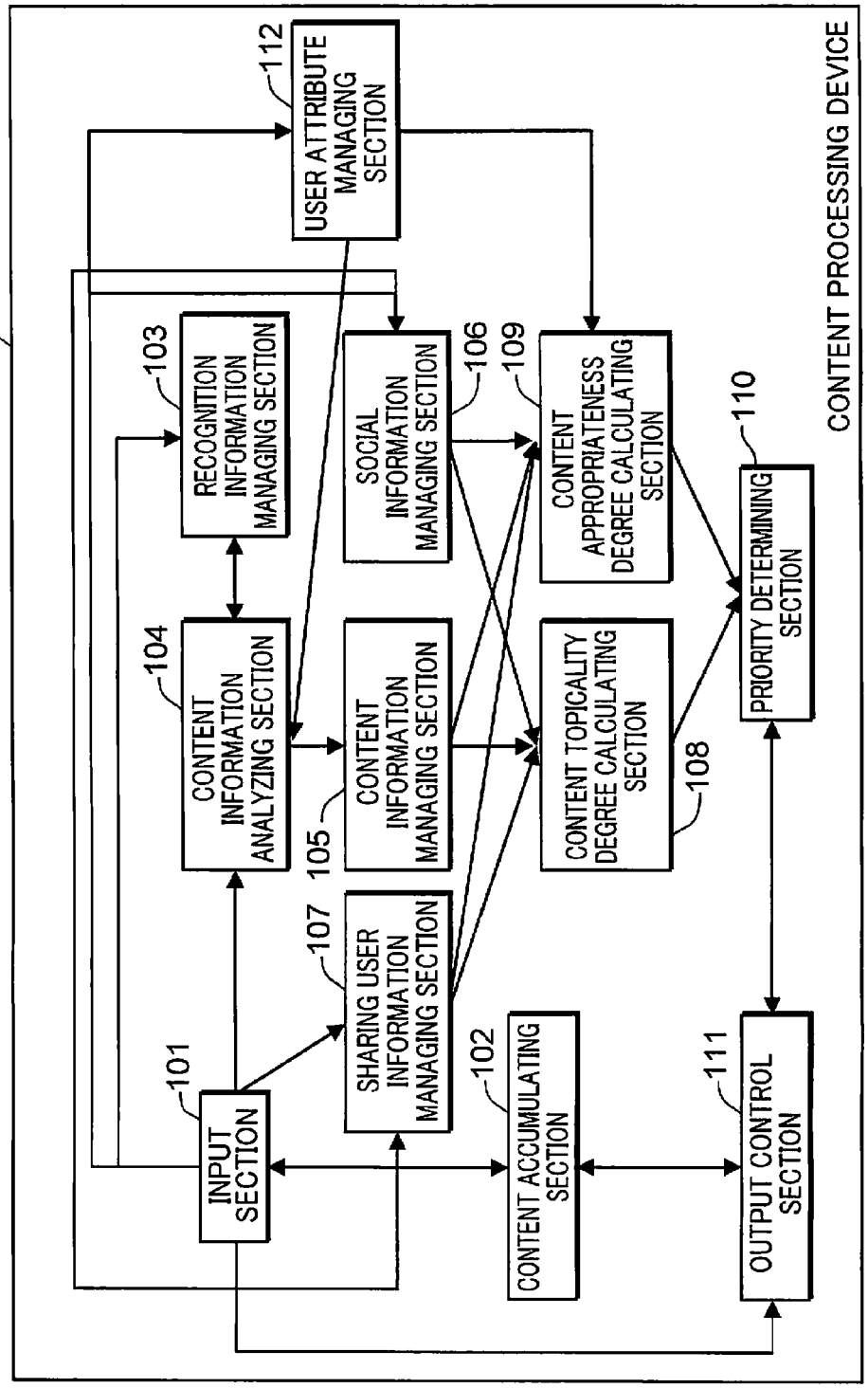
FIG. 15 is a block diagram showing an example of a configuration of a content processing device in a second embodiment of the invention.

FIG. 15 is a block diagram showing a configuration of a content processing device 100 in the second embodiment of the invention. Elements in FIG. 15 which are substantially identical or equivalent to those in FIG. 1 are indicated with the same reference signs, and description thereof is omitted herein.

The content processing device 100 in the second embodiment may be configured of a personal computer or a video recorder into which an external storage medium stored with e.g. images or moving image contents is insertable; or may be configured of a digital still camera, a digital video camera, or a mobile terminal which is operable to photograph still images or moving images; or may be configured of a server device which provides a network service for content management.

Referring to FIG. 15, the content processing device 100 is provided with a user attribute managing section 112, in addition to the constituent elements shown in FIG. 1. In this embodiment, user attributes are specified as group names obtained by classifying the relationships between the users such as "lover", "family member", "acquaintance", and "friend".

An input section 101 receives, in addition to sharing user information relating to sharing users who share the contents, input of user attributes with respect to all the users whose relationships have been specified in social information with respect to a content owner user. In this embodiment, there exist four user attributes i.e. "lover", "family member", "acquaintance", and "friend".

Further, the input section 101 receives input of a sharing content attribute which determines a user attribute of a subject person, of which the content owner user permits content sharing with a sharing user in accordance with the user attribute of the sharing user.

The inputted sharing user information is outputted to a sharing user information managing section 107. The inputted user attributes and sharing content attributes are registered into a user attribute table and into a sharing content attribute policy to be managed by the user attribute managing section 112.

The input section 101 registers the user attributes and the sharing content attributes into the user attribute table and into the sharing content attribute policy. The user attribute managing section 112 manages the user attribute table and the sharing content attribute policy.

A content appropriateness degree calculating section 109 specifies, from the user attribute table, a user attribute of a sharing user and a user attribute of a subject person included in a content; specifies, from the sharing content attribute policy, a user attribute capable of sharing the content by the specified user attribute of the sharing user; and sets a content appropriateness degree of the content including a subject person having a user attribute, of which content sharing is not permitted by the user attribute of the sharing user, to a predetermined value for decreasing the content appropriateness degree.

FIG. 16 is a diagram showing an example of the user attribute table for a content owner user in the second embodiment of the invention. The user attribute table is provided with a user column and a user attribute column. The user attribute table holds therein the user attributes of all the users whose social information has been specified with respect to the content owner user inputted to the input section 101. The user column describes the user names. The user attribute column describes the user attributes.

In this example, in the case where the content owner user is the user "A", the user attributes of all the users (user "B" through user "L") with respect to the user "A" are described. For instance, the user attribute of the user "A" with respect to the user "B" is "friend", and the user attribute of the user "A" with respect to the user "L" is "lover".

In this example, there exist four types of user attributes i.e. "lover", "family member", "friend", and "acquaintance". The user attribute types are not limited to the above, but "college friend" or "co-worker" may be used as a user attribute.

FIG. 17 is a diagram showing an example of the sharing content attribute policy to be used in the second embodiment of the invention. The sharing content attribute policy is provided with a user attribute column and a sharing content attribute column.

For instance, in the case where the user attribute of a sharing user with respect to the content owner user is "family member", sharing a content including a subject person (user) whose user attribute is "acquaintance", "friend" or "family member" is permitted to the sharing user.

FIG. 18 is a table diagram showing the user attributes of event participant users with respect to the content owner user "A" in each of the events described in the event information table shown in FIG. 7. For instance, referring to FIG. 7, the event participant users in the event having the event ID "E1" are four persons i.e. the users "A", "B", "G" and "J". In this case, the user attributes of the event participant users with respect to the content owner user "A" are determined as "friend" and "acquaintance" as shown in FIG. 18, because the user attribute of the user "B" with respect to the user "A" is "friend", the user attribute of the user "G" with respect to the user "A" is "acquaintance", and the user attribute of the user "J" with respect to the user "A" is "acquaintance". The user attribute determination method will be described later.

Figure 19B:
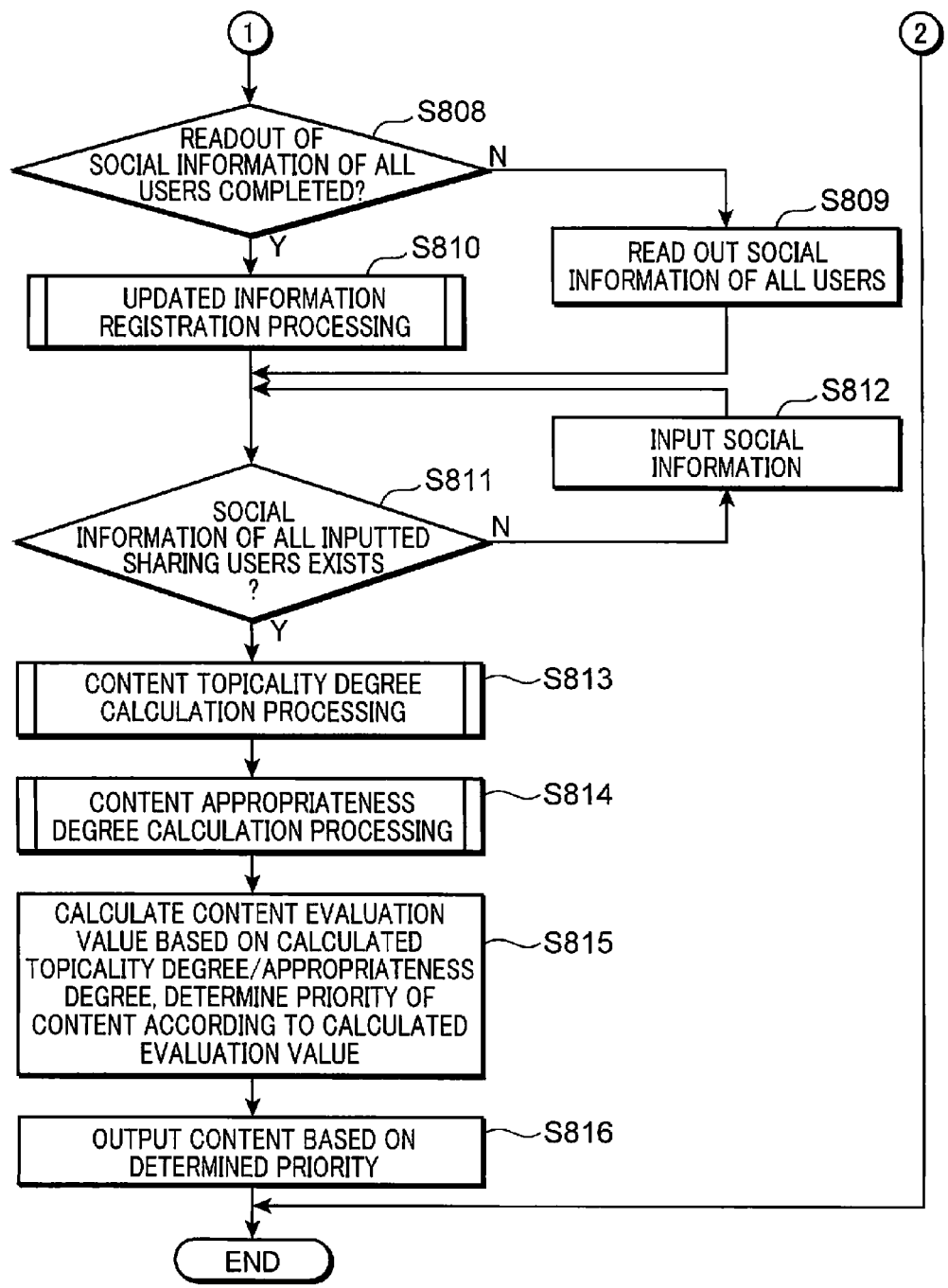
Figure 20:
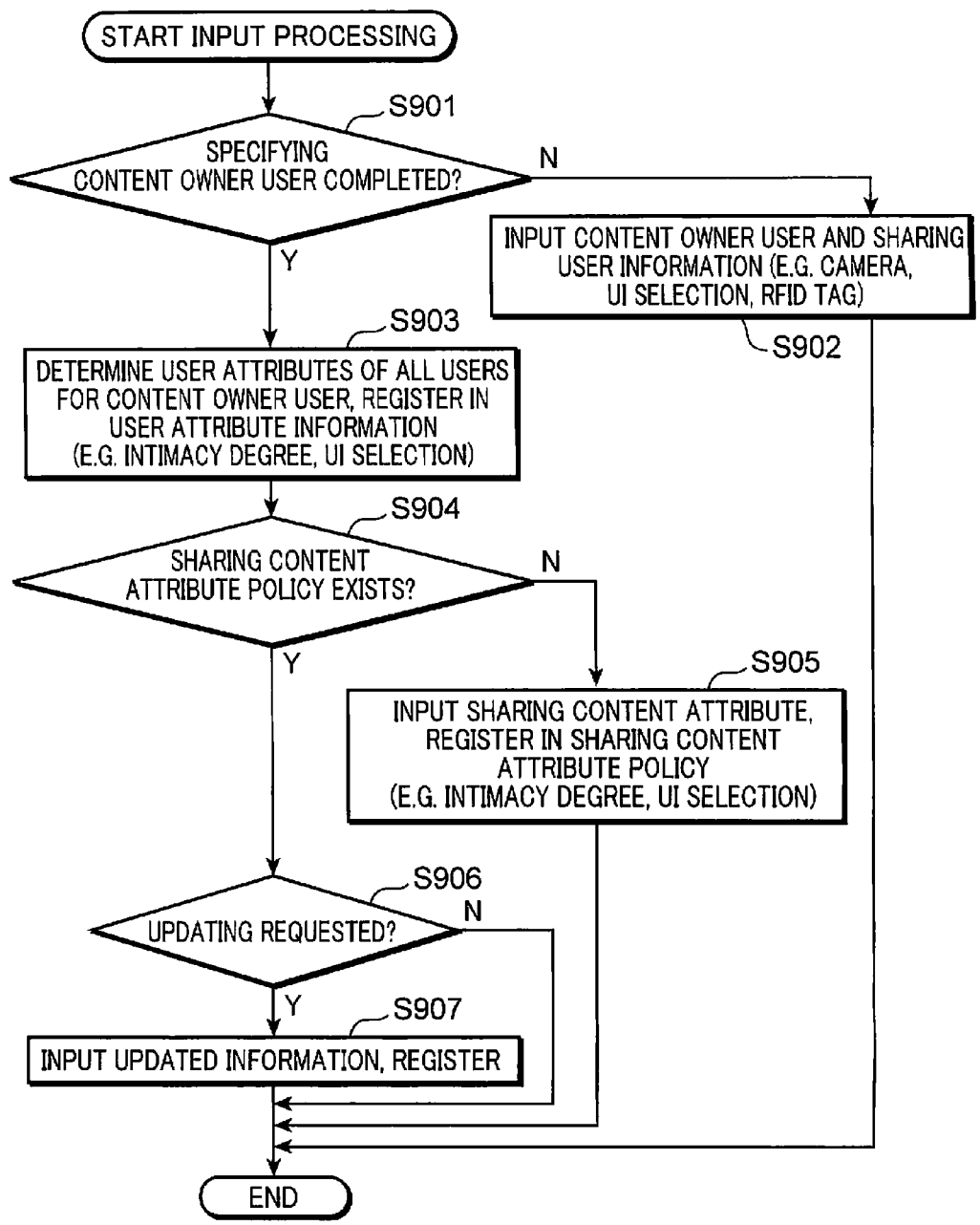
FIG. 20 is a flowchart showing an example of a flow of an input processing in the second embodiment of the invention.
Figure 21B:
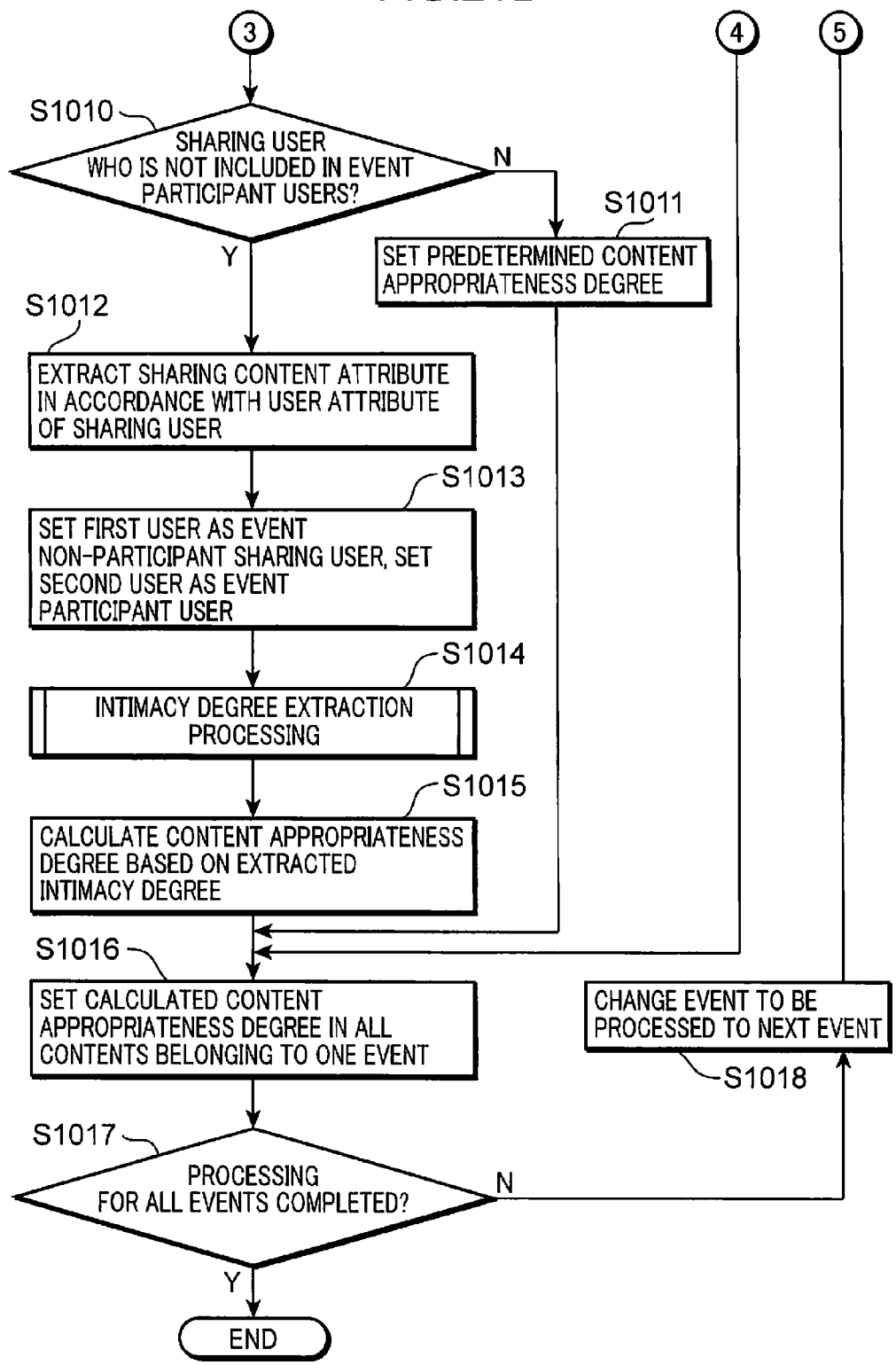

FIGS. 19A and 19B are a flowchart showing a flow of a content processing in the second embodiment of the invention. FIG. 20 is a flowchart showing a flow of an input processing in the second embodiment of the invention. FIGS. 21A and 21B are a flowchart showing a flow of a content appropriateness degree calculation processing in the second embodiment of the invention.

In the following, there is described the content processing of selecting and outputting a content which has topicality and is appropriate for sharing between the sharing users in the embodiment, referring to FIGS. 19A through 21B. In the following description, let it be assumed that the content owner user is the user "A", and the sharing users are the users "A", "B" and "C".

Firstly, referring to FIGS. 19A and 19B, the input section 101 performs an input processing (Step S801). This processing will be described later referring to FIG. 20. Since Steps S802 through S805 are the same as Steps S101 through S104 shown in FIG. 8, description thereof is omitted herein.

Then, the input section 101 determines whether the user attributes have been specified for all the users whose relationships have been specified in the social information of the content owner user (Step S806). Specifically, the input section 101 performs determination by judging whether the user attributes of all the users described in the social information table are specified in the user attribute table. In the case where the user attributes have not been specified (N in Step S806), the input section 101 returns the processing to Step S801. On the other hand, in the case where the user attributes of all the users have been specified (Y in Step S806), the input section 101 performs the updated information registration processing shown in FIG. 11 (Step S807).

Steps S808 through S810 are the same as Steps S105 through S107 shown in FIG. 8, and Steps S811 through S813 are the same as Steps S110 through S112 shown in FIG. 8. Accordingly, description of Steps S808 through S810 and Steps S811 through S813 is omitted herein. Then, the content appropriateness degree calculating section 109 performs the content appropriateness degree calculation processing (Step S814).

The second embodiment is the same as the first embodiment in a point that the content appropriateness degree is a digitized value representing a degree of appropriateness of a content to be shared between the sharing users. However, the second embodiment is different from the first embodiment in a point that in the case where a subject person included in a content has a user attribute, of which the content owner user does not permit content sharing with a sharing user, the content appropriateness degree of the content is set small.

This is based on the idea that the privacy of the content owner user may be infringed or invaded and the content owner user may feel uncomfortable, if a content including the content owner user and "family member" is shared by "acquaintance", or if a content including the content owner user and "lover" is shared by "family member".

In view of the above, this embodiment is configured to specify the user attribute table for specifying the user attributes of all the users whose relationships with respect to the content owner user have been specified, and to specify the sharing content attribute policy for determining whether the content owner user permits content sharing with a sharing user in accordance with the user attribute of a subject person included in the content.

Then, the content appropriateness degree calculating section 109 specifies, from the user attribute table, the user attribute of a sharing user with respect to the content owner user. Further, the content appropriateness degree calculating section 109 classifies the contents according to the events, and specifies, from the user attribute table, the user attributes of the event participant users who participated in each of the events. Then, the content appropriateness degree calculating section 109 specifies, from the sharing content attribute policy, the user attributes of the event participant users, of which the content sharing is permitted by the user attribute of the sharing user; and performs the content appropriateness degree calculation processing for an event including an event participant user having a user attribute, of which content sharing is not permitted by the user attribute of the sharing user, with use of a computation algorithm configured to decrease the content appropriateness degree of each of the contents in the event.

The above processing is described later in detail referring to FIGS. 21A and 21B. Since Steps S815 through S816 are the same as Steps S113 and S114 shown in FIG. 8, description thereof is omitted herein. The input processing of Step S801 is described referring to FIG. 20.

Firstly, it is checked whether specifying the content owner user has been completed (Step S901). In the case where specifying the content owner user has not been completed (N in Step S901), the input section 101 receives input of content owner user information and sharing user information from a user, and terminates the processing.

In this example, the input section 101 may receive input of the content owner user by allowing the user to select the content owner user from among the users listed on UI. Further alternatively, the input section 101 may receive input of the content owner user by reading out the information recorded in an RFID tag by an RFID tag reader. Further alternatively, the input section 101 may specify the owner user of the content processing device 100, as the content owner user. Further alternatively, the input section 101 may allow the user to input the name of a photographing device which has photographed a content, and may specify the owner user of the photographing device which is correlated in advance with the inputted photographing device name, as the content owner user. Input of the sharing user information may be performed by the processing of Step S108. A sharing user information table is generated based on the inputted sharing user information.

On the other hand, in the case where specifying the content owner user has been completed (Y in Step S901), the input section 101 receives input of user attributes, determines the user attributes of all the users with respect to the content owner user, and registers the determination result into the user attribute table (Step S903).

In this case, the input section 101 determines the user attributes by receiving input of the user attributes from the users whose user attributes are "lover" and "family member", among all the users described in the user attribute information of the content owner user. Further, the input section 101 determines the user attribute of the users whose user attributes are other than "lover" and "family member", as "friend", among the users having a direct relationship with respect to the content owner user in the social information. Further, the input section 101 determines the user attribute of the users having no direct relationship with respect to the content owner user in the social information, as "acquaintance".

For instance, let it be assumed that a user whose user attribute with respect to the content owner user "A" is "lover" is inputted as the user "L", and users whose user attributes are "family member" are inputted as the user "H" and the user "I". In this case, in the social information shown in FIG. 2, among the users having a direct relationship with respect to the content owner user "A", the user attributes of the users "B", "C", "D" and "E", other than the user "L" whose user attribute is "lover" and the user "H" and the user "I" whose user attributes are "family member", are determined as "friend". Further, the user attributes of the users "F", "G", "J" and "K", who are the users having no direct relationship with respect to the content owner user "A", are determined as "acquaintance". In this way, the user attribute table shown in FIG. 16 is generated.

The user attribute determination method is not limited to the above. For instance, the input section 101 may determine the user attributes of the users whose degrees of intimacy are not smaller than "1.5" but not larger than "3.0" as "friend", and may determine the user attributes of the users whose degrees of intimacy are not smaller than "0.0" but smaller than "1.5" as "acquaintance".

Then, the input section 101 extracts, from the user attribute table generated in Step S903, the user attribute of a sharing user with respect to the content owner user; and checks whether the extracted user attribute of the sharing user is described in the sharing content attribute policy (Step S904). Then, in the case where the user attribute of the sharing user is not described in the sharing content attribute policy (N in Step S904), the input section 101 receives input of a sharing content attribute with respect to the user attribute of the sharing user, and registers the received sharing content attribute into the sharing content attribute policy (Step S905).

In FIG. 17, the definition is configured to decrease the number of contents of which the content owner user "A" permits sharing, according to the ranking of user attributes: "lover">"family member"≈"friend">"acquaintance". In other words, the user inputs the sharing content attributes with respect to the user attribute "lover" as "acquaintance", "friend", "family member" and "lover"; inputs the sharing content attributes with respect to the user attribute "family member" as "acquaintance", "friend" and "family member"; inputs the sharing content attributes with respect to the user attribute "friend" as "acquaintance", "friend" and "lover"; and inputs the sharing content attribute with respect to the user attribute "acquaintance" as "acquaintance" and "friend". Accordingly, the number of user attributes included in the sharing content attributes decreases in the order of "lover">"family member"≈"friend">"acquaintance". The number of contents of which the content owner user "A" permits sharing decreases in the descending order.

For instance, sharing of a content including a subject person whose user attribute is "acquaintance", "friend", "family member", or "lover" is permitted to the user "L" whose user attribute is "lover" with respect to the content owner user "A".

The sharing content attribute designating method is not limited to the above. For instance, even if a content includes a subject person whose user attribute is "acquaintance" or "friend", it is possible to apply an exceptional processing such as a processing of inhibiting sharing of a content such as a content including, as a subject person, only a user (hereinafter, called as "opposite sex user") whose sex is opposite to the sex of the content owner user; or a content which include, as subject persons, an opposite sex user and the content owner user, and in which the distance between the users is equal to or smaller than a predetermined threshold value; or a content including, as subject persons, the content owner user and opposite sex users of a number equal to or larger than a predetermined threshold value.

On the other hand, in the case where there exists a sharing content attribute policy (Y in Step S904), the input section 101 asks the user whether to update the sharing content attribute policy (Step S906). In the case where the input section 101 has not received an updating request from the user (N in Step S906), the input processing is terminated. On the other hand, in the case where the input section 101 has received an updating request (Y in Step S906), the input section 101 receives input of updated information from the user, registers the inputted data into the sharing content attribute policy (Step S907), and terminates the input processing.

Next, the content appropriateness degree calculation processing of Step S814 is described in detail referring to FIGS. 21A and 21B. Since Steps S1001 through S1002 are the same as Steps S701 through S702 shown in FIG. 14, description thereof is omitted herein. The content appropriateness degree calculating section 109 checks whether extraction of user attributes of all the sharing users with respect to the content owner user has been completed (Step S1003). Specifically, the content appropriateness degree calculating section 109 checks whether the user attributes of sharing users have been specified in the user attribute table.

Then, in the case where extraction of the user attributes of all the sharing users has not been completed (N in Step S1003), the content appropriateness degree calculating section 109 changes the sharing user to be processed to a next sharing user whose extraction processing has not been completed (Step S1004), and returns the processing to Step S1003. On the other hand, in the case where extraction of the user attributes of all the sharing users has been completed (Y in Step S1003), the content appropriateness degree calculating section 109 checks whether readout of the sharing content attribute policy has been completed (Step S1005).

In this embodiment, for instance, all the sharing users with respect to the content owner user "A" are specified as the user "B" and the user "C". Accordingly, the user attributes "friend" and "friend" are respectively extracted for the user "B" and the user "C" from the user attribute table shown in FIG. 16.

Then, in the case where readout of the sharing content attribute policy has not been completed (N in Step S1005), the content appropriateness degree calculating section 109 executes readout of the sharing content attribute policy (Step S1006). On the other hand, in the case where readout of the sharing content attribute policy has been completed (Y in Step S1005), the content appropriateness degree calculating section 109 performs the updated information registration processing shown in FIG. 11 (Step S1007).

Then, the content appropriateness degree calculating section 109 extracts a sharing content attribute in accordance with the user attribute of a sharing user, with use of the sharing content attribute policy to be managed by the user attribute managing section 112 (Step S1008). For instance, the user attributes of the user "B" and the user "C" as all the sharing users with respect to the content owner user "A" are both "friend". Accordingly, the sharing content attributes "acquaintance", "friend" and "lover" are extracted from the sharing content attribute table shown in FIG. 17, as the sharing content attributes. In the case where the user attributes of the user "B" and the user "C" as sharing users differ from each other, the sharing content attribute of a user whose ranking in the sharing content attribute policy is low is adopted as the user attribute of all the sharing users with respect to the content owner user "A". For instance, let it be assumed that the user attribute of the user "B" is "lover", and the user attribute of the user "C" is "family member". Then, the user attributes of all the sharing users with respect to the content owner user "A" are "acquaintance", "friend" and "family member", which are described as the content sharing attributes of "family member".

Then, the content appropriateness degree calculating section 109 extracts the user attributes of event participant users with respect to the content owner user (Step S1009). For instance, in the event having the event ID "E1", the event participant users are the user "A", the user "B", the user "G" and the user "J". Accordingly, the user attribute "friend" of the user "B", the user attribute "acquaintance" of the user "G", and the user attribute "acquaintance" of the user "J" are extracted as the user attributes of the event participant users with respect to the content owner user "A" from the user attribute table shown in FIG. 16. Thus, the user attributes of the event participant users with respect to the content owner user "A" in the event having the event ID "E1" are "friend" and "acquaintance".

Further, the event participant users in the event having the event ID "E2" are the user "A", the user "H" and the user "I". Accordingly, the user attribute "family member" of the user "H" and the user attribute "family member" of the user "I" are extracted as the user attributes of the event participant users with respect to the content owner user "A" from the user attribute table shown in FIG. 16. Thus, the user attributes of the event participant users with respect to the content owner user "A" in the event having the event ID "E2" are "family member".

In this example, all the user attributes of event participant users in each of the events are extracted. The invention is not limited to the above. For instance, in a certain event, it is possible to determine a user attribute having a largest number of occurrences among the user attributes of event participant users, as the user attribute of the event participant users with respect to the content owner user.

Then, the content appropriateness degree calculating section 109 checks whether the sharing content attributes extracted in Step S1008 include the user attribute of an event participant user extracted in Step S1009 (Step S1010). In the case where the sharing content attributes do not include the user attribute of the event participant user (N in Step S1010), the content appropriateness degree calculating section 109 sets, as the content appropriateness degree, a predetermined value for decreasing the content appropriateness degree (Step S1011). For instance, in the case where the sharing content attributes extracted in Step S1008 are "acquaintance", "friend" and "lover", and the user attribute of the event participant user extracted in Step S1009 is "family member", the content appropriateness degree is set to e.g. "−10.0", because the sharing content attributes do not include the user attribute of the event participant user.

On the other hand, in the case where the sharing content attributes include the user attribute of the event participant user (Y in Step S1010), the processing is proceeded to Step S1012.

In this example, in the case where the sharing content attributes do not include the user attribute of the event participant user, a predetermined minus value is set as the content appropriateness degree. Alternatively, as far as the content appropriateness can decrease the priority of a content, zero or a positive value may be used as the content appropriateness degree.

Further alternatively, it is possible to apply weighting to the content appropriateness degree in such a manner that the content appropriateness degree further decreases, as the number of user attributes of event participant users which are not included in the sharing content attributes increases; or to apply weighting to the content appropriateness degree in accordance with the user attribute of an event participant user which is not included in the sharing content attributes. For instance, the content appropriateness degree calculating section 109 may apply weighting to the content appropriateness degree in such a manner that the content appropriateness degree is set smaller in the case where the user attribute of an event participant user which is not included in the sharing content attributes is "lover", than in the case where the user attribute of an event participant user which is not included in the sharing content attributes is "acquaintance".

On the other hand, in the case where the sharing content attributes include the user attribute of an event participant user (Y in Step S1010), the processing is proceeded to Step S1012.

Since the processing after Step S1012 is the same as the processing after Step S703 shown in FIG. 14, description thereof is omitted herein.

With the above configuration, the following advantages are obtained, in addition to the advantages of the first embodiment. Specifically, in this embodiment, the content appropriateness degree of a content including a subject person whose user attribute may infringe or invade the privacy of the content owner user is set small in accordance with the user attribute of a sharing user with respect to the content owner user, and the priority of the content is set low. For instance, in the case where the content owner user does not want a family member to view a content including the content owner user and his or her lover, the sharing content attribute policy is specified in such a manner that a sharing user having a user attribute "family member" is inhibited to share a content including a subject person whose user attribute is "lover". With this configuration, it is possible to refrain the content owner user from feeling annoyed in sharing the content.

The above example has been described based on the premise that the sharing users are multiple persons. The sharing users may not be multiple persons. The content processing device of the second embodiment may be configured to calculate a content topicality degree and a content appropriateness degree even if a sharing user is only one person.

For instance, let it be assumed that the content owner user is the user "A", and the sharing user is only one person i.e. the user "A". The flow of the entire processing is the same as Steps S801 through S816 shown in FIGS. 19A and 19B, and "all the inputted sharing users" in Step S811 is only one person i.e. the user "A". Further, the "content owner user" and the "sharing users" in Step S902 are only one person i.e. the user "A" in the input processing shown in FIG. 20.

Therefore, in the content topicality degree calculation processing of Step S813, a content topicality degree of each of the contents is calculated only based on a degree of intimacy between the user "A", and a subject person in each of the contents accumulated in the content processing device 100. Since a concrete example of the content topicality degree calculation has been described in the first embodiment, description thereof is omitted herein.

Further, in the content appropriateness degree calculation processing of Step S814, as described in the first embodiment, there is adopted an algorithm configured in such a manner as to decrease the content appropriateness degree of a content included in an event, as the number of event non-participant sharing users in the event increases, and as the degree of intimacy between an event non-participant sharing user and an event participant user in the event increases. In addition to the above, there is used an algorithm which is configured to decrease the content appropriateness degree of a content including a subject person having a user attribute, of which content sharing is not permitted by the user attribute of a sharing user, with use of the user attribute inputted in advance by the content owner user, or a user attribute determined based on the social information of the content owner user, and with use of the sharing content attribute policy. In this example, since the flow of the former algorithm processing to be performed in the case where the sharing user is only one person i.e. the user "A" has been described in the first embodiment, description thereof is omitted herein. Accordingly, in this section, only the flow of the latter algorithm processing to be performed in the case where the sharing user is only one person i.e. the user "A" is described.

As the contents accumulated in the content processing device 100, there are two cases i.e. a case that the contents are constituted merely of the contents originally owned by the user "A", and a case that the contents include a content that has been distributed to the user "A" from other user for sharing.

In the case where the contents accumulated in the content processing device 100 are constituted merely of the contents originally owned by the user "A", the owner user of all the contents is the user "A". Accordingly, the sharing user and the content owner user are both the user "A". In this case, in the processing of Step S1008 shown in FIG. 21A, the user attribute of the sharing user is "user himself or herself", and the sharing content attributes in accordance with the user attribute are all the user attributes ("acquaintance", "friend", "family member" and "lover") that are registered in the sharing content attribute policy.

This is based on the idea that in the case where the user "A" himself or herself browses a content owned by the user "A", the privacy of the user "A" is not infringed or invaded, and the user "A" does not feel uncomfortable at browsing a photograph of a subject person such as a family member or his or her lover.

Accordingly, in the above case, a predetermined value for decreasing the content appropriateness degree is not set, as the content appropriateness degree by the algorithm used in the second embodiment, but a content appropriateness degree is calculated with use of the algorithm described in Steps S1012 through S1015, in other words, with use of the same algorithm as used in the first embodiment.

Further, in the case where the contents accumulated in the content processing device 100 include a content distributed to the user "A" from other user, the content owner user differs depending on the content.

In the following, let it be assumed that other user is the user "B". In this case, the content owner user of a content owned by the user "A" is the user "A", and the content appropriateness degree calculation processing is as described above. On the other hand, the content owner user of a content distributed to the user "A" from the user "B" is the user "B". In other words, in this case, the sharing user is the user "A", and the content owner user is the user "B".

In this case, a content appropriateness degree is set small for a content including a subject person having a user attribute, of which the content owner user (user "B") does not permit content sharing by the user attribute of the sharing user (user "A"), with use of the user attribute inputted in advance by the user "B" or the user attribute determined based on the social information of the user "B", and with use of the sharing content attribute policy.

In this example, a user attribute and a sharing content attribute inputted by the user "B" may be directly inputted by the user "B" through the input section 101 of the content processing device owned by the user "A". Alternatively, a user attribute and a sharing content attribute policy inputted by the user "B" with use of the content processing device 100 owned by the user "B" may be acquired by the content processing device 100 owned by the user "A" via a network. Further alternatively, in the case where the content processing device 100 is a server device which provides a network service for content management, the user "B" may be allowed to register a user attribute and a sharing content attribute policy into the content processing device 100 via the network service so that browsing of a content by the user "A" is permitted.

A concrete example of the content appropriateness degree calculation processing is described as follows. For instance, let it be assumed that the user attribute of the user "A" with respect to the user "B" is "friend". Further, in the sharing content attribute policy of the user "B", let it be assumed that the sharing content attributes of users whose sharing user attributes are "friend" are "acquaintance", "friend" and "lover". In this example, let it be assumed that the user attribute of an event participant user with respect to the user "B" in a certain event is "family member". In this case, the user attribute ("family member") of the event participant user is not included in the sharing content attributes i.e. "acquaintance", "friend" and "lover". Accordingly, a predetermined value e.g. "−10.0" is set as the content appropriateness degree of a content in the event, as shown in Step S1011. On the other hand, in the event in which the user attribute of an event participant user with respect to the user "B" is "lover", the user attribute ("lover") of the event participant user is included in the sharing content attributes i.e. "acquaintance", "friend" and "lover". Accordingly, a content appropriateness degree of the event is calculated by using the algorithm described in Steps S1012 through S1015, in other words, by using the same algorithm as described in the first embodiment.

As described above, in the case where the contents accumulated in the content processing device 100 include a content distributed to the user "A" from other user (user "B") for sharing, even if the user "B" as the content owner user inadvertently shares with the user "A" a content which may infringe or invade the privacy of a subject person such as a family member, the priority of the content can be lowered when the user "A" as a sharing user browses the content. Thus, it is possible to reduce a possibility that the user "A" as a sharing user may browse a photograph which may infringe or invade the privacy of the user "B" as the content owner user, and the user "B" may feel uncomfortable.

Third Embodiment

This embodiment is directed to a configuration of automatically selecting a content which has a high topicality degree and which is appropriate for sharing between a device owner user who owns a content processing device 100 and a partner user who shares the content; and of transmitting the selected content to the electronic mail address of the partner user.

FIG. 22 is a block diagram showing a configuration of a content processing device 100A in the third embodiment of the invention. Referring to FIG. 22, constituent elements substantially identical or equivalent to those shown in FIG. 1 are indicated with the same reference signs, and description thereof is omitted herein.

Referring to FIG. 22, the content processing device 100A is provided with a communicating section 113, in addition to the constituent elements shown in FIG. 1. Further, the content processing device 100A is connected to a content processing device 100B and to a content processing device 100C via a network 200 as external devices.

In this example, let it be assumed that the device owner user of the content processing device 100A is the user "A", the device owner user of the content processing device 100B is the user "B", and the device owner user of the content processing device 100C is the user "C".

Further, let it be assumed that the user "A" transmits the contents accumulated in a content accumulating section 102 of the content processing device 100A to the user "B" and to the user "C", as partner users who share the contents with the user "A".

Further, let it be assumed that each of the content processing devices is assigned with a unique electronic mail address "e.g. "usera__100a@email.com"), and that the communicating section 113 of the content processing device 100A transmits the contents to the external devices (in this example, the content processing device 10013 and the content processing device 100C) via the network 200, with use of the electronic mail addresses.

The content processing device 100A in the third embodiment may be configured of a personal computer or a video recorder into which an external storage medium stored with e.g. images or moving image contents is insertable; or may be configured of a digital still camera, a digital video camera, or a mobile terminal which is operable to photograph still images or moving images; or may be configured of a server device which provides a network service for content management.

In the present example, an input section 101 receives, in addition to sharing user information, the electronic mail address of the device owner user of the content processing device 100A, and the electronic mail address of a sharing user (partner user) other than the device owner user of the content processing device 100A; outputs the inputted information to a sharing user information managing section 107, and registers the outputted information into a sharing user information table. Specifically, the input section 101 correlates between device owner user information which is identification information (e.g. the user name) of the device owner user (user "A"), and the electronic mail address of the device owner user for registration into the sharing user information table; and correlates between partner user information (e.g. the user name) which is identification information of the partner user (the user "B", the user "C"), and the electronic mail address of the partner user for registration into the sharing user information table.

In this example, description has been made based on the premise that the sharing users include the device owner user of the content processing device 100A. In the case where the device owner user of the content processing device 100A is not included, the input section 101 may be configured to receive input of device owner user information of the content processing device 100A.

A content topicality degree calculating section 108 and a content appropriateness degree calculating section 109 respectively perform a content topicality degree calculation processing and a content appropriateness degree calculation processing between sharing users, based on the premise that the device owner user of the content processing device 100A is the content owner user, and the content owner user and a partner user are the sharing users.

In this example, the content owner user is the user "A", and the sharing users are the user "A", the user "B" and the user "C". In this case, the device owner user is the user "A", and the partner users are the user "B" and the user "C". Since the content topicality degree calculation processing and the content appropriateness degree calculation processing are the same as those described in the first embodiment and in the second embodiment, description thereof is omitted herein.

An output control section 111 extracts a content to be transmitted, based on the priority determined by a priority determining section 110, and designates the communicating section 113 to transmit the extracted content to the electronic mail address of the partner user to be managed by the sharing user information managing section 107.

In this example, among the contents accumulated in the content processing device 100A, a content extracted based on the priority determined by the priority determining section 110 is transmitted to the content processing device 100B owned by the user "B" and to the content processing device 100C owned by the user "C".

Examples of the method for extracting a content to be transmitted include a method for extracting a content whose content evaluation value calculated by the priority determining section 110 is equal to or larger than a predetermined value (e.g. "5.0"), and a method for extracting a predetermined number (e.g. ten) of contents in the descending order of the content evaluation value calculated by the priority determining section 110. These are merely examples, and other method may be used as the contents extraction method.

With the above configuration, it is possible to automatically select a content which has a high topicality degree and which is appropriate for sharing between the device owner user and a partner user for transmitting the selected content to the partner user. Accordingly, it is possible to reduce a user's operation load (a work and a time required for a user's operation of selecting a content and transmitting an electronic mail with the selected content attached thereto) in sharing the content utilizing the electronic mail.

Fourth Embodiment

This embodiment is directed to a configuration of automatically selecting a content which has a high topicality degree and which is appropriate for sharing between prescribed users with respect to a content sharing network service with which the content to be posted by a device owner user who owns a content processing device is allowed to be shared between the prescribed users; and posting the selected content to the network service.

Figure 23:
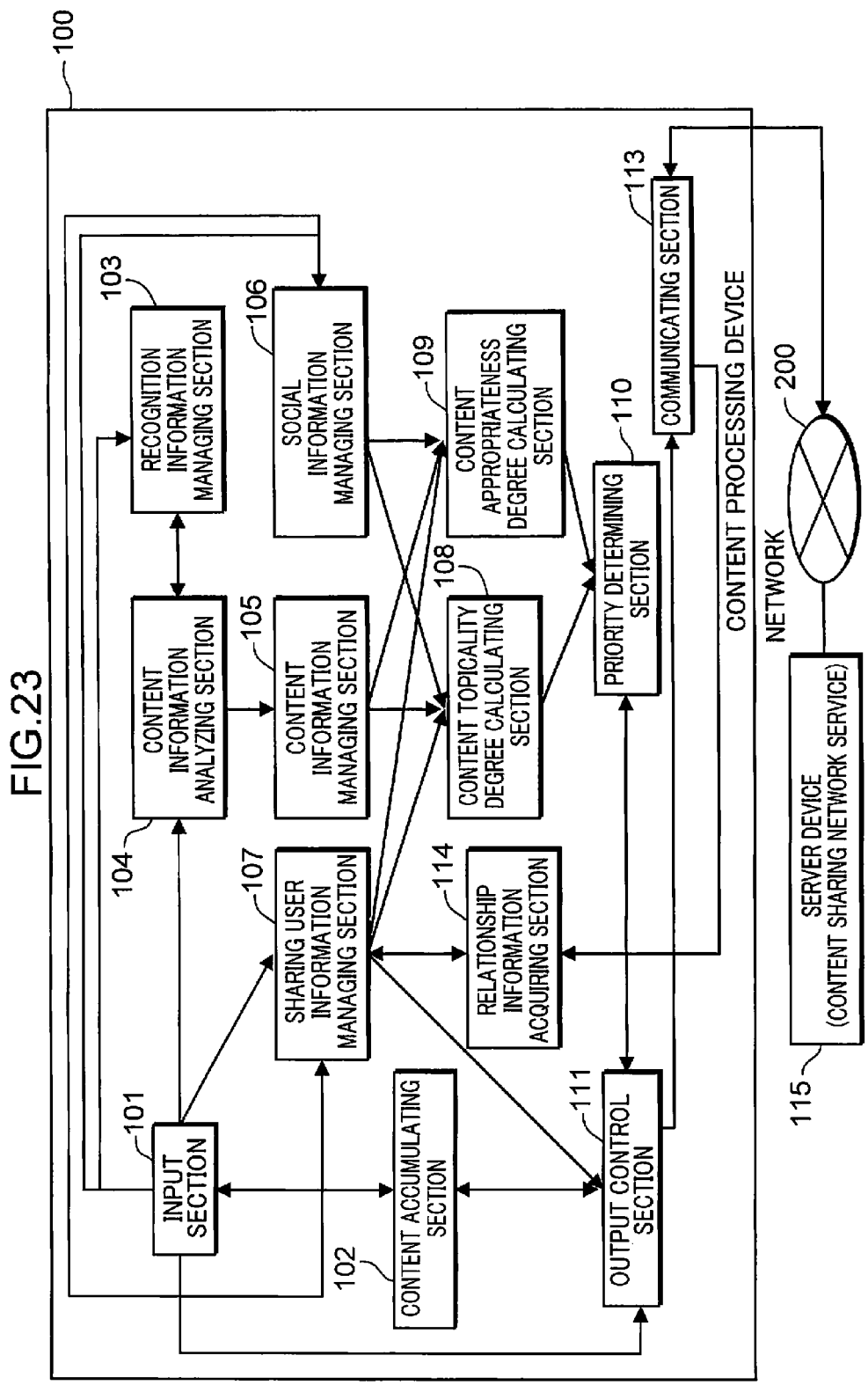
FIG. 23 is a block diagram showing an example of a configuration of a content processing device in a fourth embodiment of the invention.

FIG. 23 is a block diagram showing a configuration of a content processing device 100 in the fourth embodiment of the invention. Referring to FIG. 23, constituent elements which are substantially identical or equivalent to those shown in FIG. 1 and FIG. 22 are indicated with the same reference signs, and description thereof is omitted herein.

Referring to FIG. 23, the content processing device 100 is provided with a relationship information acquiring section 114, in addition to the constituent elements shown in FIG. 22. Further, the content processing device 100 is connected to a server device 115 which provides a content sharing network service via a network 200.

In this example, the content sharing network service indicates a network service with which a content posted by a user is allowed to be shared between prescribed users, such as the SNS (Social Networking Service) or a photograph sharing service. The prescribed users indicate the users described in relationship information of a device owner user, which is exclusively owned by each of the network services. The relationship information is information which describes the relationship between the prescribed users, and a degree of intimacy which is a digitized value representing intimacy between the prescribed users. Specifically, the social information shown in FIG. 3 is used as the relationship information.

The content processing device 100 in the fourth embodiment of the invention may be configured of a personal computer or a video recorder into which an external storage medium stored with e.g. images or moving image contents is insertable; or may be configured of a digital still camera, a digital video camera, or a mobile terminal which is operable to photograph still images or moving images; or may be configured of a server device which provides a network service for content management.

In the present example, an input section 101 receives input of device owner user information which is identification information of a device owner user, and login information (such as the URL of a content sharing network service, an electronic mail address and a password of the device owner user) of a content sharing network service to be utilized by the device owner user; outputs the received information to a sharing user information managing section 107, and registers the outputted information into a sharing user information table.

The relationship information acquiring section 114 acquires the relationship information of the device owner user, which is owned by the content sharing network service by login to the content sharing network service, with use of the login information of the content sharing network service to be managed by the sharing user information managing section 107; outputs the acquired relationship information to the sharing user information managing section 107; and causes the sharing user information managing section 107 to manage the relationship information. For instance, assuming that the device owner user is the user "A", the social information table shown in FIG. 3 is acquired as the relationship information of the user "A".

A content topicality degree calculating section 108 and a content appropriateness degree calculating section 109 respectively perform a content topicality degree calculation processing and a content appropriateness degree calculation processing between sharing users, based on the premise that the device owner user is the content owner user, and users included in the relationship information of the device owner user that has been acquired by the relationship information acquiring section 114 are sharing users.

For instance, assuming that the social information table shown in FIG. 3 is acquired as the relationship information, the user "A" through the user "L" are specified as the sharing users, and a content topicality degree and a content appropriateness degree are calculated. Since the content topicality degree calculation processing and the content appropriateness degree calculation processing are the same as those described in the first embodiment and in the second embodiment, description thereof is omitted herein.

An output control section 111 extracts a content to be posted to the content sharing network service, based on the priority determined by a priority determining section 110, and designates a communicating section 113 to post the extracted content to the content sharing network service.

Examples of the method for extracting a content to be posted include a method for extracting a content whose content evaluation value calculated by the priority determining section 110 is equal to or larger than a predetermined value (e.g. "5.0"), and a method for extracting a predetermined number (e.g. ten) of contents in the descending order of the content evaluation value calculated by the priority determining section 110. These extraction methods are merely examples, and other extraction method may be used.

With the above configuration, it is possible to acquire relationship information of a device owner user from a network service via a network; specify the users included in the relationship information as sharing users; automatically select a content which has a high topicality degree and which is appropriate for sharing between the sharing users; and post the selected content to the network service. Accordingly, it is possible to reduce a user's operation load (a work and a time required for a user's operation of selecting a content and posting the selected content to a content sharing network service) in sharing the content, utilizing the content sharing network service.

Fifth Embodiment

This embodiment is directed to a configuration, wherein in the case where there is a schedule which is common or correlated between the users, and the scheduled date is coming, a content which has a high topicality degree and which is appropriate for sharing between the users is automatically selected, and the selected content is notified to the users. In the following, description is made based on an example, wherein a schedule which is common or correlated between the users is a meeting.

Figure 24:
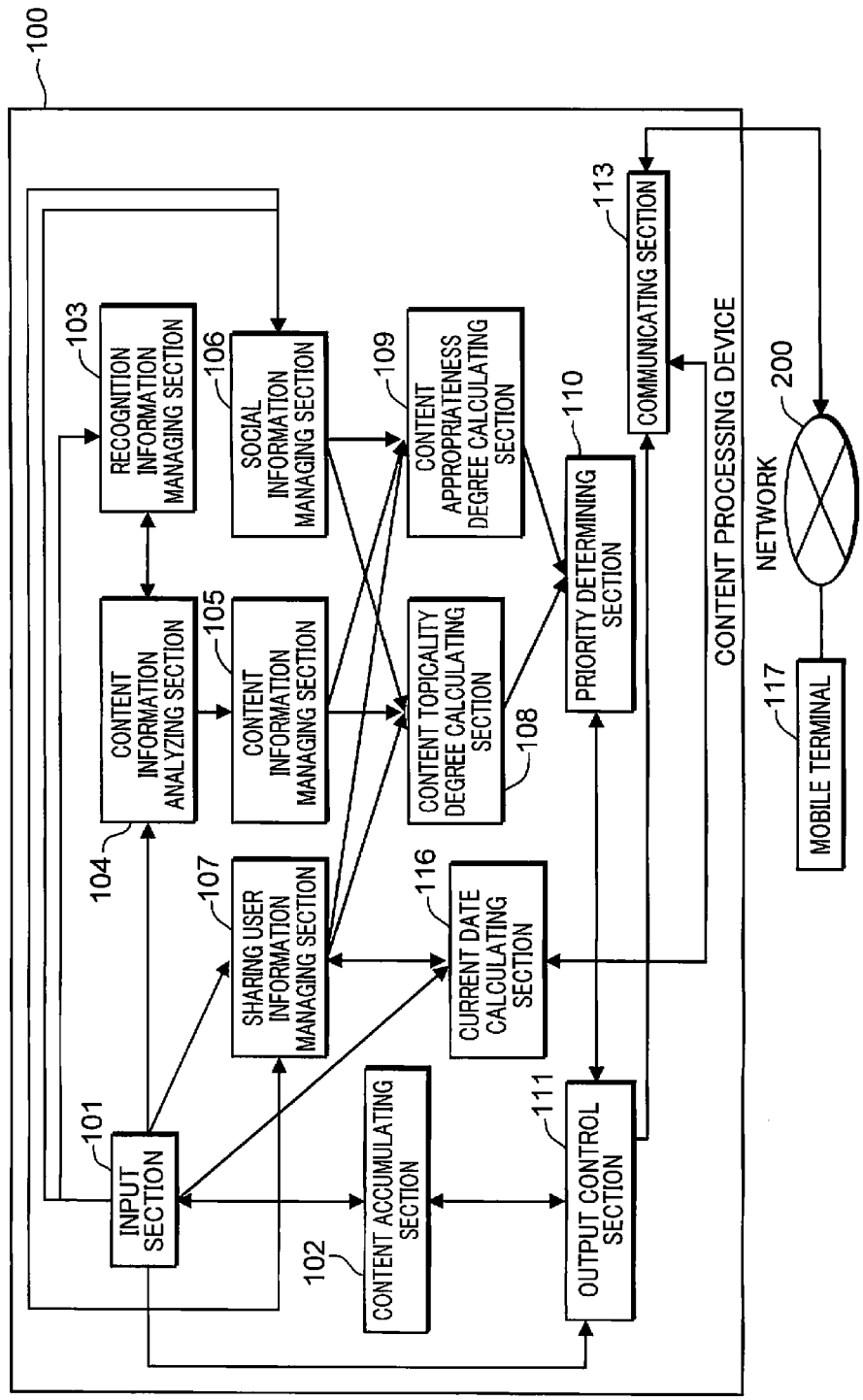
FIG. 24 is a block diagram showing an example of a configuration of a content processing device in a fifth embodiment of the invention.

FIG. 24 is a block diagram showing a configuration of a content processing device 100 in the fifth embodiment of the invention. Referring to FIG. 24, constituent elements which are substantially identical or equivalent to those shown in FIG. 1 and FIG. 22 are indicated with the same reference signs, and description thereof is omitted herein.

Referring to FIG. 24, the content processing device 100 is provided with a current date calculating section 116, in addition to the constituent elements shown in FIG. 22. Further, the content processing device 100 is connected to an external mobile terminal 117 via a network.

The content processing device 100 in the fifth embodiment may be configured of a personal computer or a video recorder into which an external storage medium stored with e.g. images or moving image contents is insertable; or may be configured of a digital still camera, a digital video camera, or a mobile terminal which is operable to photograph still images or moving images; or may be configured of a server device which provides a network service for content management.

In this example, let it be assumed that the mobile terminal 117 has a storage area in which contents to be transmitted from the content processing device 100 are storable. Examples of the mobile terminal 117 include a mobile phone, a smart phone, a PDA (Personal Digital Assistant), and a portable video game player.

In this embodiment, an input section 101 receives input of device owner user information for identifying the device owner user of the content processing device 100, and schedule information relating to a schedule of the owner user of the content processing device 100; and causes a sharing user information managing section 107 to mange the received information. In the schedule information, the scheduled date (hereinafter, called as a "scheduled meeting date") of a meeting, and user identification information (hereinafter, called as "scheduled meeting user information) of users who are scheduled to join the meeting are registered in correlation with each other. The schedule information may be configured to be managed by the content processing device 100; or may be configured to be managed by the mobile terminal 117 owned by the device owner user, and to be acquired from the mobile terminal 117 by the content processing device 100.

The current date calculating section 116 calculates a current date. A current date calculating method may be a method, wherein a user is allowed to input a certain date via the input section 101, and a current date is calculated based on the inputted date; or a method, wherein a current date is caused to be received and acquired by a communicating section 113, from a server device capable of synchronizing a current date to be managed by the content processing device 100 with the correct current date. These current date calculating methods are merely examples, and other method may be used.

In the case where a difference between the current date calculated by the current date calculating section 116 and the scheduled meeting date of a meeting registered in the schedule information is equal to or smaller than a predetermined threshold value (e.g. "one day"), a content topicality degree calculating section 108 and a content appropriateness degree calculating section 109 respectively perform a content topicality degree calculation processing and a content appropriateness degree calculation processing, assuming that the users who are scheduled to join the meeting are the sharing users.

Specifically, in performing the content topicality degree calculation processing and the content appropriateness degree calculation processing, the device owner user of the content processing device 100 may be set as a content owner user, and the content owner user and the users who are scheduled to join the meeting are set as the sharing users.

Further, the content topicality degree calculation processing and the content appropriateness degree calculation processing may be performed only in the case where a difference between the current date calculated by the current date calculating section 116 and the scheduled meeting date is equal to or smaller than a predetermined threshold value (e.g. "one day"). Since the content topicality degree calculation processing and the content appropriateness degree calculation processing are the same as those described in the first embodiment and in the second embodiment, description thereof is omitted herein.

An output control section 111 extracts a content to be transferred to the mobile terminal 117, based on the priority determined by a priority determining section 110, and designates the communicating section 113 to transfer the extracted content to the mobile terminal 117.

Examples of the method for extracting a content to be transferred include a method for extracting a content whose content evaluation value calculated by the priority determining section 110 is equal to or larger than a predetermined value (e.g. "5.0"), a method for extracting a predetermined number (e.g. ten) of contents in the descending order of the content evaluation value calculated by the priority determining section 110, and a method for extracting the contents in the descending order of the content evaluation value calculated by the priority determining section 110 until the sum of the content sizes becomes equal to or larger than a prescribed ratio (e.g. "90%") of the vacant capacity of the storage area of the mobile terminal 117. These extraction methods are merely examples, and other extraction method may be used.

With the above configuration, as the scheduled meeting date registered in the schedule information of the device owner user information is coming, a content which has a high topicality degree and which is appropriate for sharing between the users who are scheduled to join the meeting is automatically selected, and the selected content is transferred to the mobile terminals 117 of the users who are scheduled to join the meeting. Accordingly, it is possible to reduce a user's operation load (a work and a time required for a user to select a content before the scheduled date, and transfer the selected content to the mobile terminals 117) in sharing the content, utilizing the mobile terminals 117 of the users who are scheduled to join the meeting. Further, since the users who are scheduled to join the meeting can browse, in advance a content which has a high topicality degree and which is appropriate for sharing, it is possible to smoothly carry out the meeting.

Sixth Embodiment

This embodiment is directed to a configuration of adjusting social information, based on the relationship between a photographing user who photographed a content, and a subject person included in the content, each time a content is added. Since the content topicality degree calculation processing and the content appropriateness degree calculation processing in the sixth embodiment are the same as those described in the foregoing embodiments, description thereof is omitted herein.

Figure 25:
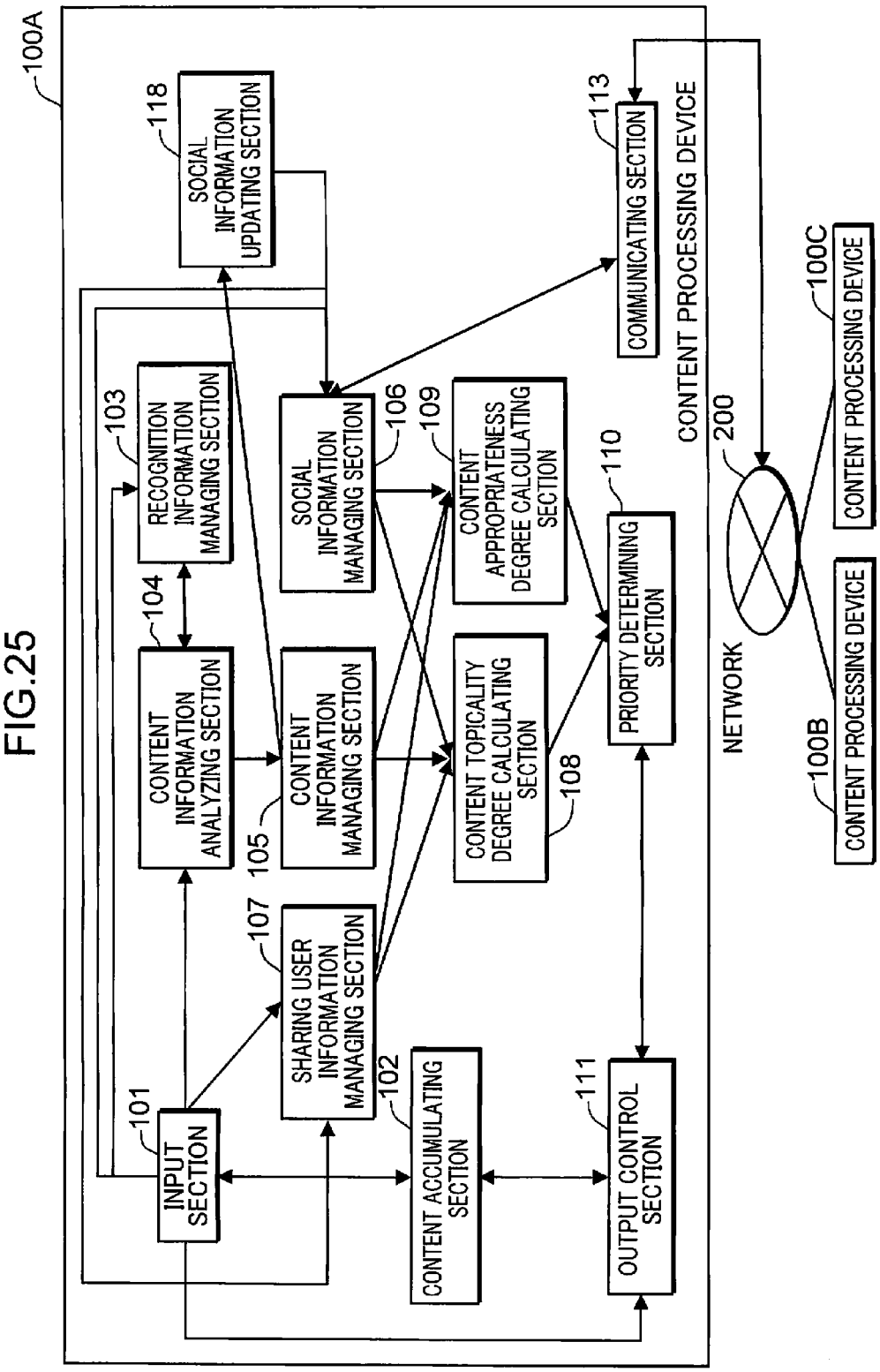
FIG. 25 is a block diagram showing an example of a configuration of a content processing device in a sixth embodiment of the invention.

FIG. 25 is a block diagram showing a configuration of a content processing device 100A in the sixth embodiment of the invention. Referring to FIG. 25, constituent elements which are substantially identical or equivalent to those shown in FIG. 1 and FIG. 22 are indicated with the same reference signs, and description thereof is omitted herein.

Referring to FIG. 25, the content processing device 100A is provided with a social information updating section 118, in addition to the constituent elements shown in FIG. 22. Further, the content processing device 100A is connected to a content processing device 100B and to a content processing device 100C as external devices via a network 200.

The content processing device 100A in the sixth embodiment may be configured of a personal computer or a video recorder into which an external storage medium stored with e.g. images or moving image contents is insertable; or may be configured of a digital still camera, a digital video camera, or a mobile terminal which is operable to photograph still images or moving images; or may be configured of a server device which provides a network service for content management.

In this embodiment, an input section 101 receives input of photographing device information relating to a photographing device with which a content has been photographed, and user information relating to the owner of the photographing device; outputs the received information to a recognition information managing section 103; and registers the outputted information into a photographing user table. The photographing user table is managed by a recognition information managing section 103. The photographing user table is e.g. a table, in which the user name of the user who owns a photographing device, and information relating to the photographing device are correlated with each other.

A content information analyzing section 104 analyzes a content received by the input section 101; acquires information relating to the photographing device with which the content has been photographed; acquires information (hereinafter, called as photographing user information (e.g. a user name) for identifying the photographing user of the content, referring to the photographing user table to be managed by the recognition information managing section 103, based on the acquired photographing device information; and registers the acquired information into the content information table by correlating the acquired information and the content with each other (see FIG. 26).

Further, the content information analyzing section 104 also acquires subject person information (such as a person name, countenance, and pose) included in the content by analyzing the content, and registers the acquired subject person information into a content information table by correlating the acquired subject person information and the content with each other.

In this embodiment, the photographing user information is acquired from the photographing device information. The invention is not limited to the above. Alternatively, the photographing user information may be acquired from tag information (e.g. the name of a photographing user) attached to the content at the time of photographing the content by the photographing user.

The social information updating section 118 adjusts the degree of intimacy of a subject person included in a certain content with respect to the photographing user of the certain content in the social information to be managed by a social information managing section 106, with use of the relationship between the photographing user and the subject person.

In this example, the term "adjust" means increase or decrease the degree of intimacy specified in the social information table shown FIG. 3, based on a relationship between a photographing user and a subject person included in the content. In this example, description is made on the premise that the degree of intimacy is an object to be adjusted. The invention is not limited to the above. Alternatively, a parameter other than the degree of intimacy in the social information may be an object to be adjusted.

For instance, in the case where a subject person in a content has a big smile, or looks with an active pose, the social information updating section 118 may adjust an existing degree of intimacy in such a manner that the degree of intimacy of the subject person with respect to the photographing user increases. Further, in the case where a subject person looks blunt or looks like just standing idly, the social information updating section 118 may adjust an existing degree of intimacy in such a manner that the degree of intimacy of the subject person with respect to the photographing user decreases. This is based on the idea that in the case where a subject person has a big smile or looks with an active pose, the subject person may feel friendly to the photographing user.

As a concrete processing, firstly, the recognition information managing section 103 stores in advance information on various face expressions and frameworks as reference data. Then, the content information analyzing section 104 acquires the name of the subject person and the countenance of the subject person based on a result of a face recognition processing and acquires the pose of the subject person based on a result of a framework recognition processing by performing the face recognition processing and the framework recognition processing with respect to the content, with use of the recognition information to be managed by the recognition information managing section 103; and registers the acquired countenance and pose into the content information table by correlating the acquired countenance and pose, and the content name of the content with each other.

Specifically, the content information analyzing section 104 digitizes a degree of smile regarding e.g. the countenance of a subject person in each of contents, based on an inclination of the corners of the eyes, the cheeks and the corners of the mouth; and registers the degree of smile into the content information table. Further, the content information analyzing section 104 digitizes a degree of body inclination of the subject person, based on e.g. an inclination of the arms or legs; and registers the degree of body inclination of the subject person into the content information table. The digitized degree of smile and the digitized degree of body inclination show a relationship between the photographing user and the subject person.

FIG. 26 shows an example of the content information table. As shown in FIG. 26, the content information table is provided with a content name column, a subject person column, a smile degree column, a body inclination degree column, and a photographing user information column.

The content information table as exemplified in FIG. 26 holds therein, a degree of smile and a degree of body inclination of each of the user "G" and the user "J", who are the subject persons included in the content "P-001". For instance, the degree of simile of the user "G" is "50", and the degree of body inclination of the user "G" is "70". The larger the degree of smile is, the bigger the smile is; and the larger the degree of body inclination is, the more the body is inclined. The upper limits of the degree of smile and the degree of body inclination are both "100", and the lower limits of the degree of smile and the degree of body inclination are both "0".

In this example, the digitized values representing the degree of smile and the degree of body inclination are not smaller than 0 but not larger than 100. The way of representing the degree of smile and the degree of body inclination is not limited to the above. Alternatively, the degree of smile and the degree of body inclination may be represented by several levels such as levels A through E, whose granularity lowers stepwise. In the modification, the social information updating section 118 may stepwise increase the degree of intimacy of a subject person with respect to a photographing user, as the degree of smile increases and the degree of body inclination increases.

The method for adjusting the degree of intimacy of a subject person with respect to a photographing user is not limited to the above. For instance, the intimacy degree may be adjusted with use of e.g. the position, the number, the size, and the number of times of appearance of subject persons.

In the above modification, for instance, in the case where a subject person is located in the middle of a content, or in the case where the number of subject persons included in a content is small, or in the case where the size of a subject person is large, the degree of intimacy of the subject person with respect to the photographing user may be adjusted to be large. Further, the degree of intimacy of a subject person with respect to a photographing user may be adjusted to increase, as the number of times of appearance of the subject person in a content photographed by a certain photographing user increases.

On the other hand, in the case where a subject person is located at an edge of a content, in the case where the number of subject persons included in a content is large, or in the case where the size of a subject person is small, the social information updating section 118 may set the degree of intimacy of the subject person with respect to the photographing user to be small. Further, the social information updating section 118 may decrease the degree of intimacy of a subject person with respect to a photographing user, as the number of times of appearance of the subject person decreases in a content photographed by a certain photographing user.

Next, description is made about an example as to how existing social information is updated by using plural social informations held by plural content processing devices connected to a network, for implementing a content topicality degree calculation processing and a content appropriateness degree calculation processing with use of versatile social informations.

The social information updating section 118 acquires social information to be managed by the social information managing section 106 with respect to all the content processing devices (in this example, a content processing device 100B and a content processing device 100C) connected to the network 200 via a communicating section 113; and updates the social information of the social information managing section 106, based on the acquired social informations of all the content processing devices.

As an example of the updating method, it is possible to use a method, wherein a degree of intimacy between users is summed up in all the social informations individually with respect to each of the user pairs, an average value of the summation is calculated, and the degree of intimacy is updated with use of the calculated average value, based on the idea that all the acquired social informations are taken into consideration. In this example, an average value of the summation is calculated for making the allowable range of the degree of intimacy before updating and the allowable range of the degree of intimacy after updating identical to each other.

Specifically, in the case where the degree of intimacy of the user "A" with respect to the user "B" is "2.0" in the content processing device 100A, is "3.0" in the content processing device 100B, and is "3.4" in the content processing device 100C, the social information updating section 118 of the content processing device 100A updates the degree of intimacy of the user "A" with respect to the user "B" as follows.

$$\begin{pmatrix} \text{degree of intimacy of} \\ \text{user } ''A'' \text{ with respect to user} \\ ''B'' \text{ in content processing device } 100A \\ \text{after social information updating} \end{pmatrix} =$$

$$\frac{\begin{pmatrix} \begin{pmatrix} \text{degree of intimacy of user } ''A'' \text{ with respect} \\ \text{to user } ''B'' \text{ in content processing device} \\ 100A \text{ before social information updating} \end{pmatrix} + \\ \begin{pmatrix} \text{degree of intimacy of user } ''A'' \text{ with} \\ \text{respect to user } ''B'' \text{ in content processing device } 100B \end{pmatrix} + \\ \begin{pmatrix} \text{degree of intimacy of user } ''A'' \text{ with respect to} \\ \text{user } ''B'' \text{ in content processing device } 100C \end{pmatrix} \end{pmatrix}}{(\text{number of content processing devices})} =$$

$$(2.0 + 3.0 + 3.4)/3 = 2.8$$

In this example, there has been described a method for updating the degree of intimacy between specific users, with use of a value which is obtained by dividing a summation result of the degree of intimacy between specific users in all the content processing devices with the number of all the content processing devices. The method for updating the degree of intimacy between specific users is not limited to the above. For instance, it is possible to use a method for updating the degree of intimacy by directly using a summation result of the degree of intimacy between specific users in all the content processing devices. Further alternatively, it is possible to use a method, wherein a value obtained by weighted summation of the degree of intimacy between specific users in each of the content processing devices is set as a degree of intimacy, in accordance with the degree of intimacy of the device owner user of the content processing device 100A with respect to the device owner user of other content processing device in summing up the degree of intimacy between the specific users in all the content processing devices.

In the above modification, for instance, let it be assumed that the degree of intimacy of the user "A" with respect to the user "B" is "2.0" in the content processing device 100A, is "3.0" in the content processing device 100B, is "3.4" in the content processing device 100C; and the degree of intimacy of the user "A" with respect to the user "A" as the device owner user of the content processing device 100A is "1.0" in the content processing device 100A, the degree of intimacy of the user "A" with respect to the user "B" as the device owner user of the content processing device 100B is "2.0" in the content processing device 100A, and the degree of intimacy of the user "A" with respect to the user "C" as the device owner user of the content processing device 100C is "1.0" in the content processing device 100A. Then, the social information updating section 118 of the content processing device 100A updates the degree of intimacy of the user "A" with respect to the user "B" as follows.

$$\begin{pmatrix} \text{degree of intimacy of user } ''A'' \text{ with} \\ \text{respect to user } ''B'' \text{ in content processing device } 100A \\ \text{after social information updating} \end{pmatrix} =$$

$$\begin{pmatrix} \begin{pmatrix} \text{degree of intimacy of user } ''A'' \text{ with} \\ \text{respect to user } ''A'' \text{ in content processing device } 100A \end{pmatrix} *$$

$$\begin{pmatrix} \text{degree of intimacy of user } ''A'' \text{ with respect} \\ \text{to user } ''B'' \text{ in content processing device} \\ 100A \text{ before social information updating} \end{pmatrix} +$$

$$\frac{\begin{pmatrix} \begin{pmatrix} \text{degree of intimacy of user } ''A'' \text{ with respect to} \\ \text{user } ''B'' \text{ in content processing device } 100A \end{pmatrix} * \\ \begin{pmatrix} \text{degree of intimacy of user } ''A'' \text{ with respect to} \\ \text{user } ''B'' \text{ in content processing device } 100B \end{pmatrix} + \\ \begin{pmatrix} \text{degree of intimacy of user } ''A'' \text{ with respect to} \\ \text{user } ''C'' \text{ in content processing device } 100A \end{pmatrix} * \\ \begin{pmatrix} \text{degree of intimacy of user } ''A'' \text{ with respect to} \\ \text{user } ''B'' \text{ in content processing device } 100C \end{pmatrix} \end{pmatrix}}{(\text{number of content processing devices})} =$$

$$(1.0 * 2.0 + 2.0 * 3.0 + 1.0 * 3.4)/3 = 3.8$$

In the foregoing description, there has been described a method for applying weighting to a degree of intimacy between specific users, by multiplying a degree of intimacy between specific users before updating in each of the content processing devices with a degree of intimacy between the device owner users. The weighting method is not limited to the above.

Further, in this section, there has been described adjusting the degree of intimacy of a subject person with respect to a photographing user, and adjusting the degree of intimacy based on social information of all the content processing devices acquired by the content processing device 100A via the network 200. It is possible to use either one of the intimacy degree adjustments.

With the above configuration, a degree of intimacy is adjusted based on a relationship between a photographing user of a content and a subject person included in the content, each time a content is added. Accordingly, it is possible to calculate a content topicality degree and a content appropriateness degree, taking into consideration of the relationships between users in the real world and a time-wise change of the social information; and to determine the priority of a content to be outputted. Further, social information is acquired from all the content processing devices connected to a network, and the social information is updated with use of the acquired social informations of all the content processing devices. Accordingly, it is possible to calculate a content topicality degree and a content appropriateness degree with use of versatile social informations, and to determine the priority of a content to be outputted.

Seventh Embodiment

This embodiment is directed to a configuration of adjusting the social information, based on users' operation logs such as content browsing, enlarging, copying, printing, transferring, transmitting, processing, deleting and posting. Since the content topicality degree calculation processing and the content appropriateness degree calculation processing in the seventh embodiment are the same as those described in the foregoing embodiments, description thereof is omitted herein.

Figure 27:
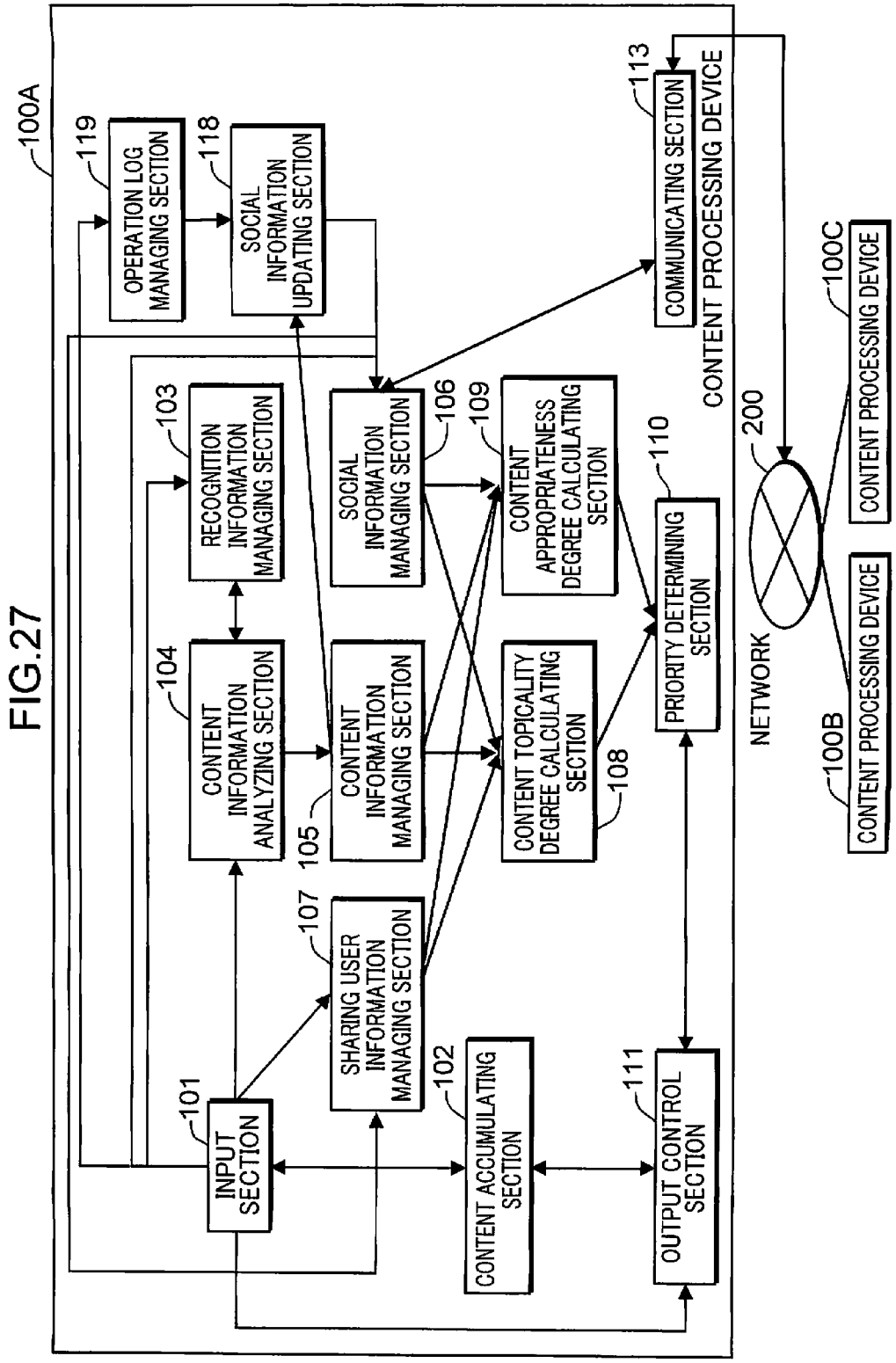
FIG. 27 is a block diagram showing an example of a configuration of a content processing device in a seventh embodiment of the invention.

FIG. 27 is a block diagram showing a configuration of a content processing device 100A in the seventh embodiment of the invention. Referring to FIG. 27, constituent elements which are substantially identical or equivalent to those shown in FIG. 1 and FIG. 25 are indicated with the same reference signs, and description thereof is omitted herein.

Referring to FIG. 27, the content processing device 100A is provided with an operation log managing section 119, in addition to the constituent elements shown in FIG. 25. Further, the content processing device 100A is connected to a content processing device 100B and to a content processing device 100C as external devices via a network 200.

The content processing device 100A in the seventh embodiment may be configured of a personal computer or a video recorder into which an external storage medium stored with e.g. images or moving image contents is insertable; or may be configured of a digital still camera, a digital video camera, or a mobile terminal which is operable to photograph still images or moving images; or may be configured of a server device which provides a network service for content management.

In this embodiment, an input section 101 receives input of operation user information for identifying an operation user who operates a content accumulated in a content accumulating section 102 of the content processing device 100A, and operation information (e.g. the number of times and an accumulation time of various operations such as browsing, enlarging, processing, copying, printing, transferring, transmitting, posting, and deleting) for identifying an operation with respect to the content by the operation user; and registers content information for identifying the content to be operated, the operation user information, and user's operation logs into an operation log information table to be managed by the operation log managing section 119 by correlating the content information, the operation user information, and the user's operation logs with each other. FIG. 28 is a diagram showing an example of the operation log information table.

The operation log information table shown in FIG. 28 is provided with an operation user column, a content name column, an operation type column, a number of times column, and an accumulation time (min) column. User information relating to the operation user is described in the operation user column. For instance, a user name is used as the operation user information. Content information is described in the content name column. For instance, a code string assigned for identifying a content is used as the content information. Operation information is described in the operation type column. For instance, an operation name is used as the operation information. The number of times of the operation is described in the number of times column. An accumulation time required for the operation is described in the accumulation time (min) column.

The table exemplified in FIG. 28 describes the number of times of each of the operations which have been performed with respect to the content "P-001" by the user "A", and the accumulation times (min) of the respective operations, based on the premise that the operation user is the user "A". For instance, let it be assumed that the user "A performed the operation "browsing" twelve times for the content "P-001", and the accumulation time of the operation is ten minutes.

In this example, the accumulation time is measured only for the operations "browsing" and "processing", and is not measured for the operations other than the above, as indicated by the sign "–". This is merely an example, and the accumulation time may be measured for the operations other than "browsing" and "processing", as well as for the operations "browsing" and "processing". Further, in this example, nine types of operations i.e. "browsing", "enlarging", "processing", "copying", "printing", "transferring", "transmitting", "posting", and "deleting" are shown. The operation types may not be limited to the above.

The operation log managing section 119 manages an operation log table shown in FIG. 28. A social information updating section 118 adjusts the degree of intimacy of an operation user who operates a content, which is to be managed by a social information managing section 106, with respect to a subject person included in the content, with use of the content information relating to the content to be operated, the operation user information, and operation log/subject person information that has been described in the operation log table.

The social information updating section 118 adjusts the degree of intimacy of an operation user who operates the content with respect to a subject person included in the content to increase, in the case where the content is browsed by enlarging, or the content is printed, or the number of times of browsing the content is equal to or larger than a predetermined threshold value (e.g. "ten").

Further, the social information updating section 118 adjusts the degree of intimacy of an operation user who operates the content with respect to a subject person included in the content to decrease, in the case where the content is deleted, or the content browsing accumulation time is equal to or smaller than a predetermined threshold value (e.g. "ten seconds"). This is based on the idea that an operation user may frequently perform the operation such as browsing or enlarging a content including a subject person to whom the operation user feels friendly.

As a concrete processing, firstly, the social information updating section 118 specifies identical contents, using the content name as a keyword, based on the operation log table to be managed by the operation log managing section 119 and a content information table to be managed by a content information managing section 105; and correlates the operation user information and subject information for the specified identical contents. For instance, regarding the content "P-001", the user "A" as the operation user information, and the user "G" and the user "J" as the subject person information are correlated with each other. Then, the degrees of intimacy of the user "A" with respect to the user "G" and with respect to the user J" are adjusted, with use of the number of times of the operation and the accumulation time of the operation of the content that have been described in the operation log table shown in FIG. 28. In this example, as far as the type of the operation is other than "deleting", the degrees of intimacy of the user "A" with respect to the user "G" and with respect to the user "J" increase, as the number of times of the operation increases, and the accumulation time of the operation increases. If the type of the operation is "deleting", the degree of intimacy is lowered by a predetermined value (e.g. "0.05").

The method for adjusting the degree of intimacy of an operation user with respect to a subject person is not limited to the above. For instance, it is possible to adjust the degree of intimacy in the operation such as enlarging or processing in accordance with an area to be operated or in accordance with a degree of the operation. For instance, in the case where the operation user intends to enlarge or process a content, the adjustment degree for the degree of intimacy with respect to a subject person included in an operation user's operation area is set larger than the adjustment degree for the degree of intimacy with respect to a subject person who is not included in the operation user's operation area. Further, the adjustment degree for the degree of intimacy is stepwise changed in accordance with an enlargement ratio of the "enlarging" operation or in accordance with the duration of a processing time required for the "processing" operation. For instance, in the case where the enlargement ratio "20%" is set for the "enlarging" operation, "0.2" is added to the degree of intimacy of the operation user with respect to a subject person;

and in the case where the enlargement ratio "50%" is set, "0.5" is added to the degree of intimacy of the operation user with respect to a subject person, whereby the degree of intimacy is adjusted.

In the above example of the intimacy degree adjusting method, a subject person is used as a subject included in a content. The invention is not limited to the above. For instance, in the case where a degree of intimacy is specified between e.g. a subject (such as animals, foods, plants, buildings, or vehicles) other than a subject person included in a content, and the operation user, it is possible to adjust the intimacy degree with use of information relating to a subject other than a subject person.

Further alternatively, as well as the sixth embodiment, the social information updating section 118 may acquire social information to be managed by the social information managing section 106 with respect to all the content processing devices (in this example, a content processing device 100B and a content processing device 100C) connected to the network 200 via a communicating section 113; and update the social information of the social information managing section 106, based on the acquired social informations of all the content processing devices. Since a concrete processing of the modification is the same as the processing described in the sixth embodiment, description thereof is omitted herein.

With the above configuration, the social information is adjusted based on the operation log on the operations such as user's browsing, enlarging, copying, printing, transferring, transmitting, processing, deleting and posting a content. Accordingly, it is possible to adjust the social information with respect to a subject included in a content by operating the content, even if the user is not a user who photographed the content, or the user is a user who is not included in the content. Further, since the social information is adjusted with use of the social information to be managed by other content processing device, it is possible to calculate a content topicality degree and a content appropriateness degree, with use of social information of a significantly large number of users, and to determine the priority of a content to be outputted.

The embodiments of the invention are merely examples embodying the invention. The invention should not be construed to be limited to the embodiments. The invention may be modified in various ways as far as such modifications do not depart from the gist of the invention.

For instance, in the embodiments of the invention, the content processing device 100, 100A is provided with the recognition information managing section 103 and the content information analyzing section 104. Alternatively, it is possible to configure a content processing device without providing these elements. In the modification, for instance, the inventive content processing device may perform a processing of acquiring content information generated by other device, and storing the acquired content information into a content information managing section 105.

Figure 29A:
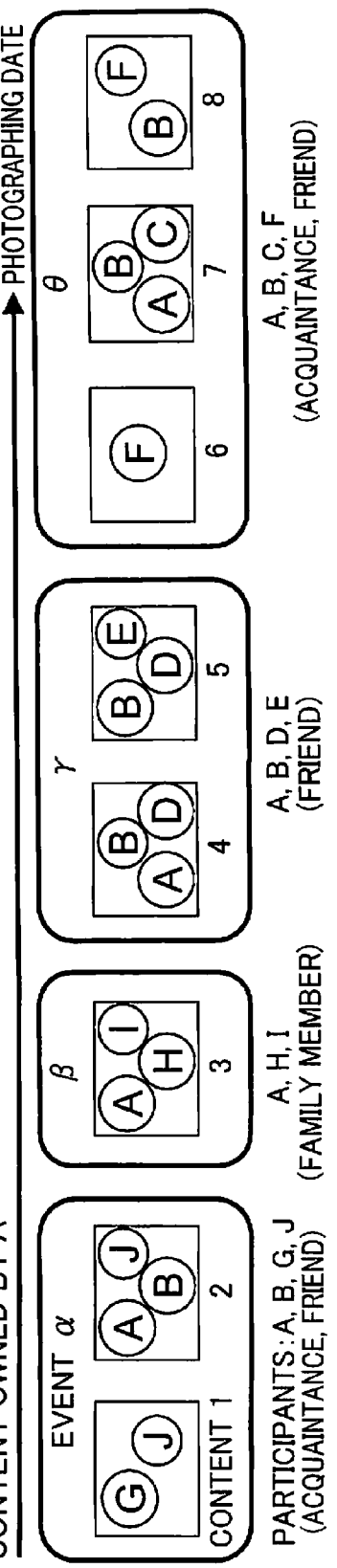
FIG. 29 shows contents used in an experiment at (A), and shows social information used in the experiment at (B)
Figure 29B:
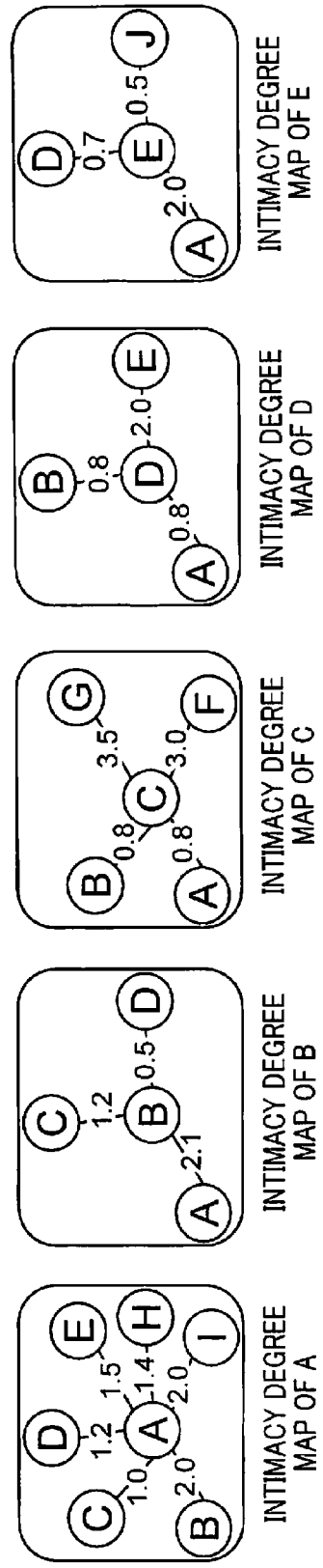

Next, there is described an experiment conducted for verifying the differences between the invention, and patent literatures 1 and 2. The section (A) of FIG. 29 shows the contents used in the experiment, and the section (B) of FIG. 29 shows the social information used in the experiment. In the section (A) of FIG. 29, for instance, the content 1 and the content 2 are included in the event α, and the users "G" and "J" are included as subject persons in the content 1. In the section (B) of FIG. 29, intimacy degree maps of the users "A" through "E" are shown. For instance, the user "A" has a direct relationship with respect to the users "B", "C", "D", "E", "H", and "I", and the degrees of intimacy as expressed by the respective numerical values are specified with respect to each of user pairs.

FIGS. 30 through 32 show the contents arranged in the order of priority based on the experiment result. The section (A) shows an experiment result of patent literature 1, the section (B) shows an experiment result of patent literature 2, and the section (C) shows an experiment result of the invention.

Patent literature 1 discloses, as described in the section of Background Art, a method wherein a degree of intimacy between subject persons is calculated based on subject person information of a content (such as the distance between persons, frequency of appearance, and the number of persons), and presentation of a content including a user who has a high degree of intimacy with the browser user is prioritized.

Patent literature 2 discloses, as described in the section of Background Art, a method, wherein in the case where a content owner user browses the contents with other user, presentation of a content including a user whose degree of intimacy with the content owner user is lower than the degree of intimacy between the content owner user and other user is prioritized.

The present experiments with respect to patent literature 1, patent literature 2 and the invention were conducted based on the premise that the content owner user was the user "A" and the sharing users were the user "A" through "C", and in the conditions shown in the sections (A) and (B) of FIG. 29. In the experiment with respect to patent literature 1, the priorities of the contents were determined according to the following order: firstly, in the descending order of the degree of intimacy between each respective sharing user and each respective subject person, secondly, in the descending order of the degree of intimacy between the content owner user and each respective subject person, and thirdly, according to the oldness of a photographing date.

Further, in the experiment with respect to patent literature 2, the priorities of the contents were determined according to the following order: firstly, in the descending order of the degree of intimacy between each respective sharing user and each respective subject person, secondly, in the descending order of the number of sharing users included in each of the contents, and thirdly, according to the oldness of a photographing date.

In the experiment with respect to the invention, the priorities of contents were determined with use of the above approach used in the experiment with respect to patent literature 2.

Regarding the rankings of top five subject persons whose intimacy degree with respect to the sharing users "A" through "C" are determined to be high, based on the intimacy degree maps shown in the section (B) of FIG. 29, the user "G" (intimacy degree: 3.5) took the first place, the user "F" (intimacy degree: 3.0) took the second place, the user "A" (intimacy degree: 2.9 (=2.1+0.8)) took the third place, the user "B" (intimacy degree: 2.8 (=2.0+0.8)) took the fourth place, and the user "C" (intimacy degree: 2.2 (=1.0+1.2)) took the fifth place.

Accordingly, in the experiment with respect to patent literature 1, as shown in the section (A) of FIG. 30, the priorities of the content 1 including the users "G" and "J", and the content 6 including the user "F" were ranked the first place and the second place by calculation. Further, in the experiment with respect to patent literature 2, the priorities of the content 1 and the content 6 were ranked the first place and the third place by calculation.

As described above, in the approaches of patent literatures 1 and 2, merely the priority of contents including a larger number of sharing user as friends is ranked high by calculation; and the priority of a content (e.g. the content 7) including a large number of sharing users, or a content (e.g. the content 4) including a friend (user "D") common between the sharing users as a subject person is not ranked high by calculation.

On the other hand, in the experiment with respect to the invention, as shown in the section (C) of FIG. 30, the priorities of the content 4 and the content 7 were respectively ranked the first place and the second place by calculation. Accordingly, it is clear that in the invention, the priority of a content having a high topicality degree between sharing users is high. This is because in the invention, a sum of content topicality degrees of each of the sharing users is adopted as the content topicality degree, and the priority of each of contents is determined accordingly.

Further, as shown in the sections (A) and (B) of FIG. 31, in patent literatures 1 and 2, the priority of the content 2 is ranked higher than the priority of the content 4 by calculation. In this example, the content 2 includes the user "J" who has no direct relationship with respect to any one of the users "A" through "C" as the sharing users, in other words, includes the user "J" who is not a common friend to the sharing users. Further, the content 4 includes the user "D", and the user "D" is a friend to the users "A" and "B" as the sharing users.

On the other hand, in the invention, as shown in the section (C) of FIG. 31, the priority of the content 4 is set higher than the priority of the content 2 by calculation. Accordingly, it is clear that in the invention, the priority of a content including a common friend to the sharing users is set higher than the priority of a content which does not include a common friend to the sharing users by calculation. This is because in the invention, a sum of content topicality degrees of each of the sharing users is adopted as the content topicality degree, and the priority of each of contents is determined accordingly.

Further, as shown in the sections (A) and (B) of FIG. 32, in the experiment with respect to patent literatures 1 and 2, the priority of the content 1 is ranked the first place. In this example, since the content 1 is a content belonging to the event α in which the user "C" did not participate, it is highly likely that the user "C" may feel uncomfortable at browsing the content 1. Further, in the experiments with respect to patent literatures 1 and 2, the priority of the content 2 is set higher than in the experiment with respect to the invention. Similarly to the content 1, the content 2 is also a content belonging to the event α in which the user "C" did not participate. Accordingly, it is highly likely that the user "C" may feel uncomfortable at browsing the content 2.

On the other hand, in the experiment with respect to the invention, as shown in the section (C) of FIG. 32, the priorities of the content 2 and the content 1 are respectively ranked low as the sixth place and the eighth place by calculation. Accordingly, it is clear that in the invention, the priority of a content which is likely to make a sharing user feel uncomfortable is set low by calculation. This is because in the invention, the priority of each of contents is determined with use of a content appropriateness degree.

Figure 33:
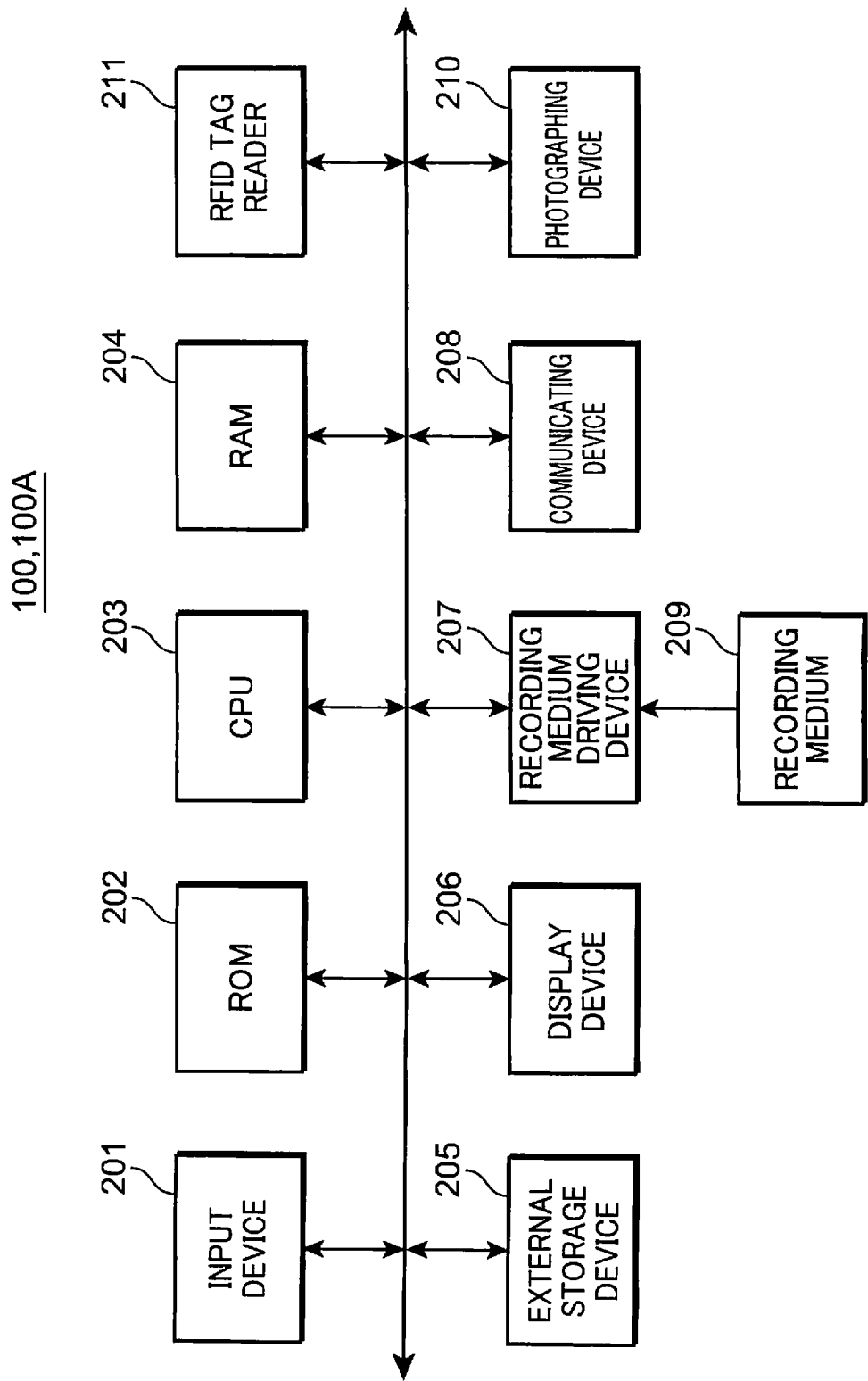
FIG. 33 is a block diagram showing a hardware configuration of a content processing device embodying the invention.

Next, a hardware configuration of a content processing device embodying the invention is described. FIG. 33 is a block diagram showing a hardware configuration of the content processing device 100, 100A as the embodiments of the invention. The content processing device 100, 100A is configured of e.g. a computer; and is provided with an input device 201, an ROM (Read Only Memory) 202, a CPU (Central Processing Unit) 203, an RAM (Random Access Memory) 204, an external storage device 205, a display device 206, a recording medium driving device 207, a communicating device 208, a photographing device 210, and an RFID tag reader 211. Each of the blocks is connected to an internal bus. Various data are inputted to and outputted from the blocks via the bus, and various processings are executed under the control of the CPU 203.

The input device 201 is constituted of e.g. a keyboard or a mouse, and is used for inputting various data by a user. The ROM 202 is stored with a system program such as BIOS (Basic Input/Output System). The external storage device 205 is constituted of e.g. a hard disk drive, and is stored with e.g. a predetermined OS (Operating System) and a content processing program. The CPU 203 reads out e.g. the OS and the content processing program from the external storage device 205, and controls the operation of each of the blocks. The RAM 204 is used as e.g. a work area for the CPU 2033.

The display device 206 is constituted of e.g. a liquid crystal display or an organic EL display, and displays various images under the control of the CPU 203. The recording medium driving device 207 is constituted of e.g. a CD-ROM drive or a flexible disc drive.

The content processing program is stored in a computer-readable recording medium 209 such as a CD-ROM, and is provided to the users. The users are allowed to install the content processing program into their computers by causing the recording medium driving device 207 to read out the recording medium 209. Alternatively, a program may be stored in a server on the Internet, and the content processing program may be installed to the computers by downloading the program from the server.

The communicating device 208 is constituted of e.g. a communicating device for connecting the content processing device 100, 100A to the Internet, and transmits/receives data to and from the other device via the Internet under the control of the CPU 3.

The input section 101 shown in e.g. FIG. 1 is constituted of e.g. the input device 201, the photographing device 210, the RFID tag reader 211, and of a program to be included in the content processing program which controls these devices. Further, the content accumulating section 102 shown in e.g. FIG. 1 is constituted of e.g. the external storage device 205, and a program to be included in the content processing program which controls the external storage device 205. Further, the recognition information managing section 103, the content information managing section 105, the social information managing section 106, the sharing user information managing section 107, the user attribute managing section 112, and the operation log managing section 119 shown in e.g. FIG. 1 are constituted of a program to be included in the content processing program and to be executed by the CPU 203, and of a storage device (the RAM 204 and the external storage device 205) which stores data to be managed by the program.

Further, the content information analyzing section 104, the content topicality degree calculating section 108, the content appropriateness degree calculating section 109, the priority determining section, the output control section 111, the relationship information acquiring section 114, and the social information updating section 118 shown in e.g. FIG. 1 are constituted of a program to be included in the content processing program and to be executed by the CPU 203. Further, the communicating section 113 shown in e.g. FIG. 1 is constituted of the communicating device 208.

The following is a summary of the technical features of the content processing device.

(1) The aforementioned content processing device is a content processing device for processing at least one or more contents. The content processing device includes an input section which allows a user to input a content; a sharing user information managing section which manages sharing user information relating to at least one or more sharing users who share the content inputted from the input section; a content information managing section which manages subject information relating to a subject included in the content; a social information managing section which manages social information which specifies a relationship between the users, and a degree of intimacy between the users, the degree of intimacy being a digitized value representing intimacy between the users; a content appropriateness degree calculating section which extracts a sharing user who does not appear in the subject of the content as an unappearing sharing user, and which calculates a content appropriateness degree in such a manner that the value for the content appropriateness degree decreases as the degree of intimacy between the extracted unappearing sharing user and the subject increases, with use of the subject information and the sharing user information, the content appropriateness degree being a digitized value representing a degree of appropriateness of the content to be shared between the sharing users; a priority determining section which calculates a content evaluation value with use of the calculated content appropriateness degree, and which determines a priority relating to output of the content based on the calculated content evaluation value; and an output control section which controls the output of the content, based on a determination result obtained by the priority determining section.

With the above configuration, a sharing user who does not appear in the subject of the content as an unappearing sharing user is extracted; the degree of intimacy between the unappearing sharing user and the subject is extracted from the social information; the content appropriateness degree is calculated in such a manner that the value for the content appropriateness degree decreases, as the degree of intimacy between the unappearing sharing user and the subject increases; the content evaluation value is calculated based on the calculated content appropriateness degree; the priority of the content is determined based on the calculated content evaluation value, and the content is outputted based on the determined priority.

Accordingly, it is possible to prioritize output of the content which is appropriate for sharing between the sharing users, and to reduce the user's operation load (a work and a time required for a user to select a content by himself or herself) in sharing the content.

(2) Preferably, the content processing device may further include a content topicality degree calculating section which calculates a content topicality degree, based on the subject information, the sharing user information and the social information, the content topicality degree being a digitized value representing a topicality degree of the content which serves as a topic between the sharing users, wherein the priority determining section calculates the content evaluation value with use of the calculated content topicality degree, as well as with use of the calculated content appropriateness degree.

With the above configuration, the content topicality degree as a digitized value representing the topicality degree of the content which serves as a topic between the sharing users is calculated, and the content evaluation value is calculated with use of the calculated content topicality degree, as well as with use of the calculated content appropriateness degree.

Accordingly, it is possible to prioritize output of the content which is appropriate for sharing between the sharing users, and to prioritize output of the content having a high topicality degree between the sharing users.

(3) Preferably, the content processing device may further include a content information analyzing section which analyzes the subject information based on the content. The content information managing section manages content information in which the subject information and meta-information of the content are correlated with each other in the content. The content information analyzing section classifies the content according to events based on the meta-information, and generates event information by specifying an event participant user who participated in an event based on the subject information. The content appropriateness degree calculating section extracts, from the event information, a sharing user who did not participate in the event as an event non-participant sharing user, and calculates a content appropriateness degree of the content of the event in such a manner that the value for the content appropriateness degree decreases, as the number of event non-participant sharing users increases and the degree of intimacy between the event non-participant sharing user and the event participant user increases.

With the above configuration, for instance, a content is classified according to events depending on the meta-information such as the photographing dates, and the event non-participant sharing user as a sharing user who did not participate in the event is extracted. Then, the content appropriateness degree included in each of the events is calculated in such a manner that the value for the content appropriateness degree decreases, as the degree of intimacy between the event non-participant sharing user and the event participant user who participated in the event increases in each of the events. Accordingly, it is possible to set the priority of the content, which the event non-participant sharing user may feel uncomfortable at browsing, low.

For instance, let it be assumed that the sharing users "A" and "B" participated in an event, and the sharing user "C" who did not participate in the event was not notified of the event in advance. In such a case, if the sharing users "A" through "C" browse the content included in the event, the sharing user "C" may have uncomfortable feeling such as loneliness, which may impair the human relationship between the sharing users "A" and "B", and the sharing user "C". With the above configuration, it is possible to avoid such a circumstance.

(4) Preferably, the content topicality degree calculating section may extract, from the social information, a degree of intimacy between the sharing user and the subject included in the content, and may calculate a content topicality degree in such a manner that the value for the content topicality degree increases, as the number of subjects whose degrees of intimacy with respect to the sharing user are large increases in the content of the events, and the priority determining section may calculate a content evaluation value in such a manner that the content evaluation value increases, as the value for the content topicality degree and the value for the content appropriateness degree increase in the content, and determines the priority of the content to be high in the descending order of the calculated content evaluation value.

With the above configuration, the content topicality degree is calculated in such a manner that the value for the content topicality degree increases, as the number of subjects whose degree of intimacy with respect to each of the sharing users is large increases in the content. Accordingly, it is possible to prioritize output of the content whose topicality degree is high for all the users sharing the content.

In this example, as far as the first user and the second user have a direct relationship with each other in the social information, in extracting the degree of intimacy between the first user and the second user from the social information, the content topicality degree calculating section and the content appropriateness degree calculating section may directly extract the degree of intimacy between the first user and the second user from the social information.

On the other hand, as far as the first user and the second user have an indirect relationship with each other via at least one or more linking users, the content topicality degree calculating section and the content appropriateness degree calculating section may calculate the degree of intimacy between the first user and the second user, based on the relationship between the first user and the second user via each of the linking users, even if the first user and the second user do not have a direct relationship with each other in the social information. Further, in the case where the first user and the second user neither have a direct relationship nor an indirect relationship with each other in the social information, the content topicality degree calculating section and the content appropriateness degree calculating section may set the intimacy degree to a predetermined value.

With the above configuration, as far as a certain user has an indirect relationship with respect to a sharing user, and the degree of intimacy between the certain user and the sharing user is high, the priority of the content is set high, even if the content includes the certain user who has no direct relationship with respect to the sharing user. On the other hand, as far as the degree of intimacy between the sharing user, and a certain user who has an indirect relationship with respect to the sharing user is low in the content, the priority of the content is set low, even if the content includes the certain user. Thus, according to the above configuration, it is possible to determine the priority of the content to be outputted, while reflecting the social informations of more versatile users.

In this example, in extracting, from the social information, the degree of intimacy between at least one or more sharing users, and all the subjects included in the content, the content topicality degree calculating section may cause the content information analyzing section to analyze the size, the position, the countenance and the pose of a subject included in the content, and may apply weighting to the degree of intimacy based on an analysis result.

With the above configuration, in calculating the content topicality degree, the degree of intimacy is weighted based on subject appearance information such as the size, the position, the countenance, and the framework of a subject included in the content. Accordingly, it is possible to prioritize output of the content including a subject with better appearance, among the contents including the subject.

In this example, the content topicality degree calculating section may extract, from the social information, the degree of intimacy between at least one or more sharing users, and all the subjects included in the content; may calculate the content topicality degree for each of the sharing users by summing up the extracted intimacy degrees; and may apply weighting to the calculated content topicality degree for each of the sharing users, based on the degree of intimacy between the content owner user and the sharing user that has been analyzed by the content information analyzing section.

With the above configuration, the content topicality degree is weighted for each of the sharing users, with use of the degree of intimacy between the content owner user and the sharing user, and the content topicality degree is calculated in the content. Accordingly, it is possible to prioritize output of the content having a particularly high topicality degree for the content owner user.

(5) Preferably, the content information analyzing section may specify a content owner user who owns the content, and the content appropriateness degree calculating section may apply weighting to the content appropriateness degree in such a manner that the content appropriateness degree of the content of the event increases in the case where the degree of intimacy between the content owner user and the event non-participant sharing user is equal to or larger than a predetermined threshold value in the event.

With the above configuration, in the case where the degree of intimacy between the event non-participant sharing user and the content owner user in a certain event is equal to or larger than the predetermined threshold value, in other words, in the case where the event non-participant sharing user and the content owner user have a very close relationship with each other, it is presumed that there is no problem in sharing the content included in the event. Then, the content appropriateness degree is weighted in such a manner that the content appropriateness degree increases in all the contents included in the event, regardless of the degree of intimacy between the event non-participant sharing user and the event participant user. Accordingly, the event non-participant sharing user is allowed to share a large number of contents, taking into consideration of the relationship with respect to the content owner user.

(6) Preferably, the sharing user information may include information indicating a position of an address of the sharing user, the content information managing section may manage photographing position information indicating a position of a photographing place of the content, and the content appropriateness degree calculating section may apply weighting to the content appropriateness degree in such a manner that the content appropriateness degree of the content increases in the case where a distance between information indicating the position of the address of the event non-participant sharing user and the photographing position information of the content included in the event is equal to or larger than a predetermined threshold value in the event.

With the above configuration, in the case where the distance to be calculated based on the photographing position information indicating the photographing place of a certain content i.e. the position of the photographing place of one scene in a certain event, and the information indicating the position of the address of the event non-participant sharing user, is equal to or larger than the predetermined value, and in the case where it is difficult for the event participant user to physically participate in the event, it is presumed that there is no problem in sharing the content. Then, the content appropriateness degree is weighted in such a manner that the content appropriateness degree of the content increases, and output of the event is prioritized. Accordingly, the event non-participant sharing user is allowed to share a large number of contents, taking into consideration of the distance between the address of the event non-participant sharing user and the event holding place.

In this example, the priority determining section may sum up the content topicality degree and the content appropriateness degree of all the contents included in each of the events, and may determine the priority in each of the events with use of the summation result.

With the above configuration, since the priority is determined in each of the events, the sharing users can share the content included in each of the events in the descending order of the priorities of the events, and can share the content in a versatile sharing manner depending on the event classification methods.

(7) Preferably, the content processing device may further include a user attribute managing section which manages a user attribute table for specifying a user attribute of all the users whose relationships have been defined with respect to a content owner user who owns the content, and a sharing content attribute policy which specifies an user attribute of the subject of which the content owner user permits content sharing with the sharing user in accordance with the user attribute of the sharing user, wherein the content appropriateness degree calculating section specifies, from the user attribute table, a user attribute of the sharing user and a user attribute of the subject included in the content, specifies, from the sharing content attribute policy, a user attribute of a subject of which the content is sharable by the specified user attribute of the sharing user, and sets the content appropriateness degree to a predetermined value for decreasing the content appropriateness degree in the content including a subject having a user attribute of which content sharing is not permitted by the user attribute of the sharing user.

With the above configuration, the priority of the content including a subject person having such a user attribute that may infringe or invade the privacy of the content owner user is lowered. Accordingly, in the case where the content owner user does not want a family member to view the content including his or her lover, and the user attribute of the sharing user is "family member", it is possible to prevent output of the content including the lover. Thus, it is possible to reduce a likelihood that the content owner user may feel uncomfortable.

(8) Preferably, the input section may receive input of owner user information as identification information of a device owner user who owns the content processing device, an electronic mail address of the device owner user, partner user information as identification information of a partner user who shares the content, and an electronic mail address of the partner user; and may cause the sharing user information managing section to manage the received information.

With the above configuration, it is possible to allow the user to input e.g. the electronic mail address of the partner user who shares the content, and to cause the content processing device to manage the electronic mail address of the partner user.

(9) Preferably, the content processing device may further include a communicating section which communicates with an external device via a network, wherein the content appropriateness degree calculating section calculates a content appropriateness degree, assuming that the device owner user and the partner user are the sharing users, and the output control section extracts the content based on the priority determined by the priority determining section, and designates the communicating section to transmit the extracted content to the electronic mail address of the partner user.

With the above configuration, automatically selected is the content which has a high topicality degree and which is appropriate for sharing between the device owner user who owns the content processing device, and the partner user who shares the content; and the selected content is transmitted to the electronic mail address of the partner user. Accordingly, it is possible to reduce the user's operation load (a work and a time required for a user's operation of selecting a content and transmitting an electronic mail with the selected content attached thereto) in sharing the content utilizing the electronic mail.

(10) Preferably, the content processing device may further include a communicating section which communicates, via a network, with a server device which provides a content sharing network service with which the content to be posted by a device owner user who owns the content processing device are shared between the prescribed users, and a relationship information acquiring section which is managed by the content sharing network service, and which acquires, via the communicating section, relationship information specifying a relationship between the prescribed users, and a degree of intimacy between the prescribed users, the degree of intimacy being a digitized value representing intimacy between the prescribed users, wherein the content appropriateness degree calculating section calculates a content appropriateness degree, assuming that the users included in the relationship information acquired by the relationship information acquiring section are the sharing users, and the output control section extracts the content to be posted to the content sharing network service, based on the priority determined by the priority determining section, and designates the communicating section to post the extracted content to the content sharing network service.

With the above configuration, automatically selected is the content which is appropriate for sharing with the user included in the relationship information to be managed by the content sharing network service, and the selected content is posted to the network service. Accordingly, it is possible to reduce the user's operation load (a work and a time required for a user's operation of selecting a content and posting the selected content to a content sharing network service) in sharing the content, utilizing the content sharing network service.

(11) Preferably, the content processing device may further include a communicating section which communicates with an external device via a network, and a current date calculating section which calculates a current date, wherein the sharing user information managing section manages schedule information of a device owner user who owns the content processing device, the content appropriateness degree calculating section calculates a content appropriateness degree in the case where a difference between the current date calculated by the current date calculating section and a scheduled date of a schedule registered in the schedule information is equal to or smaller than a predetermined value, assuming that the users associated with the schedule are the sharing users, and the output control section extracts the content, based on the priority determined by the priority determining section, and designates the communicating section to transmit the extracted content to a mobile terminal of the sharing user.

With the above configuration, as the scheduled date of the schedule registered in the schedule information of the device owner user is coming, the content which is appropriate for sharing between the device owner user and the users associated with the schedule is automatically selected, and the selected content is transferred to the mobile terminals of the users. Accordingly, it is possible to reduce the user's operation load (a work and a time required for a user to select a content before the scheduled date, and transfer the selected content to the mobile terminals) in sharing the content, utilizing the mobile terminals of the users who are scheduled to join the schedule.

(12) Preferably, the content information analyzing section may further include a social information updating section which specifies a relationship between a subject included in the content and a photographing user, based on the subject information and photographing user information for identifying the photographing user who photographed the content, and updates the social information based on the specified relationship.

With the above configuration, the social information is updated, based on the relationship between the photographing user who photographed the content, and a subject included in the content. Accordingly, it is possible to prioritize the content to be outputted by reflecting the relationship between the users in the real world, and by calculating the content topicality degree and the content appropriateness degree, taking into consideration of a time-wise change of the social information.

(13) Preferably, the content processing device may further include an operation log managing section which manages operation log information in which an operation log with respect to the content, and information for identifying the user who operated the content are correlated with each other; and a social information updating section which adjusts the degree of intimacy between the user who operated the content and a subject included in the content, based on the operation log information.

With the above configuration, the social information is adjusted, based on the users' operation logs such as content browsing, enlarging, copying, printing, transferring, transmitting, processing, deleting and posting. Accordingly, it is possible to adjust the social information with respect to a subject included in the content by operating the content, even if the user is not a user who photographed the content, or the user is a user who is not included in the content.

(14) Preferably, the content processing device may further include a communicating section which communicates with an external device via a network, wherein the social information updating section acquires, via the communicating section, social information to be managed by a social information managing section of another content processing device connected to the network, and updates the social information to be managed by the social information managing section of the content processing device of the own user, based on the acquired social information.

With the above configuration, the social information is acquired from the another content processing device connected to the network, and the social information is updated with use of the acquired social information. Accordingly, it is possible to calculate the content topicality degree and the content appropriateness degree with use of versatile social informations, and to determine the priority of the content to be outputted.

Further, the invention can be implemented by one or more integrated circuits.

Furthermore, the invention can be implemented as a program to be executed by a computer. It is needless to say that such a program can be distributed via a recording medium such as a CD-ROM or via a transmission medium such as the Internet.

INDUSTRIAL APPLICABILITY

The content processing device of the invention is advantageously applied to video recorders, home servers, digital still cameras, digital video cameras, personal computers, enterprise-oriented computers (workstations) which provide network services for content management, digital television receivers loaded with a function of downloading image contents, set-top box devices, car navigation systems, projectors, mobile terminals, music composition devices, digital photo frames, and remote controllable terminals for device control.

The invention claimed is:

1. A content processing device for processing at least one or more contents, comprising:
   an input section which allows a user to input a content;
   a sharing user information managing section which manages sharing user information relating to at least one or more sharing users who share the content inputted from the input section;
   a content information managing section which manages subject information relating to a subject included in the content;
   a social information managing section which manages social information which specifies a relationship between the users, and a degree of intimacy between the users, the degree of intimacy being a digitized value representing intimacy between the users;
   a content appropriateness degree calculating section which extracts a sharing user who does not appear in the subject of the content as an unappearing sharing user, and which calculates a content appropriateness degree in such a manner that a value for the content appropriateness degree decreases as the degree of intimacy between the extracted unappearing sharing user and the subject increases, with use of the subject information and the sharing user information, the content appropriateness degree being a digitized value representing a degree of appropriateness of the content to be shared between the sharing users;
   a priority determining section which calculates a content evaluation value with use of the calculated content appropriateness degree, and which determines a priority relating to output of the content based on the calculated content evaluation value; and
   an output control section which controls the output of the content, based on a determination result obtained by the priority determining section.

2. The content processing device according to claim 1, further comprising:
   a content information analyzing section which analyzes the subject information based on the content, wherein
   the content information managing section manages content information in which the subject information and meta-information of the content are correlated with each other in the content,
   the content information analyzing section classifies the content according to events based on the meta-information, and generates event information by specifying an event participant user who participated in an event based on the subject information, and
   the content appropriateness degree calculating section extracts, from the event information, a sharing user who did not participate in the event as an event non-participant sharing user, and calculates a content appropriateness degree of the content of the event in such a manner that the value for the content appropriateness degree decreases, as the number of event non-participant sharing users increases and the degree of intimacy between the event non-participant sharing user and the event participant user increases.

3. The content processing device according to claim 2, wherein
   the content information analyzing section further includes a social information updating section which specifies a relationship between a subject included in the content and a photographing user, based on the subject information and photographing user information for identifying the photographing user who photographed the content, and updates the social information based on the specified relationship.

4. The content processing device according to claim 3, further comprising:
   a communicating section which communicates with an external device via a network, wherein
   the social information updating section acquires, via the communicating section, social information to be managed by a social information managing section of another content processing device connected to the network, and updates the social information to be managed by the social information managing section of the content processing device of the own user, based on the acquired social information.

5. The content processing device according to claim 2, wherein
the content information analyzing section specifies a content owner user who owns the content, and
the content appropriateness degree calculating section applies weighting to the content appropriateness degree in such a manner that the content appropriateness degree of the content of the event increases in the case where the degree of intimacy between the content owner user and the event non-participant sharing user is equal to or larger than a predetermined threshold value in the event.

6. The content processing device according to claim 2, wherein
the sharing user information includes information indicating a position of an address of the sharing user,
the content information managing section manages photographing position information indicating a position of a photographing place of the content, and
the content appropriateness degree calculating section applies weighting to the content appropriateness degree in such a manner that the content appropriateness degree of the content increases in the case where a distance between information indicating the position of the address of the event non-participant sharing user and the photographing position information of the content included in the event is equal to or larger than a predetermined threshold value in the event.

7. The content processing device according to claim 2, further comprising:
a user attribute managing section which manages a user attribute table for specifying a user attribute of all users whose relationships have been defined with respect to a content owner user who owns the content, and a sharing content attribute policy which specifies a user attribute of the subject of which the content owner user permits content sharing with the sharing user in accordance with the user attribute of the sharing user, wherein
the content appropriateness degree calculating section specifies, from the user attribute table, a user attribute of the sharing user and a user attribute of the subject included in the content, specifies, from the sharing content attribute policy, a user attribute of a subject of which the content is sharable by the specified user attribute of the sharing user, and sets the content appropriateness degree to a predetermined value for decreasing the content appropriateness degree in the content including a subject having a user attribute of which content sharing is not permitted by the user attribute of the sharing user.

8. The content processing device according to claim 1, further comprising:
a content topicality degree calculating section which calculates a content topicality degree, based on the subject information, the sharing user information and the social information, the content topicality degree being a digitized value representing a topicality degree of the content which serves as a topic between the sharing users, wherein
the priority determining section calculates the content evaluation value with use of the calculated content topicality degree, as well as with use of the calculated content appropriateness degree.

9. The content processing device according to claim 8, wherein
the content topicality degree calculating section extracts, from the social information, a degree of intimacy between the sharing user and the subject included in the content, and calculates the content topicality degree in such a manner that the value for the content topicality degree increases as the number of subjects whose degrees of intimacy with respect to the sharing user are large increases in the content of the events, and
the priority determining section calculates the content evaluation value in such a manner that the content evaluation value increases as the value for the content topicality degree and the value for the content appropriateness degree increase in the content, and determines the priority of the content to be high in the descending order of the calculated content evaluation value.

10. The content processing device according to claim 1, wherein
the input section receives input of owner user information as identification information of a device owner user who owns the content processing device, an electronic mail address of the device owner user, partner user information as identification information of a partner user who shares the content, and an electronic mail address of the partner user; and causes the sharing user information managing section to manage the received information.

11. The content processing device according to claim 10, further comprising:
a communicating section which communicates with an external device via a network, wherein
the content appropriateness degree calculating section calculates the content appropriateness g degree assuming that the device owner user and the partner user are the sharing users, and
the output control section extracts the content based on the priority determined by the priority determining section, and designates the communicating section to transmit the extracted content to the electronic mail address of the partner user.

12. The content processing device according to claim 1, further comprising:
a communicating section which communicates, via a network, with a server device which provides a content sharing network service with which the content to be posted by a device owner user who owns the content processing device are shared between the prescribed users, and
a relationship information acquiring section which is managed by the content sharing network service, and which acquires, via the communicating section, relationship information specifying a relationship between the prescribed users, and a degree of intimacy between the prescribed users, the degree of intimacy between the prescribed users being a digitized value representing intimacy between the prescribed users, wherein
the content appropriateness degree calculating section calculates the content appropriateness degree assuming that the users included in the relationship information acquired by the relationship information acquiring section are the sharing users, and
the output control section extracts the content to be posted to the content sharing network service, based on the priority determined by the priority determining section, and designates the communicating section to post the extracted content to the content sharing network service.

13. The content processing device according to claim 1, further comprising:
- a communicating section which communicates with an external device via a network, and
- a current date calculating section which calculates a current date, wherein
- the sharing user information managing section manages schedule information of a device owner user who owns the content processing device,
- the content appropriateness degree calculating section calculates the content appropriateness degree in a case where a difference between the current date calculated by the current date calculating section and a scheduled date of a schedule registered in the schedule information is equal to or smaller than a predetermined value, assuming that the users associated with the schedule are the sharing users, and
- the output control section extracts the content, based on the priority determined by the priority determining section, and designates the communicating section to transmit the extracted content to a mobile terminal of the sharing user.

14. The content processing device according to claim 1, further comprising:
- an operation log managing section which manages operation log information in which an operation log with respect to the content, and information for identifying the user who operated the content are correlated with each other; and
- a social information updating section which adjusts the degree of intimacy between the user who operated the content and a subject included in the content, based on the operation log information.

15. A content processing method to be executed by a content processing device for processing at least one or more contents, comprising:
- a step of allowing a user to input a content by an input section;
- a sharing user information managing step of managing, by a sharing user information managing section, sharing user information relating to at least one or more sharing users who share the content inputted from the input section;
- a content information managing step of managing subject information relating to a subject included in the content by a content information managing section;
- a social information managing step of managing social information which specifies a relationship between the users, and a degree of intimacy between the users by a social information managing section, the degree of intimacy being a digitized value representing intimacy between the users;
- a content appropriateness degree calculating step of extracting a sharing user who does not appear in the subject of the content as an unappearing sharing user, and of calculating a content appropriateness degree by a content appropriateness degree calculating section in such a manner that a value for the content appropriateness degree decreases, as the degree of intimacy between the extracted unappearing sharing user and the subject increases, with use of the subject information and the sharing user information, the content appropriateness degree being a digitized value representing a degree of appropriateness of the content to be shared between the sharing users;
- a priority determining step of calculating a content evaluation value with use of the calculated content appropriateness degree, and of determining a priority relating to output of the content based on the calculated content evaluation value by a priority determining section; and
- an output control step of controlling the output of the content by an output control section, based on the priority determined by the priority determining section.

16. A non-transitory computer-readable recording medium which stores a content processing program which causes a computer to function as a content processing device for processing at least one or more contents, the content processing device comprising:
- a sharing user information managing section which manages sharing user information relating to at least one or more sharing users who share a content inputted from an input section;
- a content information managing section which manages subject information relating to a subject included in the content;
- a social information managing section which manages social information which specifies a relationship between the users, and a degree of intimacy between the users, the degree of intimacy being a digitized value representing intimacy between the users;
- a content appropriateness degree calculating section which extracts a sharing user who does not appear in the subject of the content as an unappearing sharing user, and which calculates a content appropriateness degree in such a manner that a value for the content appropriateness degree decreases, as the degree of intimacy between the extracted unappearing sharing user and the subject increases, with use of the subject information and the sharing user information, the content appropriateness degree being a digitized value representing a degree of appropriateness of the content to be shared between the sharing users;
- a priority determining section which calculates a content evaluation value with use of the calculated content appropriateness degree, and which determines a priority relating to output of the content based on the calculated content evaluation value; and
- an output control section which controls the output of the content, based on the priority determined by the priority determining section.

17. An integrated circuit of a content processing device for processing at least one or more contents, comprising:
- a sharing user information managing section which manages sharing user information relating to at least one or more sharing users who share a content inputted from an input section;
- a content information managing section which manages subject information relating to a subject included in the content;
- a social information managing section which manages social information which specifies a relationship between the users, and a degree of intimacy between the users, the degree of intimacy being a digitized value representing intimacy between the users;
- a content appropriateness degree calculating section which extracts a sharing user who does not appear in the subject of the content as an unappearing sharing user, and which calculates a content appropriateness degree in such a manner that a value for the content appropriateness degree decreases, as the degree of intimacy between the extracted unappearing sharing user and the subject increases, with use of the subject information and the sharing user information, the content appropriateness degree being a digitized value representing a degree of appropriateness of the content to be shared between the sharing users;

a priority determining section which calculates a content evaluation value with use of the calculated content appropriateness degree, and which determines a priority relating to output of the content based on the calculated content evaluation value; and an output control section which controls the output of the content, based on the priority determined by the priority determining section.

* * * * *